(12) United States Patent
Carpenter

(10) Patent No.: US 6,199,068 B1
(45) Date of Patent: Mar. 6, 2001

(54) MAPPING INTERFACE FOR A DISTRIBUTED SERVER TO TRANSLATE BETWEEN DISSIMILAR FILE FORMATS

(75) Inventor: Richard Christopher Carpenter, Fuquay-Varina, NC (US)

(73) Assignee: ABB Power T&D Company Inc., Raleigh, NC (US)

( * ) Notice: Subject to any disclaimer, the term of this patent is extended or adjusted under 35 U.S.C. 154(b) by 0 days.

(21) Appl. No.: 09/082,758

(22) Filed: May 21, 1998

Related U.S. Application Data
(60) Provisional application No. 60/058,659, filed on Sep. 11, 1997.

(51) Int. Cl.[7] .............................. G06F 17/00; G06F 15/63
(52) U.S. Cl. ...................... 707/100; 702/62; 340/870.03; 370/449
(58) Field of Search ..................................... 707/100, 200, 707/10, 203; 340/870.03, 870.02, 870.06, 870.07; 702/62; 370/449; 324/142; 705/412, 35; 703/18, 20; 704/4, 2, 3; 379/106.06; 717/5, 1; 709/107, 312

(56) References Cited

U.S. PATENT DOCUMENTS

| | | | |
|---|---|---|---|
| 4,396,915 | * 8/1983 | Farnsworth et al. ............ | 340/870.03 |
| 5,187,787 | 2/1993 | Skeen et al. .................... | 709/312 |
| 5,257,369 | 10/1993 | Skeen et al. .................... | 709/314 |
| 5,392,390 | 2/1995 | Crozier .................................. | 345/335 |
| 5,418,957 | 5/1995 | Narayan ..................................... | 717/1 |
| 5,421,015 | 5/1995 | Khoyi et al. ........................... | 709/107 |
| 5,497,319 | 3/1996 | Chong et al. ............................. | 704/2 |
| 5,535,120 | 7/1996 | Chong et al. ............................. | 704/3 |
| 5,553,094 | 9/1996 | Johnson et al. ....................... | 375/130 |
| 5,557,798 | 9/1996 | Skeen et al. ............................ | 705/35 |
| 5,560,005 | 9/1996 | Hoover et al. .......................... | 707/10 |
| 5,561,799 | 10/1996 | Khalidi et al. ........................ | 707/200 |
| 5,583,983 | 12/1996 | Schmitter .................................. | 717/5 |
| 5,590,179 | 12/1996 | Shincovich et al. ............ | 379/106.06 |
| 5,596,744 | 1/1997 | Dao et al. .............................. | 707/10 |
| 5,600,832 | 2/1997 | Eisenberg et al. .................... | 707/203 |
| 5,602,744 | 2/1997 | Meek et al. ........................... | 705/412 |
| 5,604,892 | 2/1997 | Nuttall et al. .......................... | 703/18 |
| 5,619,685 | 4/1997 | Schiavone .............................. | 703/20 |
| 5,634,053 | 5/1997 | Noble et al. .............................. | 704/4 |
| 5,673,252 | * 9/1997 | Jhonson et al. ...................... | 370/449 |
| 5,994,892 | * 11/1999 | Turino et al. ........................ | 324/142 |
| 6,088,659 | * 7/2000 | Kelley et al. ........................... | 702/62 |

OTHER PUBLICATIONS

Lee et al., "Design of an automatic meter reading system", proceedings of 1996 IEEE, pp. 631–6, Aug. 1996.*

"MV–90 Read Only System" UTS Software Solutions for Utility Customers.

* cited by examiner

*Primary Examiner*—Hosain T. Alam
*Assistant Examiner*—Sanjiv Shah
(74) *Attorney, Agent, or Firm*—Woodcock Washburn Kurtz Mackiewicz & Norris

(57) ABSTRACT

A mapper to translate an input file from an input domain to an output domain. The mapper includes a canons utility which builds a canon, the canon being a tree relating all data attributes within a domain of information, and the domain being a collection of data that has a same data format, a maps utility which creates input and output maps that specify the translation from the input domain to the output domain, and a translator utility to perform the translation of the input file to an output file. The input map is a data structure that describes a format of the input domain and the output map is a data structure that describes a format of the output domain. The input map and the output map are derivation trees, and the mapper utilizes the input map and the output map to build a scanner/parser for the input file domain. The mapper traverses the input map to parse data from the input file into a list. The mapper then maps from the list to the output domain to generate the output file by traversing the output map and reinterpreting a corresponding element in the list such that the corresponding element conforms to the output domain.

27 Claims, 46 Drawing Sheets

| FIG. 2 |  |
|---|---|
| FIG.2A | FIG.2B |
| FIG.2C | FIG.2D |

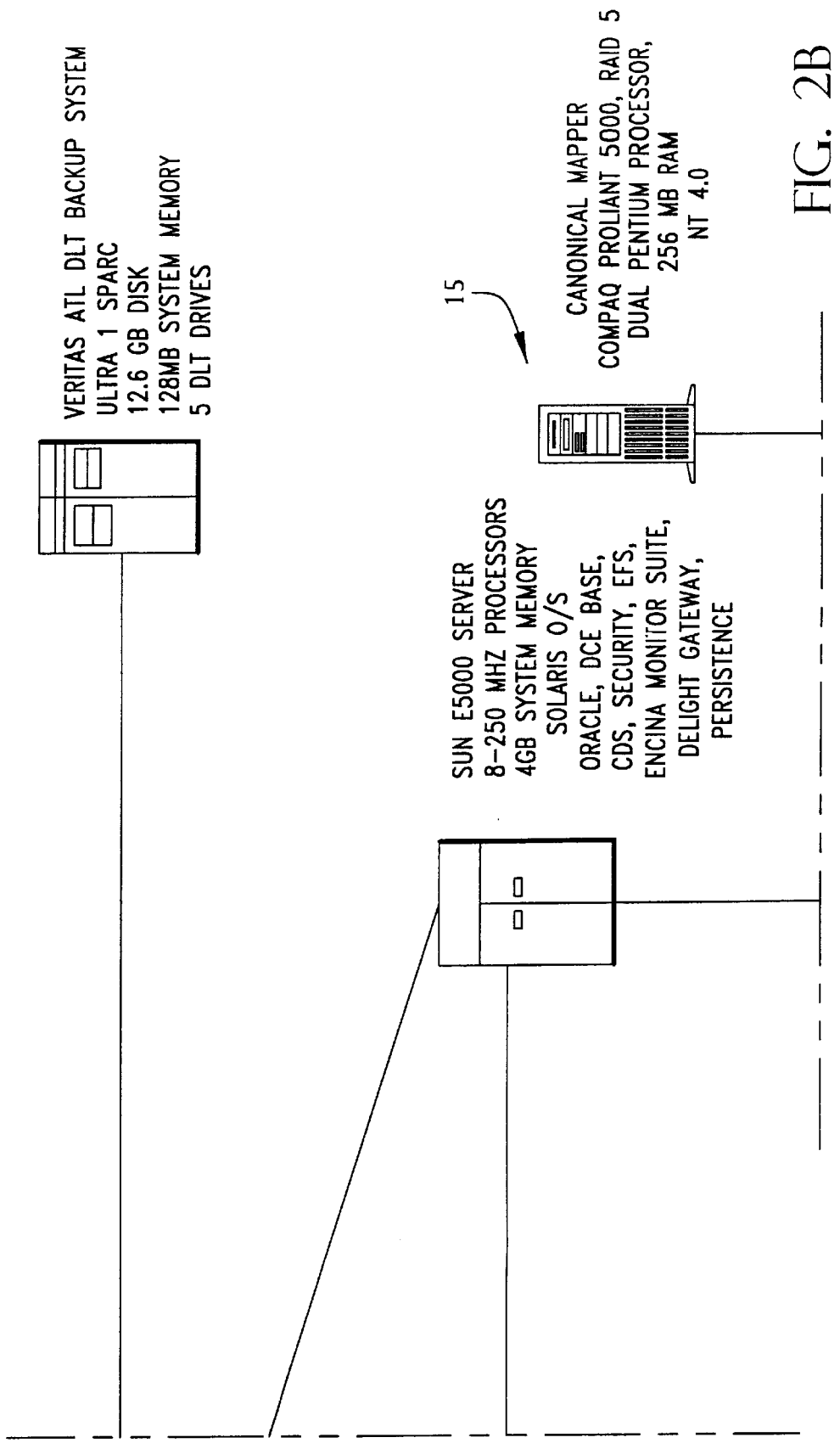

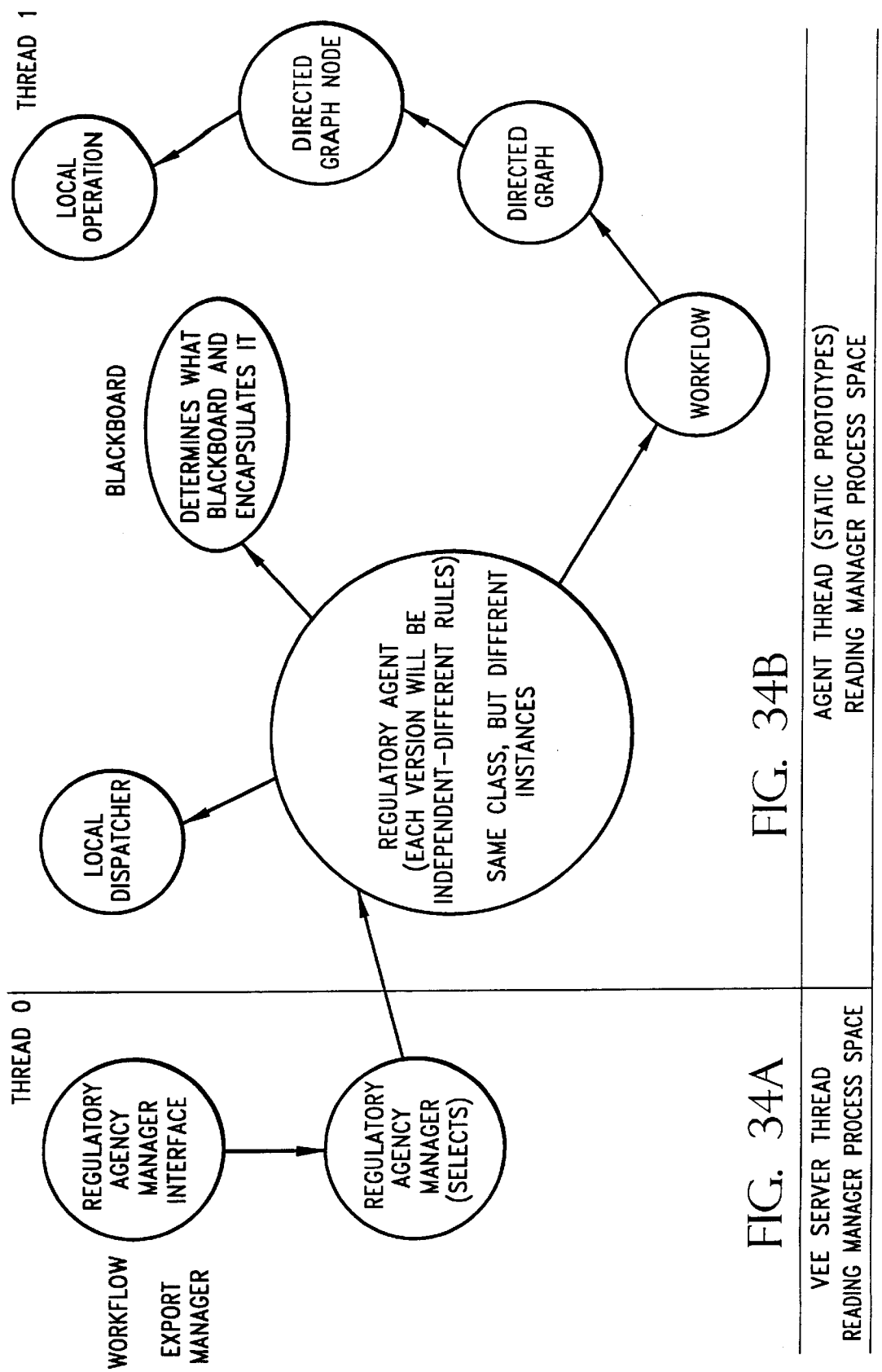
FIG. 34A — VEE SERVER THREAD READING MANAGER PROCESS SPACE
FIG. 34B — AGENT THREAD (STATIC PROTOTYPES) READING MANAGER PROCESS SPACE

MAPPING INTERFACE FOR A DISTRIBUTED SERVER TO TRANSLATE BETWEEN DISSIMILAR FILE FORMATS

CROSS REFERENCE TO RELATED APPLICATIONS

This application claims the benefit of U.S. Provisional Patent Application Ser. No. 60/058,659, to Kelley et al., filed Sep. 11, 1997, entitled "AUTOMATIC METER READING SYSTEM".

FIELD OF THE INVENTION

The present invention relates generally to an automated meter reading (AMR) system, and more particularly to an AMR server within the automated reading system which collects, loads and manages data from energy meters, and processes and stores meter data for routing to end users and business systems.

ACRONYMS AND KEYWORDS

The written description provided herein contains acronyms and keywords to describe the various system components and services. Although known, use of several of the acronyms and keywords is not standardized in the art. For the purposes of the written description herein, acronyms and keywords are defined as follows:
ACID—Atomicity, Consistency, Isolation, Durability
AMPS—Analog Mobile Phone System
AMR—Automated Meter Reading
API—Application Program Interface
BOM—Bill of Material
C&I—Commercial and Industrial
CIS—Customer Information System
CDS—Cell Directory Service
CDMA—Code Division Multiplexed Access
CDPD—Cellular Digital Packet Data
CM—Communications Manager
CORBA—Common Object Request Broker Architecture
CPU—Central Processing Unit
CRUDLE—Create, Read, Update, Delete, List, and Exists
CSR—Customer Service Representative
CURDLE—Create, Update, Read, Delete, List and Exist
DAO—Data Access Object
DCE—Distributed Computing Environment
DFS—Distributed File Service
DSS—Distributed Security Service
DTS—Distributed Time Service
ESCO—Non-Grid and Non-Commodity Energy Services Companies
ESP—Energy Service Provider
GUI—Graphical User Interface
IDL—Interface Definition Language
ISO—Independent System Operator
LAN—Local Area Network
LECRUD—List, Exist, Create, Read, Update and Delete
MDMA—Meter Data Management Agent
OMS—Outage Management System
OO—Object Oriented
PM—Wholesale Power Market Services
PSTN—Public Switched Telephone Network
PX—Power Exchange
RDBMS—Relational Database Management System
RF—Radio Frequency
RM—Resource Managers
RPC—Remote Procedure Call
RPU—Real Time Processor Unit
RQS—Recoverable Queuing System
RSP—Remote Stored Procedure
RTG—Remote Terminal Gateway
RTU—Remote Telemetry Unit
SC—Schedule Coordinator
SCADA—Supervisory Control and Data Acquisition
SFS—Structured File System
SNMP—Simple Network Management Protocol
SOE—Sequence of Events
TDMA—Time Division Multiple Access
TM—Transaction Manager
TOU—Time of Use
UDC—Utility Distribution Company
UPC—Universal Protocol Converter
VEE—Validation, Editing, and Estimation
WAN—Wide Area Network
WFM—Work Flow Manager

BACKGROUND OF THE INVENTION

The reading of electrical energy has historically been accomplished with human meter readers that came on-site to the customers' premises and manually documented the readings. Over time, manual meter reading has been enhanced with walk-by or drive-by reading systems that utilize radio communications between the meters and a meter reading device. The information that these walk-by and drive-by systems collected increased, but still the functions provided by the communication systems were limited.

More recently, over the last few years, there has been a concerted effort to automate meter reading by installing fixed networks that allow data to flow from the meter to a host computer system without human intervention, such systems have been referred to in the art as Automated Meter Reading (AMR) systems. AMR systems have gained interest because there are approximately 150 million installed meters, of which 17 million are considered to be "hard-to-read" because of location, etc. A limitation in these conventional AMR systems is that they typically use only one type of communication infrastructure to gather data. For example, the AMR system may receive data from meters via one of a fixed proprietary RF communications infrastructure, the public switched telephone network or power line transmission. This one-infrastructure communication of data has led to the development of incompatible AMR systems that are tied to that particular communications infrastructure, utilize proprietary devices and protocols, and have unacceptably low data rates. Such implementations are also lacking because RF coverage is limited, and public switched telephone network and power line transmission solutions require relatively long periods of time to communicate data from the meter.

In addition to the limitations regarding communication infrastructures, conventional AMR systems are not easily adaptable to changing requirements of both the energy provider and the energy consumer. For example, while most meters measure energy monthly in kWh or Time-of-Use (TOUT), rising consumer demand for daily reads of kWh or TOU, load profile metering along with demand, outage, power quality and tamper monitoring capabilities will render conventional systems obsolete. For example, conventional AMR systems collect data via a pulsed input, and over a period of time to determine energy usage or may create a load profile. These systems, however, are not capable of reading data from newly developing intelligent meters that provide load profile information and the like to the AMR system.

A further limitation of the conventional AMR system is that they do not accommodate the requirements of end-user systems (e.g., billing systems, energy management systems and supervisory control systems). Theses systems are typically standalone systems, separate from the metering system. One of the primary reasons that the requirements of end-user systems are not met is because of the above-mentioned limitations that conventional AMR systems were designed as proprietary systems rather than open systems. These systems generally output the meter data in a raw format that is not compatible with the end-user systems and that must be converted for use. Thus, conventional AMR systems do not perform validation, editing and estimation of the output data, and require a relatively high amount of manual intervention to transfer data from the AMR system to end users for further processing.

Yet another limitation of conventional AMR systems is that metering data has been captured and managed using traditional mainframe or two-tiered client/server architectures. While mainframe and client/server solutions have been up to the present relatively successful in addressing the needs of utilities and their customers, AMR Systems are becoming far too large and complex for conventional technologies because of the amount of data flowing in and out of the system (e.g., it may be necessary to store and process data from daily or hourly meter reads from millions of meters). As data requirements steadily increase in an automated meter reading system, traditional mainframe and two-tiered architectures (non-distributed systems) experience limitations in memory, CPU capabilities, and storage capacity because a growing amount of data traffic over the network leads to bottlenecks that result in performance limitations as data is shipped between the database and the client, and records in the database can become locked when client programs need to lock data to use it. Upgrading these systems to increase the load capability and performance requires bringing the system down. In addition, the cost of maintenance and upgrade of these systems increases as companies attempt to solve client/server performance problems and scalability issues by purchasing bigger and faster machines.

In addition to limitations noted-above in conventional AMR systems, perhaps the greatest limitation of the existing AMR systems is that the electric utility marketplace is moving towards deregulation. Under deregulation, utility customers will be able to choose their electric service providers. As a result, the deregulated marketplace has created many new business entities, which will place additional demands on AMR systems. For example, in California, a Meter Data Management Agent (MDMA) has been created which is responsible for collecting and publishing the data required for billing. Further, the MDMA requires that settlement quality data be provided as the MDMA publishes data to multiple business entities, including the ESP, the UDC and potentially other ancillary services (e.g., third party billing companies, etc.). However, conventional AMR systems were not designed to accommodate the demands of a deregulated market place nor do they provide such capabilities. Further, conventional AMR systems do not accommodate the needs of commercial and industrial (C&I) and residential customers who are interested in determining usage statistics.

Specific examples of conventional AMR and AMR-type systems are described in the prior art. U.S. Pat. No. 5,602,744, to Meek et al., entitled "Universal Send/Receive Utility Usage Data Gathering System", which discloses a universal utility usage data gathering system that can respond and transmit recorded utility consumption to readers manufactured by other vendors. A "buried" emulated protocol responds to another vendor's interrogation pulse and tricks the other vendor's reader into thinking that it is communicating with one of its own meters. The interrogator and the data gathering system may communicate in a synchronous or asynchronous manner depending on the vendor's implementation.

U.S. Pat. No. 5,553,094, to Johnson et al., entitled, "Radio Communication Network for Remote Data Generating Stations", discloses a wide area communications network that collects data generated by a plurality of electric meters for transmission to a central data terminal. Information is transmitted from network service modules to remote cell nodes, which then transfer the information to a central data terminal via intermediate data terminals. The network service modules transmit data packets over RF transmission links to the remote cell nodes located at approximately 0.5 mile intervals, for example, on utility poles or a building. The remote cell nodes periodically forward information via RF transmission links to the intermediate data terminals. The intermediate data terminals are located at 4 mile intervals. The intermediate data terminals communicate to the central data terminal via various different types of links including telephone lines, T1 carriers, fiber optic channels, coaxial cables, microwave, or satellite.

U.S. Pat. No. 5,590,179, to Shincovich et al., entitled "Remote Automatic Meter Reading Apparatus" discloses an adaptor to provide automatic meter reading of conventional watthour meters without requiring modifications to the meters or the socket to which the meters are mounted. The adaptor is interconnected between the meter and the socket and includes internal telephone communications circuitry. During a predefined transmission window, a controller in the adaptor changes modes such that the adaptor may be contacted via telephone to send data to a central utility site.

Also known are distributed networks for communicating data from devices having dissimilar formats and/or protocols. U.S. Pat. No. 5,619,685, to Schiavone, entitled "Run-Time Dynamically Adaptive Computer Process for Facilitating Communication between Computer Programs" discloses a system whereby two dissimilar software programs may communicate with each other on a distributed network by mapping input and output blocks of memory.

In addition to the above system, there are specific examples of AMR products in use. A first is MV-90, which is a product sold by Itron/UTS. While MV-90 supports multiple electric meter manufacturer protocols, as well as several gas meters, gathers load profile, time-of-use, consumption and demand data, and performs some form of meter data validation and issues alerts/alarms, the MV-90 interfaces only to a corresponding proprietary billing system (i.e., the MV-PBS Power Billing System). A further limitation is that MV-90 is a DOS-based AMR system, and therefore is small scale solution and is not scalable to accommodate large scale entities. In addition, MV-90 is limited to communicating with meters via a single telephone modem interface, therefore is considered only a tactical solution for many energy service providers. Still further, MV-90 has not been designed to accommodate and support multiple deregulated business entities and specific regulatory agency validation and estimation schemes.

An example of another AMR product is MAPS, which is offered by Schlumberger. MAPS is a client-server, UNIX-based AMR system that collects data from water, gas and electric meters. The MAPS host software provides scheduling, network management, access to usage and load profile information, and analysis of power usage. Usage information may be shared with other systems such as billing. While MAPS may be more robust than MV-90, it too is limited by the number of meter end points from which information may be collected. Further, there are no data validation or estimation schemes, and MAPS will not accommodate multiple market entities.

In view of the limitations of conventional AMR and AMR-type systems, the AMR system of the present invention addresses the needs and limitations of known systems by providing an end-to-end system that combines communications, data warehousing, processing and consolidation as well as presentation and standard application interface options. In particular, the present invention provides an all-inclusive, highly automated solution by providing an integrated system that is capable of receiving data from a plurality of dissimilar metering devices and communications networks, managing the data, and communicating the data to a plurality of applications and end user systems. The AMR system of the present invention is adapted to communicate with legacy systems and other proprietary systems.

In order to provide such communication with legacy systems and proprietary systems, conventional AMR systems typically require that the external systems import data to, or export data from, the AMR system using the format of the AMR system or in a limited flat file format. Such limitations lead to incompatibilities among systems and prevent systems from communicating with each other. Such incompatibilities will present extreme difficulties in the deregulated environment. The present invention overcomes such limitations as noted below.

SUMMARY OF THE INVENTION

In view of the above, the present invention, through one or more of its various aspects and/or embodiments provides one or more features and advantages over the prior art, such as those noted below.

The present invention is directed to a computer system having a canonical mapper to translate an input file from an input domain to an output domain. The canonical mapper comprises a canons utility which builds a canon, the canon being a tree relating all data attributes within a domain of information, and the domain being a collection of data that has a same data format, a maps utility which creates input and output maps that specify the translation from the input domain to the output domain, and a translator utility to perform the translation of the input file to an output file. The input map is a data structure that describes a format of the input domain and the output map is a data structure that describes a format of the output domain.

According to a feature of the present invention, the canonical mapper converts files over at least two mapped subdomains, the at least two mapped subdomains being the same root domain.

According to another feature of the present invention, the input map and the output map are derivation trees, and the canonical mapper utilizes the input map and the output map to build a scanner/parser for the input file domain. The canonical mapper traverses the input map to parse data from the input file into a canonical list. The canonical mapper then maps from the canonical list to the output domain to generate the output file by traversing the output map and re-interpreting a corresponding element in the canonical list such that the corresponding element conforms to the output domain.

According to yet another feature, the canon comprises an abstract template that describes a structure of the domain of information, the canon comprising canonical elements that are used to interpret data contained within the input file. Each canonical element is an abstraction, and each division or part of each the element is subsequently defined in terms of less abstract elements until resolving to a concrete element. The canonical elements are assigned attributes that define qualities of the canonical elements. Relationships exist when the domain contains data that is dependent upon other data in the domain. The input map and the output map are created in accordance with the canon, and describe the intended output in terms of the canonical elements. In addition, the input map defines a function of each component of the input file in terms of the canon being used, and the output map defines a function of each component of the output file in terms of the canon being used. The input and output maps further comprise attributes about canonical elements, modifiers for canonical elements having specific values, conditional statements that further define a function of the canonical elements having specific values, tokens that specify a format of the values in a particular map, and actions that specify the format of certain parts of a file.

According to a further feature of the present invention, the canonical mapper further comprises an interactive translator utility to test the actual translation of the input file to be mapped for the translation process, the test being performed in accordance with the canon, the input map, the output map, and the input file.

According to another feature, the translator utility performs the conversion across domains in accordance with the input map, the output map, and the input file to create the output file. The translator utility may also run in a headless mode.

According to another aspect of the present invention, there is provided a method of mapping an input file to an output file comprising across domains comprising creating a canon, the canon comprising canonical elements; creating input and output maps in accordance with the canon to perform the conversion of the input file; testing the conversion; and mapping the information from the input map to the output map to create the output file.

According to a feature of the method, creating a canon comprises defining a root from which other subordinate parts of the canon stem, the root and subordinate parts comprising the canonical elements; defining children of the root, the children defining specific information about the root; and defining relationships of the canonical elements.

According to another feature of the method, creating input and output maps comprises selecting each component of the input file and defining its function in terms of the canon; defining attributes about the canonical elements; defining tokens, the tokens specifying a format of the results of mapping the input file using the input and output maps; and defining actions to structure the appearance of portions of the input file or the output file.

According to yet another feature, defining attributes about the canonical elements comprise defining modifiers for the canonical elements, the modifiers determining if a value of a particular canonical element is required, if the value appears more than once, if the canonical element includes a series of the values, or if the canonical element is required; and defining identifiers, the identifiers being constant values within the input file.

According to another aspect of the present invention, a canonical mapper is provided in a server residing within a multi-layered distributed software architecture that receives and processes data, the server comprising a data repository to store the data, at least one external interface to communicate with systems external of the server, a services subsystem comprising distributed services, the distributed services running on application servers within the distributed architecture, middleware software to facilitate scalability, transaction processing, and mapping of objects to the data repository, and application frameworks to facilitate access to the data repository and the creation of processes compliant with the middleware software. The canonical mapper comprises a canons utility which builds a canon, the canon being a tree relating all data attributes within a domain of information, and the domain being a collection of data that has a same data format, a maps utility which creates input and output maps that specify the translation from the input domain to the output domain, and a translator utility to perform the translation of the input file to an output file. The input map is a data structure that describes a format of the input domain, and the output map is a data structure that describes a format of the output domain.

According to a feature of the present invention, the canonical mapper server resides in a mapping subsystem which provides for customization of file formats for exporting data from and importing data to the server.

According to yet another feature of the invention, the server further includes a mapping interface server that interfaces with the canonical mapper, wherein the mapping interface server provides middleware service requests from the services subsystems. The mapping interface server interfaces with the canonical mapper server using a socket connection, and provides a service that allows a service in the services subsystem to specify the input file, the input map, the output file, and the output map.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIGS. 34A–D illustrate the interaction of threads within the Validation, Editing and Estimation subsystem.

BRIEF DESCRIPTION OF THE APPENDICES

In order to further facilitate the detailed description of the present invention, reference is made to the noted plurality of appendices by way of non-limiting examples of preferred embodiments of the present invention, which are provided with respect to the various features, operations and functions of the invention, and wherein:

Appendix A contains top level interaction diagrams illustrating the various servers and objects invoked for an operation; and Appendix B contains the database structure for the AMR Server of the present invention.

DETAILED DESCRIPTION OF PREFERRED EMBODIMENTS

The AMR Server of the present invention advantageously offers a large-scale system solution to address the management of metering data and the administration of the systems that perform the management. The AMR Server is designed to provide business entities in the power industry with an automated meter reading system that could serve as a single source for metering data.

As will be described in detail below, the AMR system of the present invention is designed as a distributed system to accommodate the variety of legacy systems and platforms existing in the current market, and is scalable, flexible and adaptable. The system is adapted to accommodate customer-to-customer differences in requirements, business logic, and regulatory requirements.

Figure 1:
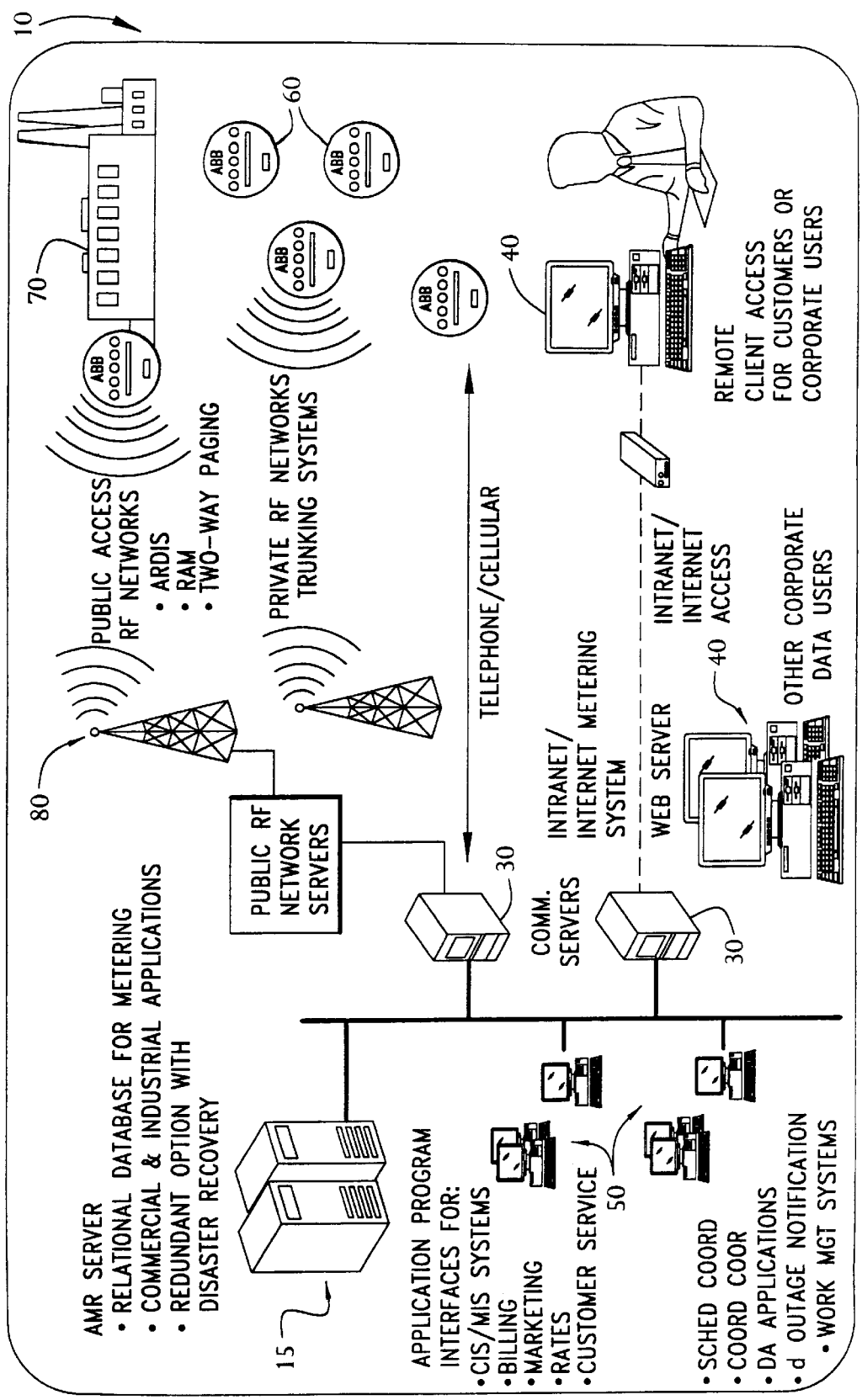
FIG. 1 illustrates an overview of an AMR system architecture in accordance with the present invention.

An overview of the AMR system 10 architecture is illustrated in FIG. 1. The AMR System includes an AMR Server 15 that collects, loads, and manages system-wide metering data from electronic or electromechanical meters 60 located at customers' premises 70 and. routes it automatically to upstream business systems 50 (collectively, the External Application and Communication Systems). Energy providers can capture consumption and interval meter data for hundreds of thousands of meters 60, deliver it directly to business functions and system 50, and ultimately supply the data to large commercial and industrial accounts 40. In addition, the AMR Server 15 serves as a repository for existing business application systems 50 belonging to Energy Service Providers (ESPs) and/or Utility Distribution Companies (UDCs), such as billing, Customer Information Systems (CIS), Customer Service, and Outage Management Systems (OMS).

Metering data may be collected via communications servers 30 from a variety of dissimilar meters 60 and transmitted using multiple dissimilar types of communication media and infrastructures 80. The AMR Server 15 is designed to compensate for the complications introduced by variations in dissimilar meters 60 and communication media 80, and to present an abstracted view of the entire metering system to end-user business applications 50. The AMR Server 15 allows various business systems 50 to interact with meters 60 and metering data without the constraints of system configuration details. For example, the AMR Server 15 allows a billing system to create a billing schedule for a collection of meters 60 and have this data delivered to a specified location according to the schedule. The collection of meters 60 to be billed may be of different meter types and distributed across various communication media 80 each having different network constraints that complicate the data collection. Meanwhile, the billing system is not required to have knowledge of these complexities.

As will be described in greater detail herein, the AMR Server 15 architecture is represented as a cooperating set of services running in a distributed architecture. The distributed architecture of the AMR Server 15 is designed with three tiers, rather than the traditional two. A three-tiered system advantageously allows clients make small requests for services, instead of large requests for data, via application servers that can be programmed in ways that they do not create lock contention in the database. Application servers can be executed on multiple machines simultaneously in a configuration called "application replication" which spreads client loads across multiple machines and enables higher availability, scalability, and performance. Additionally, the total number of connections into the database can be reduced because application servers manage client "sessions" and multiple clients can share database connections. The architecture is designed to be scalable from a small utility (approximately 10,000 meters) to a large utility (3 million meters or more).

The AMR Server 15 is preferably a distributed architecture because such systems are flexible, scalable, and efficient. A further advantage of distributed systems is that the hardware components of a distributed system can be located and added where they are needed. Therefore, as needs change over time, the components of a distributed system can be easily moved and reconfigured without impacting performance. Distributed processing allows the AMR Server 15 to be scalable and to grow, as the data management needs change. Further, by distributing large amounts of data across multiple servers, higher throughputs are achieved resulting in better performance and management of data. Distributed systems can provide greater availability as planned outages occur and are immune to single points of failure. Individual computers or links can be disconnected from the system for testing, repair, or modification without a negative impact on the system. In addition, the AMR Server 15 will provide SNMP support supplemented with other tools.

Communication with the meter or meter modems is preferably supported as server initiated and meter modem initiated calls. Two-way communications allows both service providers, and end-users to have functionalities which are currently limited in availability. Some of these functions would include: outage alerts, tamper notification, in-home display of electric information, meter programming, remote monitoring of power quality, customer service diagnostics and more. The communications infrastructures supported in the AMR System 10 include, but are not limited to, CDMA (Code Division, Multiple Access), Telephone and International DAA, ARDIS, X.25, RAM, ReFlex, AMPS (Analog Mobile Phone System), CDPD (Cellular Digital Packet Data), TDMA (Time Division Multiple Access), and AMPS (Digital Analog Mobile Phone System).

Figure 2A:
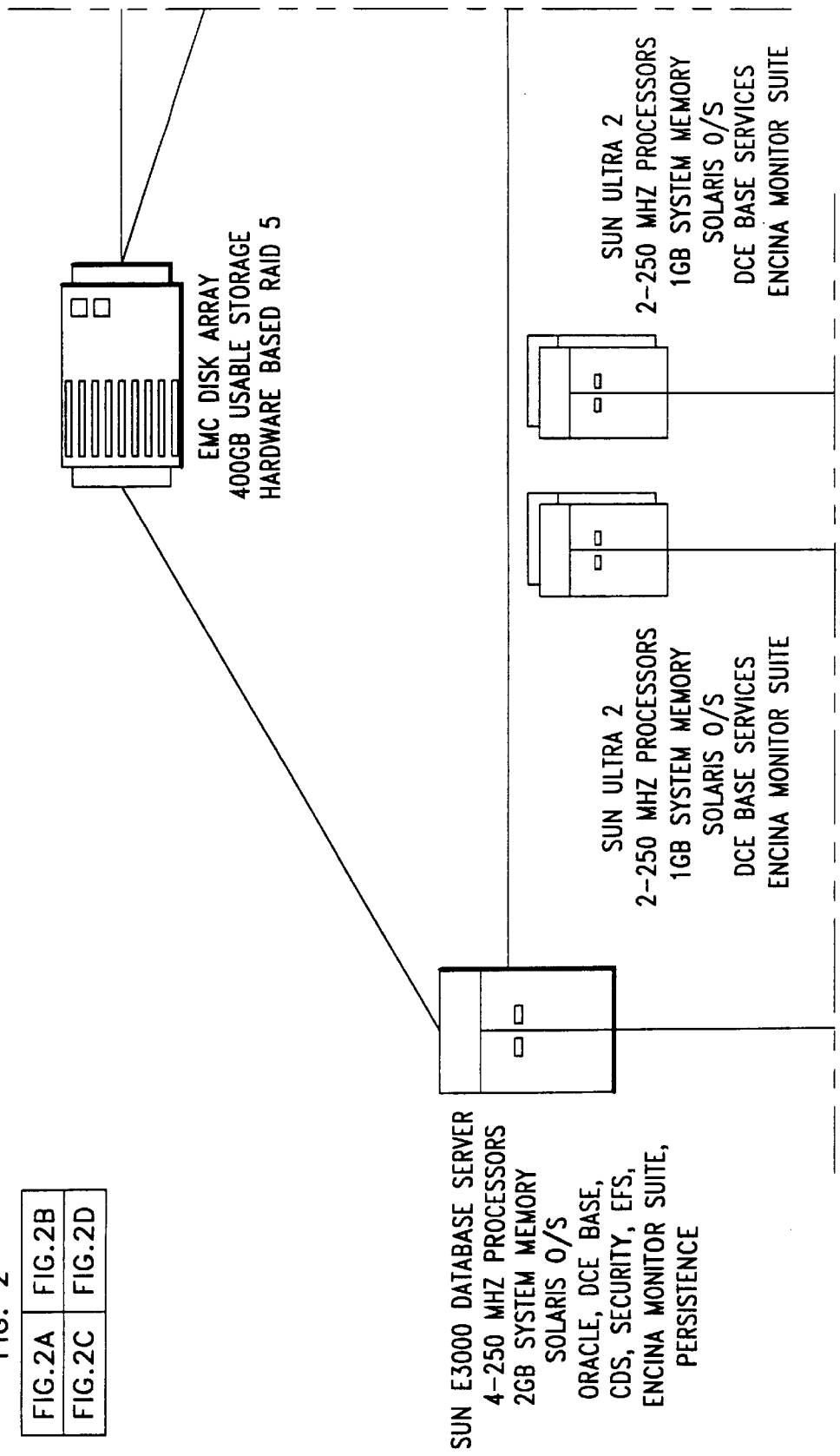
FIG. 2 illustrates an exemplary hardware configuration of an AMR Server for a small-scale deployment.
Figure 2C:
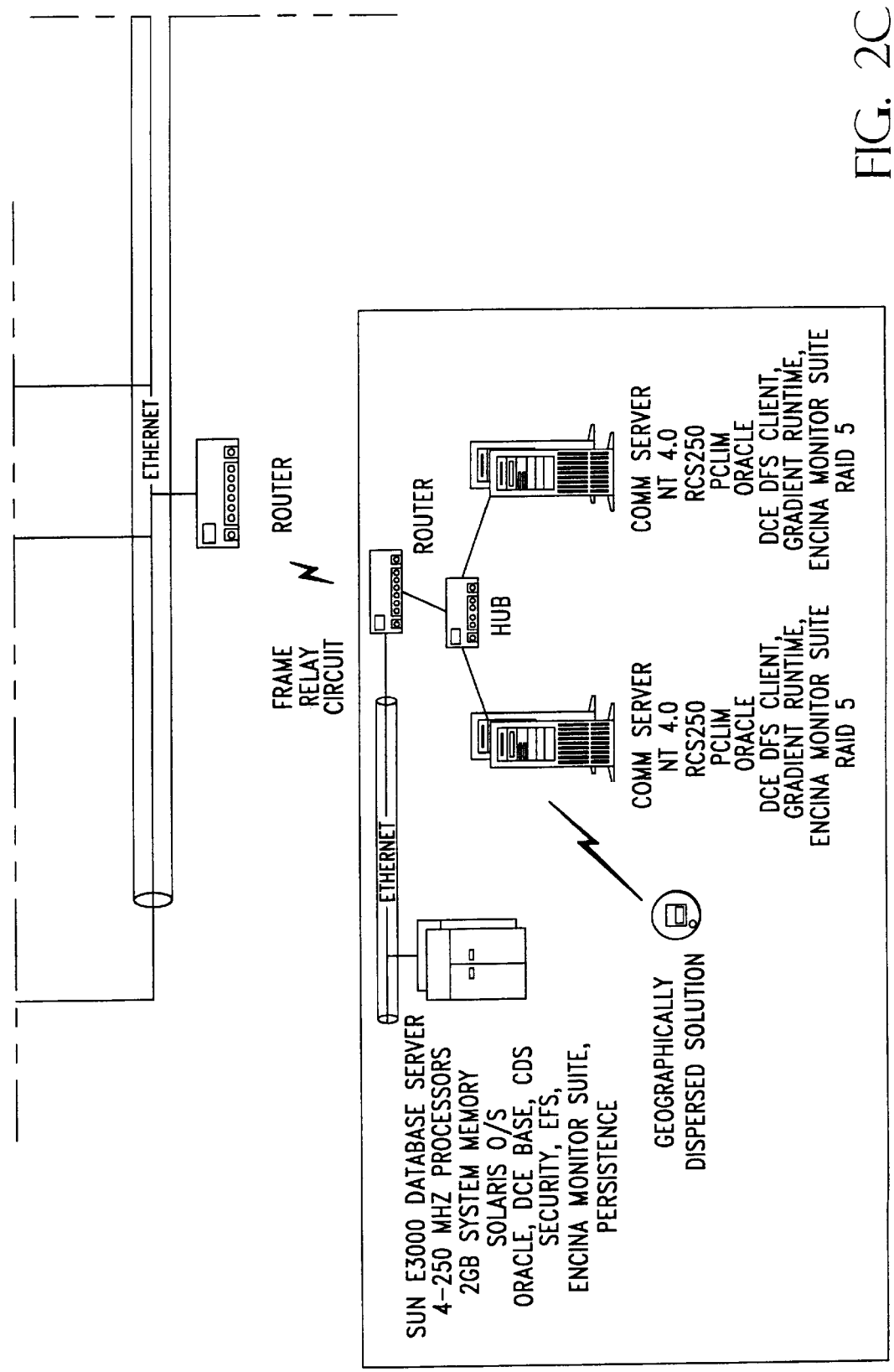
Figure 2D:
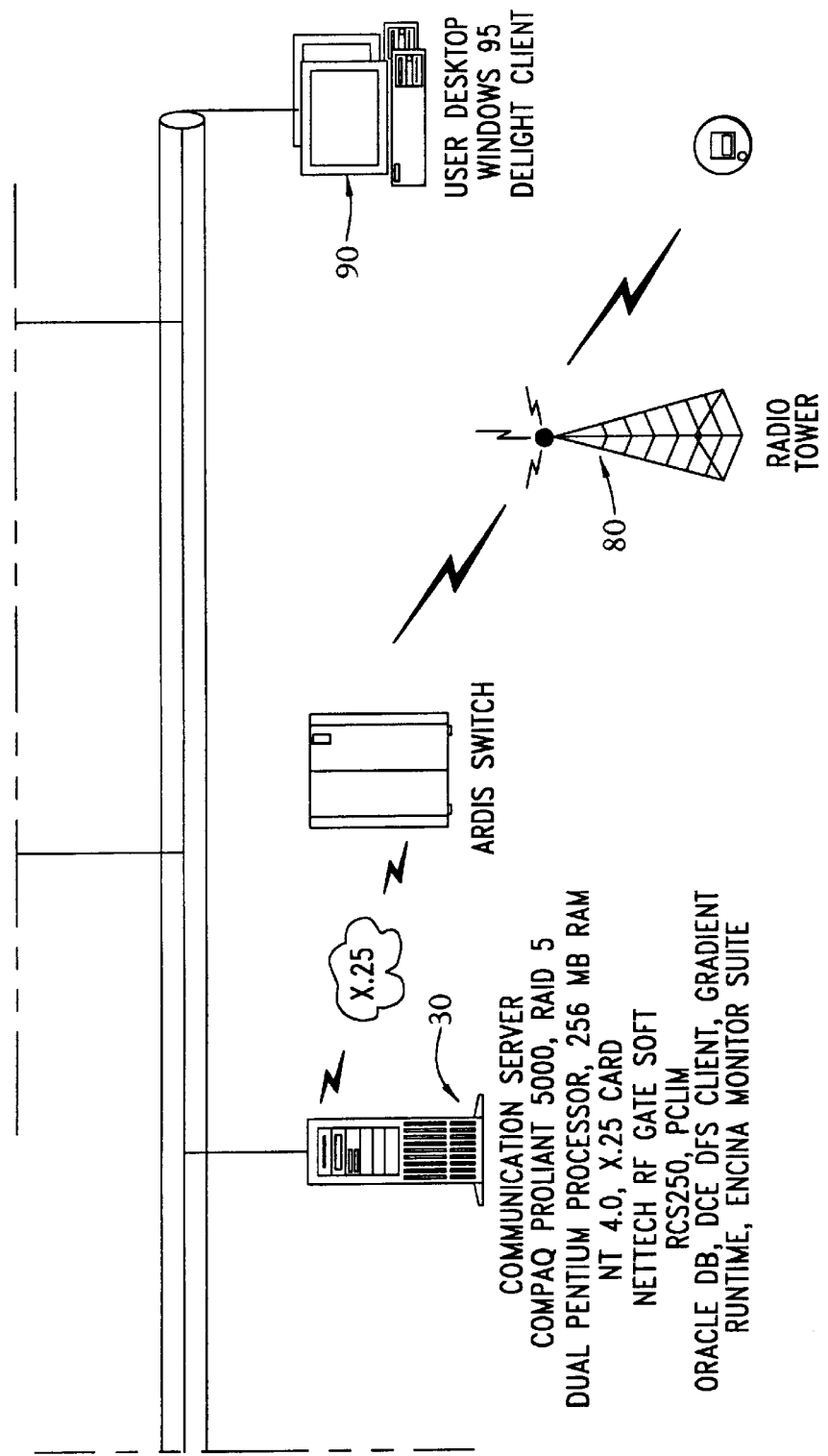

FIG. 2 illustrates an exemplary hardware configuration of the AMR Server 15 for a small-scale deployment. The exemplary hardware configuration assumes an initial deployment configuration with a design scope of about 10,000-meter points. As illustrated, the exemplary initial configuration includes Sun E3000 Database Server (or other enterprise level server) running Oracle® RDBMS, and the Encina® Monitor Suite; a Sun Ultra 2 running all other distributed systems; an EMC Disk Array, a Veritas ATL DLT Backup System; and a Compaq Proliant 5000 running a Canonical Mapper (discussed below). This configuration is scalable to accommodate greater numbers of meters, as noted above. The Communication Servers 30 of this base configuration run over a Wide Area Network (WAN) and can be scaled toward a geographically dispersed telephone solution or a wireless communication system (e.g., Ardis, CDPD or PCS). The communication server 30 may comprise an RCS 250, available from ABB Power T&D Information Systems, Raleigh, N.C., as configured in FIG. 2.

Turning to the software implementation of the AMR Server 15, it is noted that in recent years object orientation in software development has demonstrated that encapsulating logic or behavior with data is useful in building flexible systems. However, new systems require dynamic business functionality based on changing customer needs or customer differences. Three-tier architectures are implemented by using views and simple APIs to interface with a domain server that in turn deals with encapsulated business objects that are persistently stored in the database. This works well to abstract business logic from application logic; however they are limited in that when business logic is changed, the business logic objects must be re-coded within the system.

The present invention improves upon traditional three-tiered systems to be flexible and to accommodate dynamic business requirements. This flexibility is provided by the AMR Server 15 as an extension made to the traditional three-tiered approach. This extension is to extract business logic into objects called Activity Plans. Activity Plans or work flows control the flow of work in a system. The Activity Plans are an independently driven set of flexible and cooperating services that do not require programming, as the business logic is not hard-coded into the system, but appears as tasks in Activity Plans. The Activity Plans can thus accommodate different business models. Further, the Activity Plans contain a well-defined interface, and encompass dynamic rules.

Figure 3:
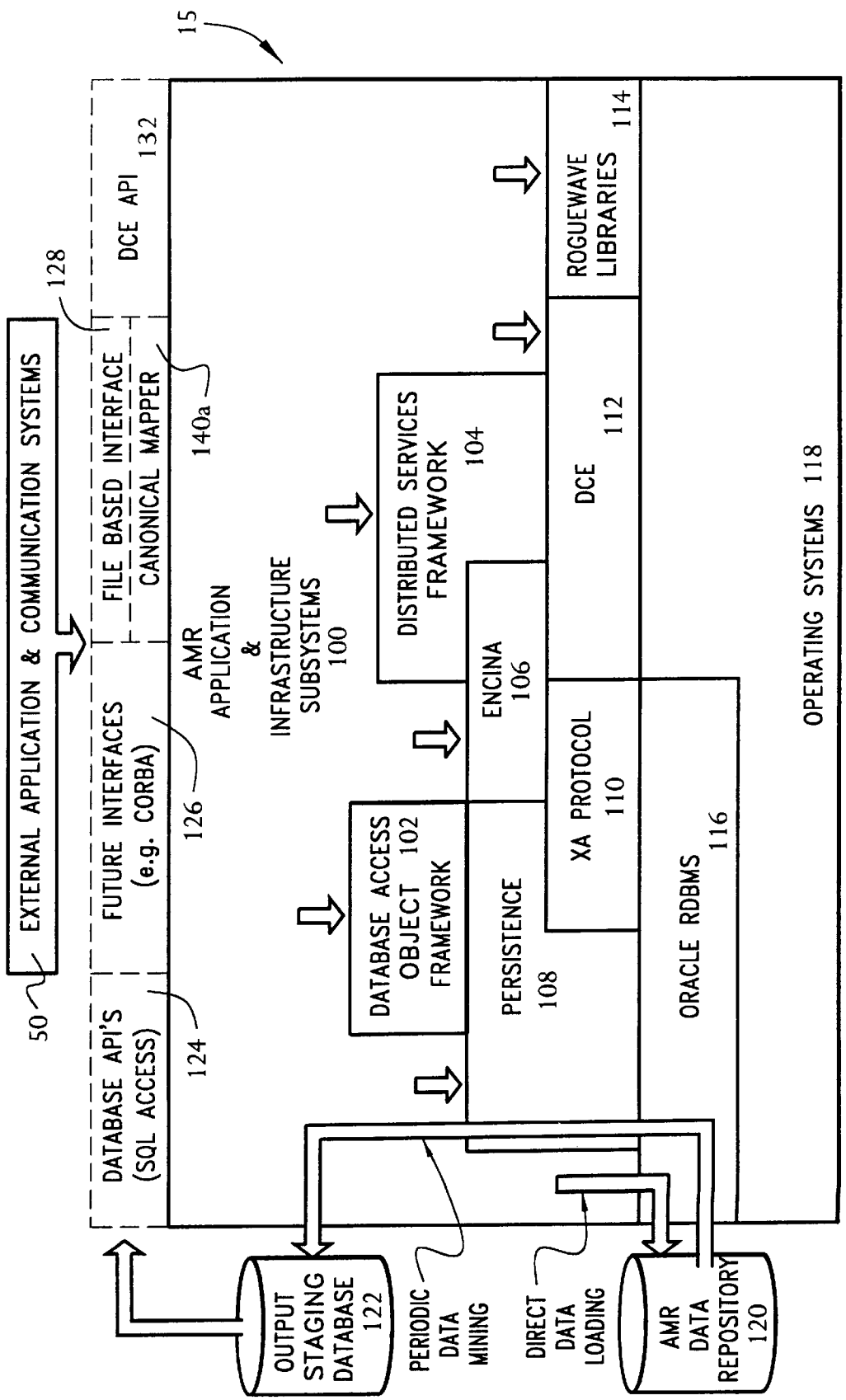
FIG. 3 illustrates the software architecture of the AMR Server including the three-tiered system, middleware products, a database repository and external interfaces.

Referring now to FIG. 3, as part of the three-tiered system, middleware products are used to promote scalability and adaptability in the AMR infrastructure and architecture. For example, middleware products such as the Common Object Request Broker Architecture (CORBA) and Distributed Computing Environment (DCE) 112 may be used. However, it is preferable to use DCE as CORBA does not provide some key capabilities (e.g., Distributed Services, Distributed File Services, Distributed Security, and Transaction Processing support) that are preferably provided in the AMR Server 15. Further, CORBA is a relatively new technology and lacks support for all the major platforms (e.g., PCS to mainframes).

The DCE environment 112 consists of a suite of integrated software services that are part of a computing system's infrastructure. DCE 112 plays an important role in critical areas of computing, such as security, Internet/Intranet computing, and distributed objects. The DCE technology 112 was designed to operate independently of the operating system 118 and networking technology that applications use. As a result, it enables interaction between clients and servers in any environment. As shown in FIG. 3, the DCE technology comprises software services that reside logically "on top" of the operating system 118. These services employ lower-level operating system 118 and network resources to accomplish their tasks.

The DCE services 112 include a Remote Procedure Call (RPC) that facilitates client-server communication so that applications can effectively access resources distributed across a network, a Security Service that authenticates the identities of users and authorizes access to resources using a method for user and account management, a Directory Service that provides a single naming model throughout the distributed environment, a Time Service that synchronizes the system clocks throughout the network, a Thread Service that provides multiple threads of execution, and a Distributed File Service that provides access to files across a network. Each will now be briefly described.

The DCE RPC facility eases distributed application development by modeling distributed processes as a subroutine and the caller of that subroutine. The subroutine is the implementation of the server and the caller of the subroutine is the client. The DCE RPC provides the developer with basic services that the application developer would otherwise have to implement, such as communication facilities required to communicate between the client and the server, mechanisms for the client to locate the server within the network and data transportation across the network, and data conversion from one format to another as needed.

The Distributed Time Service (DTS) serves two major purposes. The DTS service keeps all computers within the network reasonably close to the same time (even if their hardware clocks do not run at exactly at the same rate) and maintains the network nodes connected to a public time service in synch.

The Distributed Security Service (DSS) ensures that services are provided only to designated parties. Security in a distributed environment presents major challenges as users are dispersed at various locations and need to be authorized to access the system. An appropriate level of access is determined for each of the users that are authorized to access the system. Also, the security privileges are verified against the actions the users wish to perform.

The Distributed File Service (DFS) provides the ability for programs to access files located on a file server as if the files were located on the local system's hard disk. The distributed application does not have to know where the files are located or that the files are not located locally on the disk. DFS has a single, consistent, and global namespace for all files, which means that every node in the network identifies the same file by the same name and sees it located in the same directory.

The DCE Cell Directory Service (CDS) provides a reliable mechanism by which distributed applications can associate information with names. The primary purpose of CDS is to allow clients to locate servers. The Cell Directory Service implements a hierarchy of names arranged in a tree structure in which every item has exactly one parent and zero or more children. The CDS provides naming within a local set of nodes called a cell.

Within the distributed environment, transactions are monitored to ensure proper functioning of the system. In the AMR Server 15, Encina® 106 (ver 2.5 or higher), is used to monitor transactions (see FIG. 3). Encina® 106 is a family of products, offered by Transarc® Corporation, for developing, executing, and administering distributed transaction processing systems. A distributed system consists of multiple software components that run in separate independent processes on different machines in a network. Transactions are a tool for distributed systems programming that simplify failure scenarios. A transaction is a set of operations that transforms data from one consistent state to another. This set of operations is an indivisible unit of work, and in some contexts, a transaction is referred to as a logical unit of work. The operations that make up a transaction typically consist of requests for existing data, requests to modify existing data, requests to add new data, or any combination of these requests.

Transactions provide several important properties referred to as ACID (Atomicity, Consistency, Isolation, and Durability) properties. Atomicity refers to the property that a transaction is either successful or unsuccessful. A successful transaction is said to commit. An unsuccessful transaction is said to abort. Any operations performed by an aborted transaction are undone (rolled back) so that its effects are not visible. Consistency refers to the property where each transaction transforms distributed data from one consistent state to another. The application program is responsible for ensuring consistency. Isolation refers to the property where each transaction appears to execute independently of other transactions that are running concurrently. The effects of the transaction are not visible to other transactions until the transaction completes (either commits or aborts). The transactions appear to be serialized, with two or more transactions acting as though one completed before the other began, even though they executed concurrently. Durability, also known as permanence, refers to the property where the effects of a transaction are permanent once completed. Preferably, transactions are used to control and moderate access to a database.

The transactions are monitored by the Encina® Monitor (not shown). The Encina® Monitor provides the infrastructure for building and deploying client/server applications, such as an environment that shields application programmers from the complexities of distributed computing, fault tolerance across heterogeneous environments to provide high performance and transactional integrity, and a comprehensive management environment that enables widely distributed Monitor-based systems to be administered as a single, logically defined system. The Encina® Monitor provides methods for simplifying load balancing and scheduling. These methods include assigning a priority to each application server, multiple processing agents for each application server, and multi-threaded application servers.

Transactions are preferably isolated from one another to prevent other transactions from accessing data that a particular transaction is using until the transaction is complete. This could result in locking the database and preventing other users from accessing the data until the transaction commits or aborts. An important design goal of transactional applications is to complete transactions quickly, unlocking locked data and giving other transactions access to data as quickly as possible. This feature is accomplished via a Recoverable Queuing System (RQS), which will be described below.

The Encina® Structured File Server (SFS) is a record-oriented file system that provides transactional integrity, log-based recovery, and broad scalability. SFS uses structured files that are composed of records. The records themselves are made up of fields. The structured file system is the collection of data managed by a single structured file server (SFS). All access to a structured file system is through a single server, using a special type of open file descriptor (OFD).

As noted above, the AMR Server 15 is an object-oriented system that retrieves and stores a large amount of persistent data. While an object-oriented database or a relational database could be implemented in the AMR Server 15 to store the persistent data, object oriented (OO) databases are new and are not really proven in large distributed systems because they are unable to handle the large volume of data. Relational databases have been established, proven, and implemented for years and since relational database technology entails transactional integrity, locking and concurrency solutions, and distributed databases.

However, it is preferable to use a combination relational database/object-oriented solution in the AMR Server 15. The AMR Server 15 uses a relational database with an object-oriented design on top of the relational strategy. The database preferably comprises Oracle® RDBMS 116, and the Encina® 106 application servers (Meter Manager, Rate Manager, etc. to be discussed below) use the OO design to implement its mapping to the relational data in Oracle. The Oracle® RDBMS 116 shown in FIG. 3 is available from Oracle® Corporation, Redwood Shores, Calif.

In order to address the mismatch between OO development and a relational database, Persistence software (ver 3.4.2 or higher) 108 was selected, as shown in FIG. 3. Persistence software 108 is available from Persistence Software Inc., San Mateo, Calif. Persistence 108 performs object-to-relational mapping which is the tedious translation and mapping from the two-dimensional relational database 120 to the much more complex object structures in the AMR Server 15. Persistence 108 also performs object caching which provides the AMR Server 15 with a "local copy" of the database to improve performance and monitors and updates database changes in the cache. In addition, Persistence 108 provides for database independence which ensures that the database functionality works consistently in the AMR Server 15 regardless of the type of relational database system behind Persistence. This later capability, although not essential, is preferable.

The Persistence software 108 provides a platform-independent, database-independent class library interface to a variety of Relational Database Management Systems (RDBMS). The Persistence software 108 consists of the Persistence Object Builder and the Persistence Object Server class libraries. The Persistence Object Builder automatically generates object-oriented C++ classes for use when building high-performance relational database applications. The Persistence Object Builder creates the Persistence-generated C++ classes based on a database schema designed for the AMR Server 15. The Persistence Object Server class library supports Persistence-generated classes and mediates the RDBMS activity. The generated classes contain derived methods for all common database operations.

The AMR Server 15 preferably accesses the relational database 120 transactionally. Such a capability is provided via Transaction Processing (see XA Protocol 110 in FIG. 3). The relational database management system (RDBMS) 116 or one of the Encina® 106 resource managers (such as SFS or RQS) preferably supports transactional semantics which ensure that if a transaction is aborted, any changes to the database are undone. The XA specification describes what a resource manager does to support transactional access.

Briefly, X/Open, an international standards body, defines the components that interact in a typical transaction processing system. These include the Transaction Manager (TM), which manages distributed transactions and decides whether they commit or abort; the Resource Managers (RM), which store recoverable data; the Communications Manager (CM), which communicates between transaction managers and other components; and the application code. There are also X/Open standards for the interactions between these components. The most commonly-implemented specification is the XA Specification, which defines the interaction between the TM and the RM.

Typically, Encina® 106 acts as the TM, and XA-compliant databases are the RMs. The XA specification defines the interaction between the RM and TM. In Encina® 106, the XA protocol 110 is implemented in the TMXA module. TMXA, in turn, registers callback functions with TRAN to determine when transactions are prepared, aborted, and committed. It also registers callbacks with the "threadTid" module to be notified when a new transaction is present. The XA protocol 110 specifies how the TM interacts with the RM. However, it does not specify how application code interfaces with the RM. Applications programmers using the XA protocol 110 use the TM API to begin and end transactions, and use the RM's native API to access and modify data.

The XA specification 110 is not a network communications protocol, but rather it is a set of functions that are implemented by the RM and called by the TM. There are also some functions implemented by the TM that will be called by the RM. It is important that the TM be able to manage transactions on several RMs at once. So, these XA functions are provided to the TM by a table of function pointers. This structure is called the "XA switch." Defined by each RM, the switch includes function pointers to the functions in the XA API, and flags that specify the exact behavior of the RM.

Referring again to FIG. 3, a Database Access Object Framework 102 and a Distributed Services Framework 104 (collectively called Application Frameworks) are built on top of the middleware products to simplify the use of these products and alleviate the need of programmers to have detailed knowledge of creation of applications that initialize and establish the required environment for these products. The Database Access Object Framework 102 hides the detailed implementation of the database 120, as represented by the Persistence objects, from the application by providing distributed object proxies. The Distributed Services Framework 104, provides classes that hide the details of how to create DCE/Encina® compliant servers (processes). The Distributed Services Framework 104 also shields the application from the underlying communication mechanism (RPC or queued) being utilized.

The Distributed Services Framework 104 comprises several utility classes, including the object store, generic object, blackboard, performer and tag value list classes. The object store is a singleton that exists within the process space of a module. The ObjectStore class is provided to serve as a factory for any object or atomic datatype that has been defined within the ObjectStore class mapping directory. It can create new instances of these objects based on a string representation of the class name of the object to be created. It also provides functionality for casting these newly created instances to the proper datatype, so they can subsequently be sent messages and accessed as if the object was specifically instantiated the objects in the code.

Because the boundaries of communication for the AMR Server 15 are difficult to define, a common mechanism for inter-process communication has been created. This common mechanism is "messaging." Pieces are easily moving into or out of the AMR Server 15 as needs emerge by using a messaging concept for all intra and inter systems communication. Messages are sent to named objects. A third party or "broker" is responsible for delivering the message to the receiver and making sure the return value makes it back to the requester. Commonly, this type of inter-processes communication is described by the CORBA standard. Typically, messages are defined that are supported by all systems and use a common language called the Interface Definition Language (IDL). By building the AMR Server 15 along these lines, this provides for manageable changes to the AMR Server 15 in the future.

The Generic Object class provides some of the dynamic functionality that is similar to a weakly-typed runtime bound environment such as Smalltalk. The GenericObject class is designed to be used as an extension of the ObjectStore. An instance of GenericObject contains a pointer to an instance of a specific type of object, and provides a "wrapper" around this instance.

The Blackboard class uses the framework class ObjectStore, GenericObject and GenericDictionary to provide a heterogeneous dictionary which can be saved to, and restored from, a persistent medium such as a file or relational database. The blackboard may be used as a central repository for shared information used in an existing workflow. The blackboard may also be used to store parameters to be supplied to a task invoked automatically for a scheduler or alarm server. A blackboard is uniquely identified by a number, which is represented in a datatype.

The Performer Class (discussed above with reference to RQS) has its origins in Smalltalk, where weak typing and late or runtime binding are used. However, C++ has a different and opposite ideology. Thus, Performer attempts to resolve this dichotomy by simulating runtime invocation of functions based on a RWCString representation of the function name. Performer is a template class and a specific template instance of Performer is instantiated for each type of class these functions are to be executed on.

Tag value list is a class that encapsulates the concept of a string of tag-value pairs, and provides various functionality for manipulating and extracting information from such a string. The concept of a tag-value list is useful when a function can take a variable and diverse number of parameters that can be more easily realized in a string form of tag-value pairs that may have special meaning within the function.

Each server object in the AMR Server 15 is a subclass of the Distributed Services Framework AppServer classes. The AppServer classes model the concepts of RPC clients and servers as objects. These classes support both synchronous RPC based interfaces and queue-based interfaces. The AppServer class makes the different interface types (RPC or queue-based) largely transparent to the developer. AppServer provides the following generic behavior for all subclasses. AppServer contains methods to support: Interface to trace, logging and error reporting systems, DCE registration and startup (Namespace registration and Security registration), Vendor messages required by a Concern Manager, Initialization of any common objects from startup file (Queue names served), automatically starts thread to read and invoke methods on self from queued messages, opens message and uses service name to map to a method within the object, and Decodes tagValueList to provide arguments.

The AMR Server 15 may have named queues attached to it for asynchronous requests, export interface objects that represent actual RPCs that can be made to the server; where each interface object can be synchronous (RPC based), asynchronous, or both. The server may also need to initialize and connect to resource managers, described below.

The AppServer classes use other utility classes from the Distributed Services Framework 104. As noted above, the Distributed Services Framework 104 contains RQS Queue Management Classes which are classes that encapsulate the RQS concepts in Encina® 106 as C++ objects to reduce the complexity and redundancy typically involved with using RQS. The RQS allows applications to queue transactional work to be completed at a later time. The RQS approach provides several advantages, such as preventing overloading of a queue-fed server when a large number of requests are handed to it. Also, if a server is down, the request is still received and placed in its queue and will be processed when ever the server comes back up. Also, RQS advantageously provides for a transactional queuing service, such that if a request is aborted, it is placed back in the server's queue and not lost.

Each server may be provided with one or more QueueSets. A QueueSet is a collection of one or more queues (i.e., 1 to n number of queues) that are given a priority from 1 to n. Queue class feeds messages through a class to a configurable read pool to eliminate bottlenecking of the queue and overrunning of the number of reads the server would be processing. To perform such a function, The queues are also assigned service levels in inverse order. The priority 1 queue gets a service level of n, priority 2 queue gets service level n-1, etc. Threads are created to service the queues. Also included are Queue Class which are used by servers to enqueue items/actions according to priority/ service level to servers for asynchronous processing. In addition, the QueueElement Class is an abstract base class containing pure virtual functions getaction( ) and getInterface( ). This class assumes that all QueueElements contain an action and an interface name that the action will be performed on.

Figure 8:
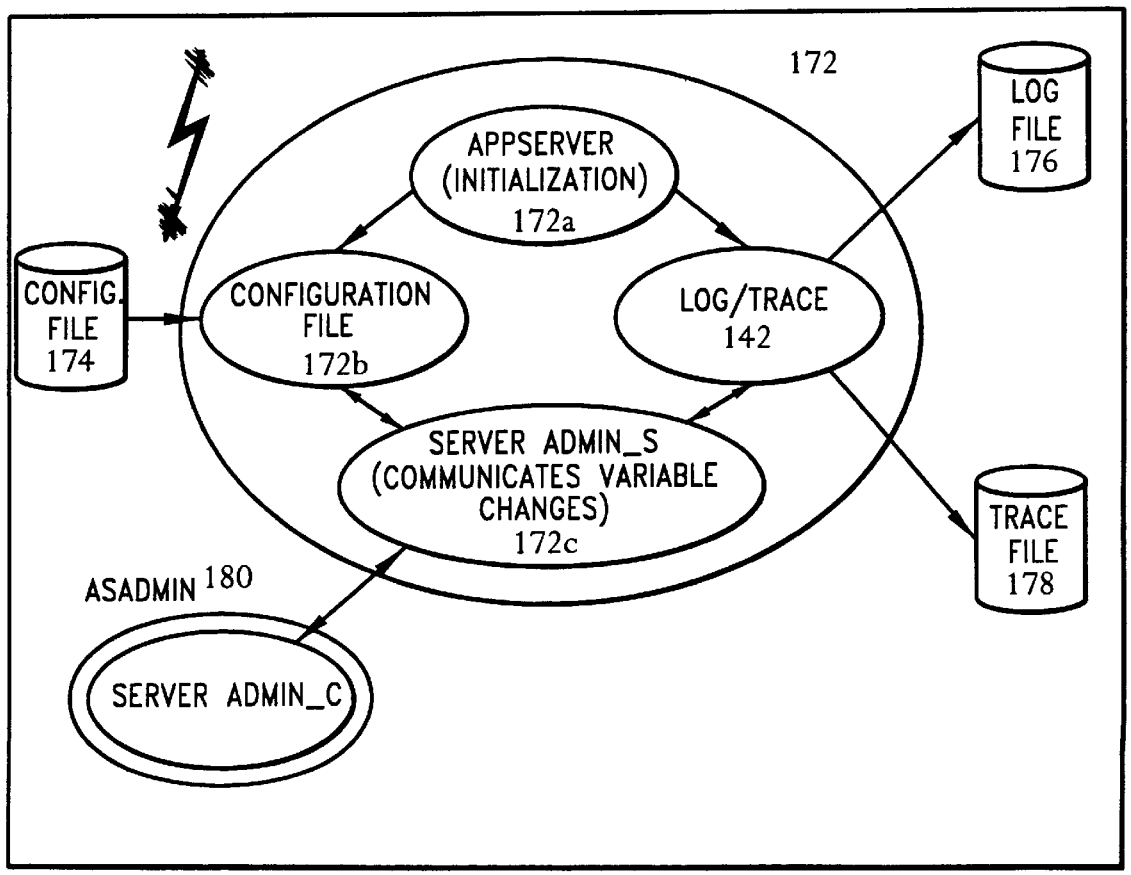
FIG. 8 illustrates a Log/Trace Subsystem.

To increase or decrease the throughput of a server, the number of threads is configurable on a per server basis via a configuration file (e.g., 172b in FIG. 8). When a request comes into a server in the form of a queue element, one of the threads service the queue dequeues the element and begins the transaction. The thread then obtains the interface and service to be invoked from the queue element and messages the for that interface to invoke the function associated with the service name. If the service is invalid, the raises an exception and the thread discards the queue element. If the service is valid, the Performer invokes the appropriate function. When the function returns, the return status is optionally sent back to the requester of the service via a separate queue element where it is processed if necessary.

Referring again to FIG. 3, Application and Infrastructure Subsystems 100 are provided, which include subsystems that lie on top of the middleware products discussed above. The AMR Application and Infrastructure Subsystems 100 both directly and indirectly use the middleware products described above. RogueWave 114, is a class library of pre-compiled software used to assist in the development of common and routine tasks within a system. RogueWave 114 provides many useful services that shield the AMR Server software from the underlying operating system 118. RogueWave 114 is platform independent between different UNIX variants as well as Windows NT®.

FIG. 3 also illustrates several external interface mechanisms that allow the AMR Application Services to interact with the External Application Systems 50. As illustrated, a DCE API 132 is provided that is based upon the DCE RPC mechanism discussed above. The individual RPC APIs provided by the AMR Server 15 will described below. Another interface available to external systems is the File Based Interface 128. The file based interface 128 is provided because RPCs are not designed to efficiently handle bulk exchanges of data, like sending metering data to a billing system. Most billing systems currently use a file-based protocol for receiving billing data, and have specified formats for the billing data file. Currently, there is no standard data format specified for use by billing systems. In view of the incompatibilities in file formats, the AMR Server 15 uses a Canonical Mapper 140a that can convert from any file format to any other file format. The Canonical Mapper 140a builds a map which specifies the required translation to perform the conversion. The Canonical Mapper 140a advantageously allows the AMR Server 15 to quickly adapt to different formats for the data without writing code and recompiling the software.

The final interface illustrated in FIG. 3 is the Database APIs 124. The AMR Server 15 provides the capability to populate the Output Staging Database 122 with data from the AMR Data Repository 120. The Output Staging Database 122 schema is made public to enable external system application developers to produce their own database access routines. The AMR Server 15 does not directly provide the Database APIs 124 depicted in FIG. 3, but the architecture of the system enables these APIs to be developed while maintaining isolation between the business systems and the AMR Server 15. Future interfaces 126, such as CORBA, may be provided as necessary. A provision has been made in the AMR Server 15 for such future interfaces 126.

The loading of data into the AMR Server 15 database is the highest volume task in the system. For this reason, the loading performs bulk imports of data into the database very efficiently. To this end, the AMR Server Data Repository 120 is not directly accessed by external applications. If external applications had direct SQL access to this database, then the AMR Server applications could not be assured these applications would not perform inefficient queries that would lock out sections of the data and consume needed processing power. In addition, if external applications are allowed direct access to the database, then encapsulation is lost and any changes made to the structure of the database need to be coordinated with all external applications that have made direct use of the database. Instead, the AMR Server 15 architecture provides periodic data mining from the Data Repository 120 into another database (see, Output Staging Database 122 in FIG. 3). The structure of the Output Staging Database 122 can remain stable and isolated from the AMR Server 15 applications. As changes occur in the AMR Server Data Repository 120, only the data mining application has to change. External applications can be developed using SQL or other commercially available report generation tools to obtain access to the contents of the Output Staging Database 122.

Figure 4:
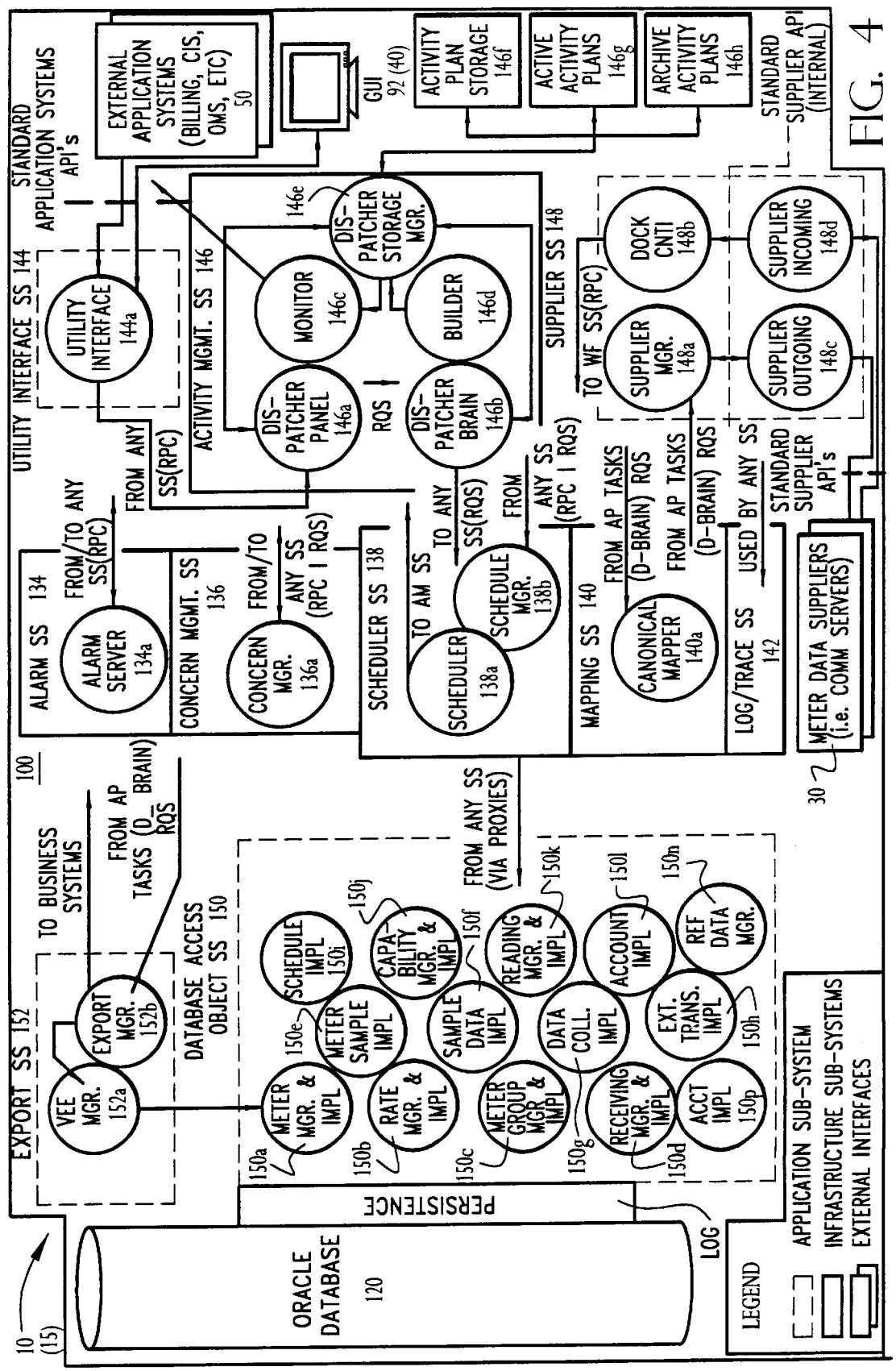
FIG. 4 expands the AMR Application and Infrastructure Subsystem block shown in FIG. 3.

Referring now to FIG. 4, the AMR Server 15 uses independent Subsystems (SS) to accomplish large grained business goals. FIG. 4 expands the AMR Application and Infrastructure Subsystem block 100 shown in FIG. 3 as well as other systems. These Subsystems house specialized services which may be distributed throughout the AMR Server 15. The Subsystems are named to help locate the services within the distributed system, but Subsystems do not have physical boundaries. The subsystems are simply named places (i.e., name spaces) to conveniently group services that collaborate to perform a business goal. Messages are not sent to the Subsystems, but rather to the services (methods, functions, etc.) within the Subsystems. Typically, the services provided by a Subsystem are contained in executables (servers) or provided as class libraries that perform a specific set of services. There may be a single server within a Subsystem (named the same as the Subsystem), or there may be multiple servers in a Subsystem that interact to implement the service(s).

AMR (Software Architecture) Subsystems are divided into two broad categories, shown as the Infrastructure and Application Subsystems 100. The Infrastructure Subsystems provide the services and framework required to support the Application Subsystems. The Infrastructure Subsystems are developed as generic and reusable components. These Subsystems have no knowledge of AMRs' application domain. The Application Subsystems, on the other hand, have detailed and specific knowledge about the AMR domain. These Subsystems implement the AMR application requirements. For example, the AMR domain is concerned with meters 60, rates, accounts, metered data, etc., and the Application Subsystems know how to operate on these entities, and know their relationships. The Application Subsystems can be further subdivided into Support Services, and Data Management Services.

As shown in FIG. 4, the AMR software architecture is composed of the following Subsystems. The Infrastructure Subsystems include Activity Management 146, Scheduler 138, Alarm 134, Concern Management 136, Mapping 140, and Log/Trace 142subsystems. The Application Subsystems include a GUI subsystem 92. As noted above, the Applications Subsystems may comprise Support Services and Data Management Services. The Support Services are a group of subsystems that accept requests, and communicate to systems external to AMR. Support Subsystems include a Utility Interface 144 and a Supplier Interface 148. The Data Management Services store, retrieve, and format the relatively large amounts of data that the system will handle. The Data Management Subsystems include a Data Access Object Subsystem 150 and an Export Subsystem 152.

Each AMR Subsystem is composed of one or more software servers. As noted above, the AMR Server 15 is modeled as a set of cooperating system services and objects encapsulated within servers implement these services. The capabilities of the system are viewed as the combined capabilities of its services. As used herein, cooperating objects accomplish services. The interface to these objects is through their public methods. Many methods may interact to accomplish a service, but only a few are exposed as interfaces to the service. All objects that cooperate to fulfill a service physically live in the process space of one or more servers (processes running apart from the client process on the same machine, LAN or WAN). The client or end user portion of the system will almost never contain the actual objects that provide services. These servers are implemented on top of DCE/Encina® middleware. As such, they are capable of either receiving remote procedure calls (to interfaces exposed through the IDL) or reading requests from queues (Encinal RQS).

Services in the AMR Server 15 are triggered by both RPC calls and queue-fed requests, depending on the nature of the service. Services that access an object in the database and return some attribute or that immediately answer a question, are triggered synchronously via RPC. Services that carry out long operations (such as mapping a list of values) are triggered asynchronously via a queued message through RQS. Some objects may be designed to behave both asynchronously and synchronously for different methods.

Referring again to FIG. 4, the various subsystems illustrated therein will now be described in detail beginning with the Infrastructure Subsystems.

The Activity Management Subsystem 146 houses services that invoke and manage Activity Plans. As much as possible, business logic is abstracted away from the service level into Activity Plans (to be discussed below). The services are reduced to finite business objects that accomplish a single task or service for the system, usually on behalf of a larger grained Activity Plan. As noted above, the Activity Plans may be thought of as a list of tasks or operations that are performed to complete a business unit of work. The tasks themselves do not perform the work, but simply invoke a system service for its task and have information delivered and returned.

Each operation may have nested failover, undo, and final commit operations defined.

The Activity Plan is a decision tree of these operations along with contextual information carried for the flow and available to each operation. The Activity Plan also defines which operations are dependent upon others and thus, which operations can run in parallel. Services within the activity dispatcher instantiate (start) an Activity Plan, negotiate responses and events for Activity Plans, and monitor the current status of all Activity Plans in progress. Activity Plans themselves are scripted outside the coding environment and are easily modified to tailor the AMR Server 15 for a particular client's business requirements. Thus, the business requirements may be easily changed without re-coding the underlying services and objects. The decision process for guiding execution is controlled by a directed graph of business logic encapsulated in each Activity Plan. The Activity Plan object represents a state machine that is self-directed. The dispatcher simply provides the Activity Plan objects an environment in which to execute.

The tasks have the following responsibilities. The first is task sequencing, which determines which tasks can be run in parallel vs. serial. The second responsibility is blackboard management, which holds and manages access to the blackboard for all contained tasks. The third is task state management, which tracks which tasks are in progress. Another responsibility is a next operation which is a directed graph rule-set for determining which task to perform next based on the state of the Activity Plan. The activity plans are also responsible for task logging, which logs the result of tasks as they are completed.

The task is a discrete unit of work in an Activity Plan that is performed by a single service in the system. An Activity Plan task is responsible for precondition processing which predetermines the task's ability to execute based on the availability of required inputs. The task also has Activity to Perform responsibilities which is a unique identifier for the specific operation to be performed by an agent. The agent is a server capable of performing the activity. Tasks are responsible for failover processors, which are a list of operations to perform in the case of failure based on return conditions from executing an activity.

The activity management subsystem 146 acts as a workflow manager within the AMR Server 15. It is an engine that controls business events and contains a knowledge base of business rules that are domain specific. It acts in concert with the Transaction Manager (TM) to coordinate higher level business events such as watching and acting on schedule dependencies within the unit or controlling an event with a legacy system.

An example of a controlled legacy event would be a case where the Billing System requests a route to be read within three days. The application would request a workflow called, for example, a ReadRoute. The Work Flow Manager (WFM) uses a dictionary of predefined workflows to determine the prerequisites for the business flow and all required operations that comprise the workflow. Each of the operations in the workflow are autonomous but operating either serialized or in tandem with other operations. Each operation performs some atomic unit of work (or another WF) in the system and reports its success or failure back to the WFM. Each operation can have failover clauses that allow for error recovery or cleanup.

In short, the business rules used by the WFM are preferably the primary mechanism for building functionality in the AMR server 15. Little to no changes should need to be made in the general application set. Each of the systems within the AMR Server 15 responds to messages sent by operations. All intra-system data is communicated via objects to ease state maintenance. Each operation is checkpointed or stored as it sleeps between state changes in the database 120.

The Activity Management Subsystem 146 Servers will now be described. In order for Activity Plans to flexibly control system actions, the system is modeled and implemented as a cooperating set of medium to low-level services. The services are grouped and serialized to perform business operations. The grouping and control of the service execution (to accomplish a specific high-level business task) is the job of the Activity Plan object.

Activity Plan instances are named, for example, by the business unit of work they accomplish and contain an ordered list of tasks that interact with individual services in the system. Task instances are named for the service they invoke and know their prerequisites and possible alternate cases in the event of service failure. To support the execution of business logic through Activity Plans, a support structure for building, dispatching, logging, monitoring and routing are assembled. This Subsystem consists of a set of five servers to perform these tasks. They are illustrated in FIG.

3 as the Activity Plan Builder 146d, Dispatcher Panel 146a, Dispatcher Brain 146b, Dispatcher Storage Manager 146e, and Activity Plan Monitor 146c. The servers will now be described. The Dispatcher Panel 146a, Dispatcher Brain 146b and the blackboard object comprise the Activity Plan Dispatcher.

The Activity Plan Builder 146d is provided because Activity Plans are not useful objects immediately after instantiation. They are constructed and passivated for later use because Activity Plans are the objects that manage a set of tasks to perform a unit of business work. In addition, the Activity Plan object itself is simply a manager and container for the tasks that get the work done. An ordered collection of tasks are constructed and assigned to the Activity Plan before it is useful.

The tasks use the data-exchange object Blackboard, which is initialized prior to use. To accomplish this, a tool is used to build and manage a dictionary of useful tasks, initialize blackboard slots, and assemble Activity Plans. The Blackboard object provides methods for creating, accessing, updating and deleting blackboards and slot contents within blackboards. All blackboards are stored as a streamed object (blob) keyed by a unique identifier. When used in conjunction with Activity Plans, the unique identifier matches the Activity Plan ID with its associated Activity Plan. When used for Activity Plans, the blackboard object has predefined slots required to communicate information among the various Activity Plan tasks. Each task in an Activity Plan retrieves inputs from predetermined blackboard slots, and places outputs into other predetermined slots. The blackboard is stored in another persistent store labeled with the name of the Activity Plan. An Activity Plan object is built with the same name as the blackboard's, describing the business unit of work to perform. The user then uses the builder to populate the named Activity Plan with the required tasks.

The Activity Plan Builder 146d is a developer tool comprising a front-end graphical user interface (GUI), controller, and domain objects capable of being stored persistently and used by the Dispatcher. The Builder allows for ease of constructing tasks and storing them in a dictionary for easy insertion into Activity Plans. In the same manner, Activity Plans should be constructed through the Builder 146d by selecting tasks from the dictionary, validating that static prerequisites are fulfilled, and inserting into the list of tasks contained by the Activity Plan. All Activity Plans are stored in a dictionary used by the dispatcher to copy into execution upon request. The Builder 146d is used in the development cycle to instantiate task objects that will be used in one or more Activity Plans. The builder stores tasks in a persistent dictionary by the name of the task. The builder 146d also prepares a blackboard object for the Activity Plan. Preparation of the blackboard is a matter of predefining slot names and initializing values. The builder 146d is also an editor. It is capable of easily allowing the user to reference a stored task, blackboard, or Activity Plan and change its contents.

Figure 29:
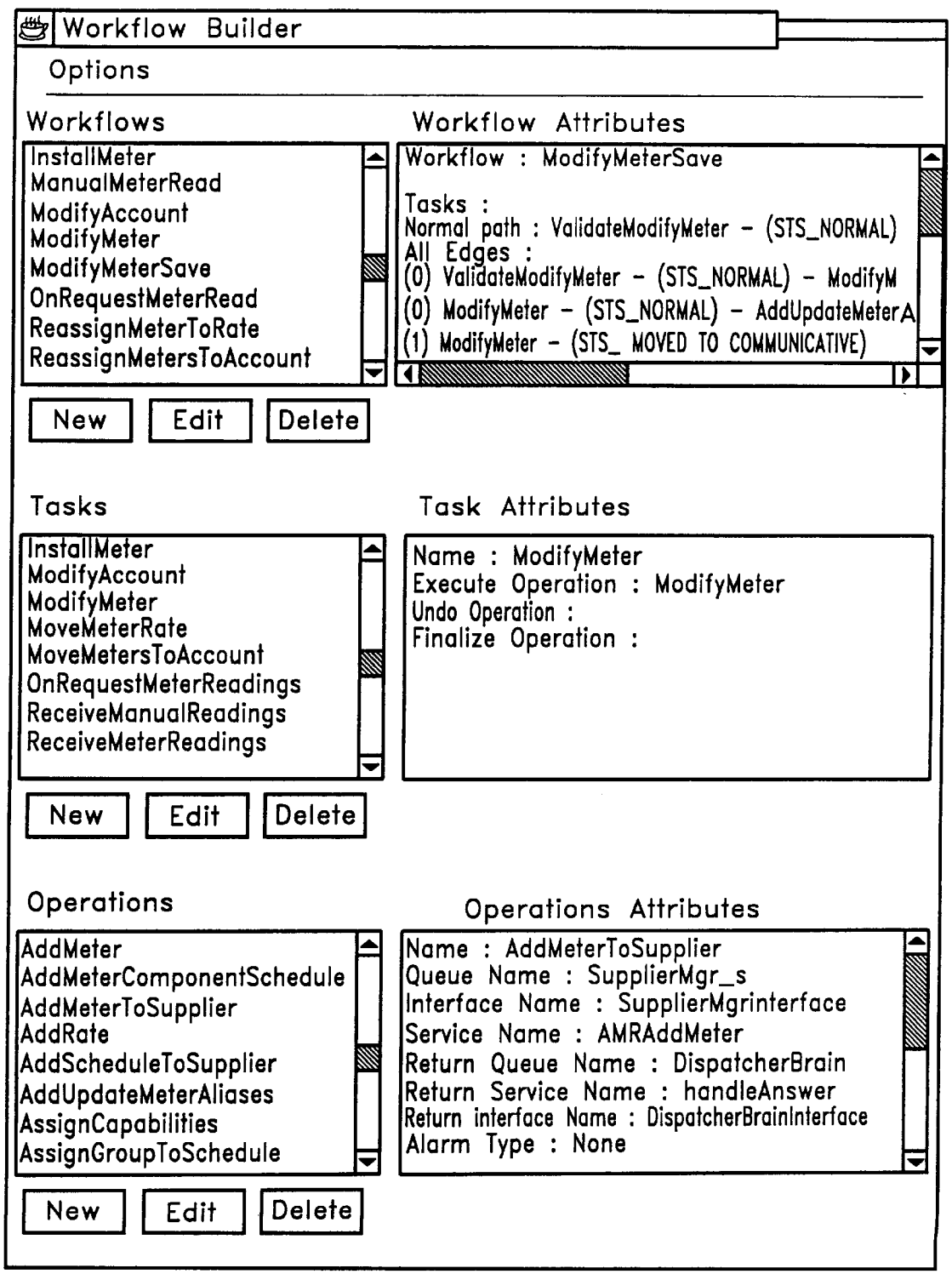
FIG. 29 illustrates a main screen of the activity plan builder in accordance with the present invention.

Referring to FIG. 29, there is illustrated the main screen of the activity plan builder 146d. As illustrated, the entry screen of FIG. 29 provides the user with the capability to view, edit and delete existing workflows, tasks and operations in addition to creating new ones. The attributes for each workflow, task, and operation are listed beside each item. As can be seen from the Workflows illustrated in the top panel, the workflow attributes contain tasks (e.g., the ModifyMeterSave workflow contains the task ModifyMeter).

Figure 30:
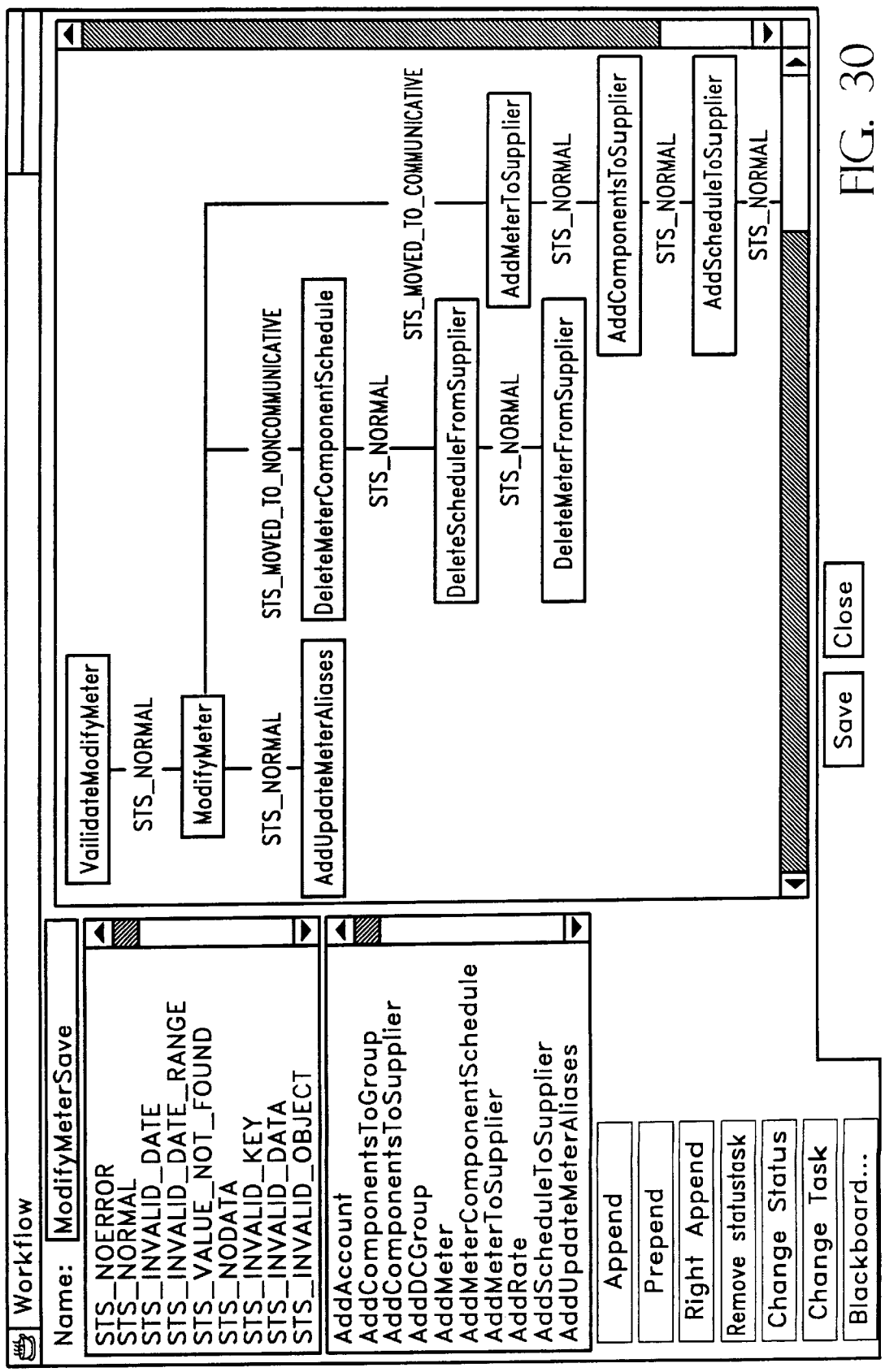
FIG. 30 is a graphical representation of the various paths available for a. particular workflow.

FIG. 30 is a graphical representation of the various paths available for that particular workflow. This screen is accessible from the main screen shown in FIG. 29. In this example, a ModifyMeter workflow is illustrated with three main paths of execution. The first is a Normal path (STS_NORMAL) which translates into a simple update in the database 120. The second is a Move to Non-communicative (STS_MOVE_TO_NONCOMMUNICATIVE), which lists required tasks that must complete in order to successfully run workflow. The third is a Move to Communicative (STS_MOVE_TO_COMMUNICATIVE), which lists required tasks that must complete in order to successfully run workflow. Traversing of various paths (decisions) is based on statuses returned at each individual decision point. If each task within a workflow completes successfully, the final branch returns to the AddUpdateMeterAliases task at the end of the first decision tree.

Figure 31:
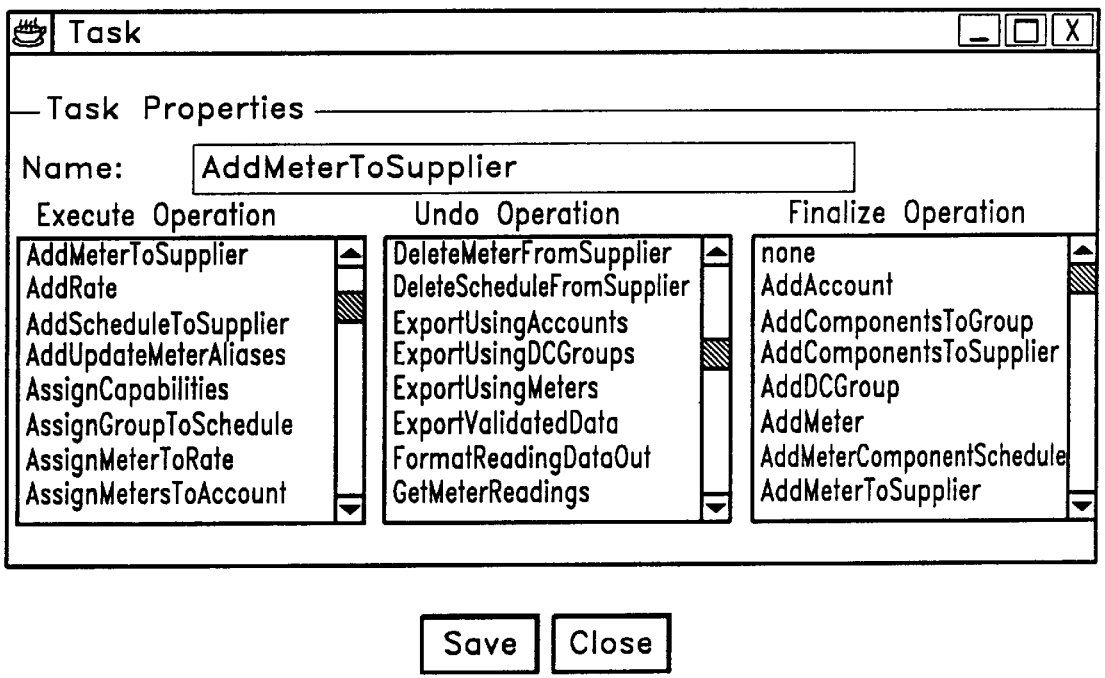
FIG. 31 illustrates a modifying a particular Task to execute, undo, or finalize an operation.

FIG. 31 shows how a particular Task from the main screen of FIG. 29 can be modified to execute, undo, or finalize an operation. In an undo, the operation reverts to a previous task and a previous state in order to resolve failure conditions. Finalizing an operation performs clean-up operations for any operation that was initiated in a task by, e.g., deleting files, etc.

Figure 32:
FIG. 32 illustrates modification of an operation.

FIG. 32 illustrates how an operation can be modified. The following fields are used in the modification:

Name—Name of the Operation;

Queue Name—Queue assigned to Manager (Server) responsible for the operation;

Interface Name—DCE Interface that contains the method for the operation;

Service Name—Method used for the Operation;

Return Queue Name—Queue name for return results of operation;

Return Interface Name—DCE Interface for return operation; and

Return Service Name—Method used for the Return Operation.

Figure 33:
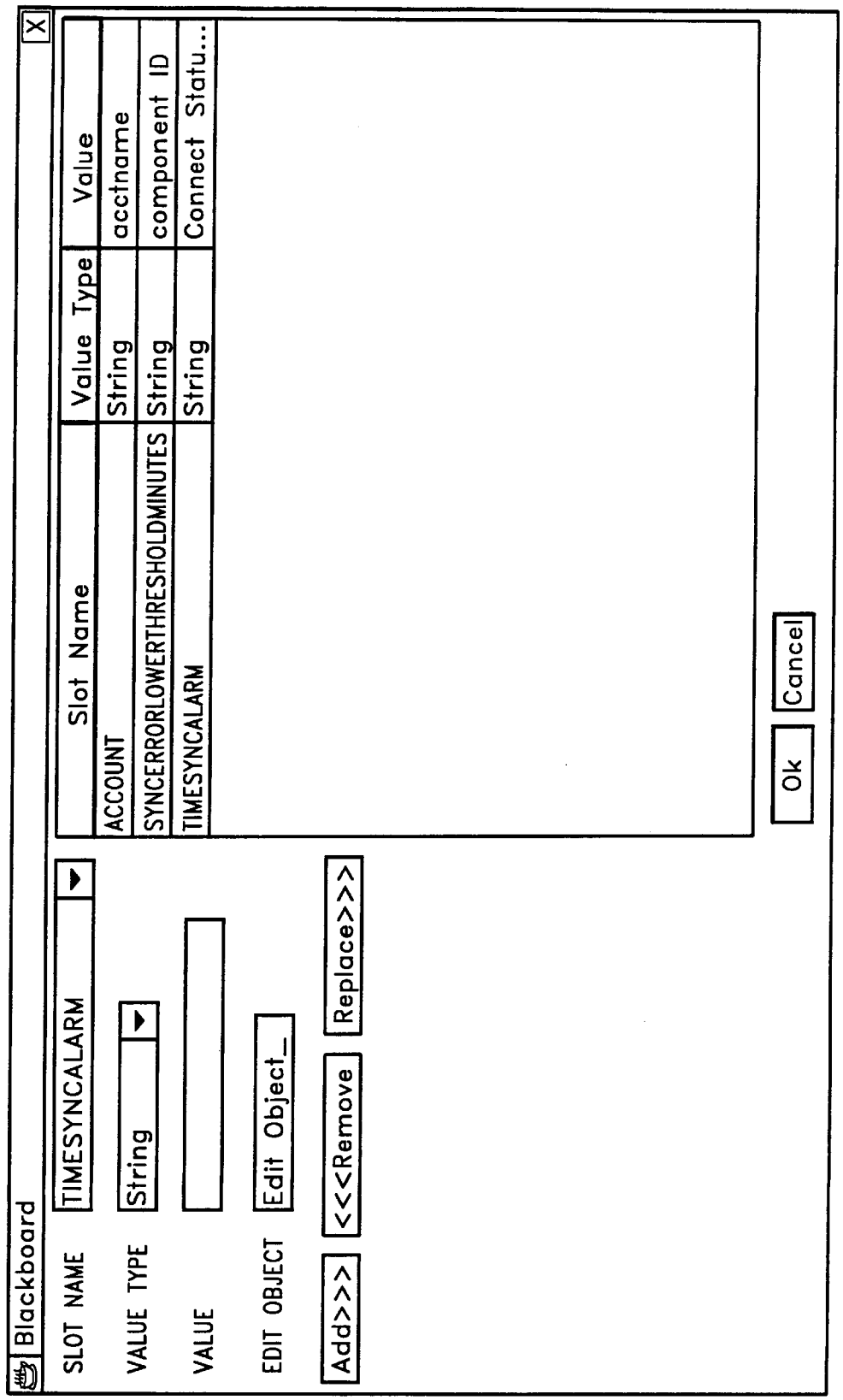
FIG. 33 illustrates slot names within a blackboard object that contain the specific value types used to execute the operations.
Figures 34C, 34D:
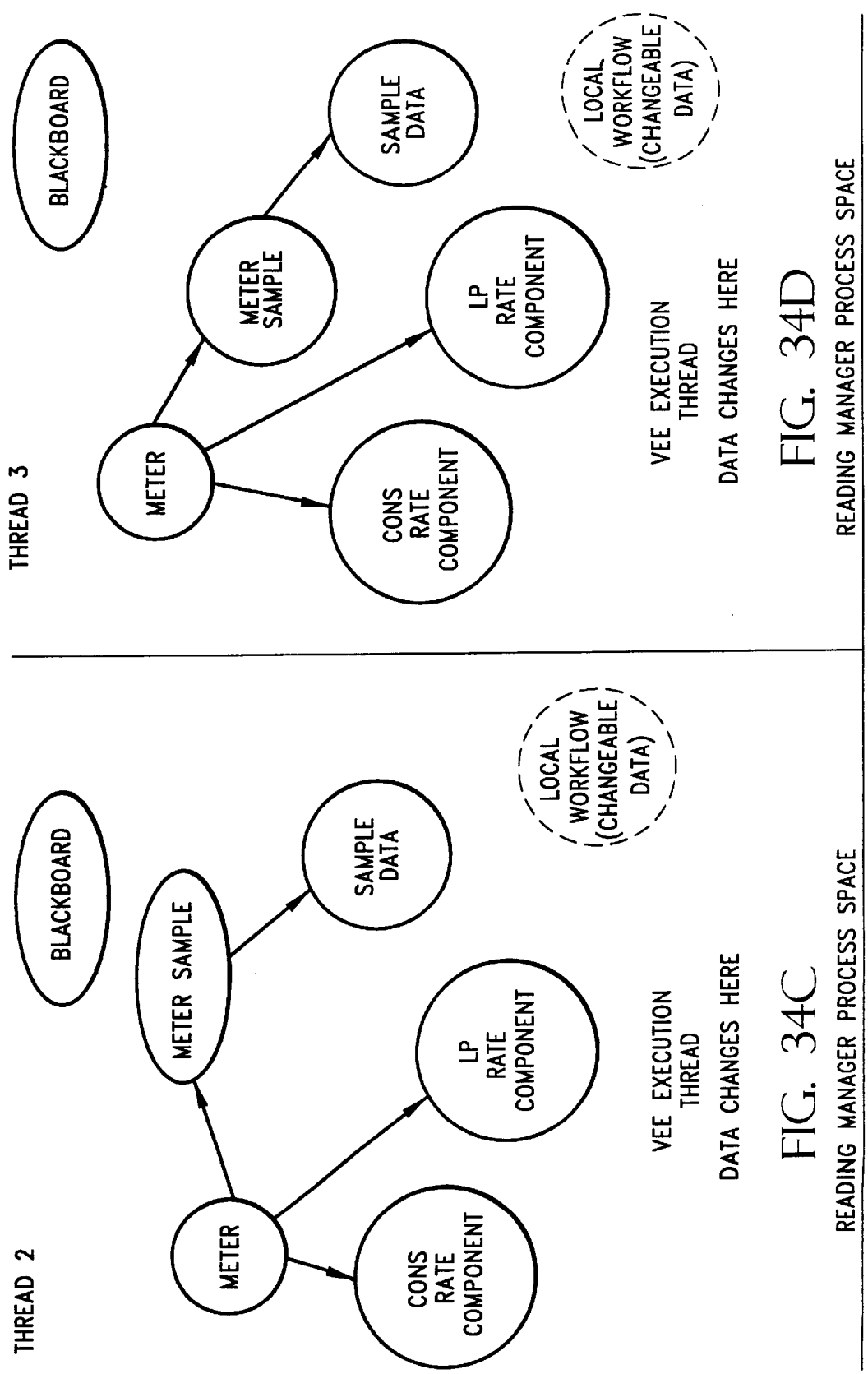

FIG. 33 illustrates the slot names within the blackboard object that contain the specific value types used to execute the operations.

The Dispatcher Panel (DPanel) 146a instantiates Activity Plans by name and initiates processing. This server handles requests for starting Activity Plans and fields requests for current status and obtaining results from completed Activity Plans. DPanel 146a has an API used by requestors to begin Activity Plans and to receive results of finished Activity Plans. DPanel 146a may also be called to inquire as to the state of a Activity Plan. All DPanel 146a calls are synchronous. By request, DPanel 146a instantiates a named Activity Plan from the Activity Plan storage area, along with its associated Blackboard, both with a unique identifier but does not run it. Activity Plans are instantiated and passivated using the Dispatcher Storage Manager 146e, keyed by Activity Plan identifier. After passivation of the new instance in the active Activity Plan area, DPanel 146a sends a message through RQS to DBrain 146b (described below) using the Activity Plan identifier. DPanel 146a can then process requests for status or results.

Activity Plans themselves are instantiated objects, and outside of a process space (except in CORBA environments) are unable to receive messages themselves. Therefore, they are invoked and managed by a process. In the case of a DCE environment 112, a RPC/Queue server receives and dispatches all communication between other system objects and the Activity Plan(s). This server is called a Dispatcher Brain (DBrain) 146b, which runs Activity Plans and handles responses from other servers sent to active Activity Plans.

DBrain 146*b* is messaged primarily through the RQS server. The sole function of DBrain 146*b* is to run Activity Plans and route responses from other servers to an appropriate Activity Plan where tasks within an Activity Plan (run in DBrain's 146*b* process space) send queued messages to other servers. Individual plans may receive priority in activation based on dynamically set priorities. During processing, Activity Plans are passivated when dependencies prohibit the next task to run, and can be re-activated by the DBrain 146*b* when the dependent task(s) complete, upon receipt of an event notification (Concern Manager 136), and when Activity Plans mature (i.e., timer expiration).

DBrain 146*b* is a vendor of special events called Activity Plan state changes. The Concern Manager 136 has a corresponding special interface for requesters to request state change information by Activity Plan identity, either a specific instance of an Activity Plan, or all Activity Plans with a given name. The special events DBrain 146*b* can vend are Activity Plan Start, Abort and Finish. DBrain 146*b* is responsible for both logging the operations and parameters of an Activity Plan and for debugging. As each task begins and ends, a log entry is written. The log entry contains the Activity Plan state and blackboard contents (in their entirety or selectively) at each step.

The Dispatcher Storage Manager (DStorageMgr) 146*e* is used to control access (add, update, read, etc.) to the persistent Activity Plans. The DStorageMgr 146*e* is used concurrently by the Dispatcher Brain 146*b* and the Monitor to prevent collisions while accessing the Activity Plans. The DBrain 146*b* server uses the storage manager to maintain the activity state persistently across system shutdowns and Dispatcher failures.

Many Activity Plans can be active in the system at a time, and may operate for hours or days. It is important to be able to monitor the state or status of any and all Activity Plans. The Activity Plan Monitor (APM) 146*c* shows a user the state of any Activity Plan by name, or by selection. The monitor 146*c* does not examine the log but only knows the current state of the Activity Plan as it is represented in the database. It monitors the state of active Activity Plans and allows examination of completed and aborted Activity Plans from the Activity Plan Archive.

Referring again to FIG. 4, a Scheduler Subsystem 138 manages the building and execution of schedules for the AMR Server 15. Schedules are used to control the time-based execution of work within the AMR Server 15. Schedules can be recurring, specified, start time-activated, or finish time-activated. The Scheduling Subsystem 138 provides a single point of database access for creating, retrieving, and updating of schedules. In addition, the Scheduling Subsystem 138 executes scheduled activities at the proper time, and optimizes the execution of scheduled activities to avoid conflicts, missed deadlines, and redundant work. The Scheduling Subsystem 138 is provided to accommodate changing business requirements. It also maintains portability of core objects so that components can be shared with the Scheduling Subsystem 138 in the Supplier System 148.

Schedules within the AMR Server 15 do not perform the work; instead, the schedules control the activation of the work. As noted above, the work within the AMR Server 15 is typically controlled by an Activity Plan that is initiated by the Scheduling Subsystem 138. Schedules in the AMR domain are used to control the delivery of data from suppliers to the AMR Server 15 based upon business activities such as billing export or other data export from the AMR Server 15. Schedules also control other tasks like the loading of the Output Staging Database 122 (FIG. 3), and report generation.

The object model for schedules may have, e.g., a ScheduleTask class at the top. The ScheduleTask class handles any external schedules from the business world. A subclass of the ScheduleTask class may be defined that handles the detailed entities that contain data for those schedules (e.g., meters 60, accounts, etc.) A schedule has several aspects, i.e., what to do, when to do it, what objects to perform the action on, and why this action is being performed. The ScheduleTask object may contain two component objects, e.g., ScheduleEvent that represents what to do, and ScheduleTime that represents when to do it. The set of objects on which to perform operations may be represented by an association with a MeterGroup object.

In the AMR Server 15, a schedule may exist, for example, because data is to be exported to a utility, or because data is to be made available in the AMR database 120. The scheduler 138 may also handle complex timed execution of other operations, or may simply indicate the expected arrival of data from a supplier. In the latter case, there is no expected action for AMR. It is noted that the AMR Server 15 keeps receive schedules because the AMR Server 15 maintains what has been given to the suppliers, and because these schedules represent a constraint on the start times of related AMR actions.

Referring again to FIG. 4, the Scheduler Subsystem 138 has two main servers, the Schedule Manager 138*b* and the Scheduler 138*a*. The Scheduler 138*a* and Schedule Manager 138*b* interact primarily with each other, the database 120, the Activity Management system 146, and an Alarm service 134. The Schedule Manager server 138*b* handles the creation, updating, and retrieval of schedules to and from the database. The Schedule Manager 138*b* preferably utilizes Data Access Object (DAO) proxies (to be discussed below) to interact with the Schedule Implementation Server of the DAO Subsystem 102 to perform all database operations. Activity Plans and other subsystems that create and use schedules will interact with the Schedule Manager 138*b*. Additional server processes that implement distributed objects for the schedules may supplement the Schedule Manager 138*b*.

The other aspect of the scheduling system is the Scheduler server 138*a*, which is responsible for starting the execution of scheduled activities. The Scheduler 138*a* retrieves schedules through the Schedule Manager 138*b* and organizes plans of execution. At appropriate times, the Scheduler 138*a* initiates Activity Plans to perform the scheduled operations. The major incoming stimuli to Scheduler 138*a* are notices from the Schedule Manager 138*b* that schedules have changed, and alarm calls from the Alarm Subsystem 134. Outgoing stimuli are all Activity Plans. The Scheduler 138*a* also saves some private persistent objects in the database 120.

The Scheduler 138*a* server uses the schedules supplied by the Schedule Manager 138*b* to build and execute activity plans that drive data collection and export actions. Most commonly used activity plans are built to schedule the generation of billing reports and other resource intensive tasks that must complete within a certain window of time. The Scheduler 138*a* obtains the average time to process schedule items, and then determines a number of jobs scheduled for a given work plan. The Scheduler 138*a* adjusts estimates appropriately to schedule a job to begin with a starting time and starting event so that the job can complete within the deadline window.

A constraint on the Scheduler 138*a* is the need to adjust for real world influences that cannot be accurately predicted. In order to schedule a job, the Scheduler 138*a* needs to determine how long it will take. However, the execution time can only be estimated at best; it will change from day to day and likely will change as the number of associated meters 60 changes. The execution time will also vary based on how heavily loaded the AMR Server 15 is. If a new schedule is added that executes at the same time as an existing schedule, times need to be adjusted to account for the load. Important AMR schedules are constrained by matching schedules with the supplier, for example, the AMR Server 15 cannot start exporting data until the data has reached AMR 10. Therefore, the scheduler 138*a* allocates some room when creating supplier schedules, and new schedules will have to defer to seniority for choice execution times.

The Scheduler 138*a* contains several heuristic-tuning parameters for adjusting estimated execution times. The parameters are set and changed by the configuration file interface used by AMR Server 15. The core classes implementing the Scheduler 138*a* are designed to be generic, and independent of the application domain and of the implementation platform.

The Scheduler 138*a* may use several important classes to build and execute activity plans. For example, ActivityPlan may be used, which translates the time specification algorithms of schedules, describing multiple executions, into specific jobs with specific start times. In order to keep the scheduling code portable, there is provided three classes that isolate system dependencies, the Schedule Builder, Schedule View, and Work Plan Agent. The process operates as follows. The Scheduler class implements an Encina® 106 interface. The interface then makes method calls to the ScheduleBuilder class, which should be platform-independent. ScheduleBuilder uses a ScheduleView object to retrieve and filter the schedules. Database access dependencies are preferably handled by ScheduleView and kept transparent to ScheduleBuilder. Once the ActivityPlan is constructed, ScheduleBuilder hands the ActivityPlan to an ActivityPlanAgent for execution. The agent handles persistent storage for the plan, and the details of setting and responding to alarms and initiating the actions.

Figure 5:
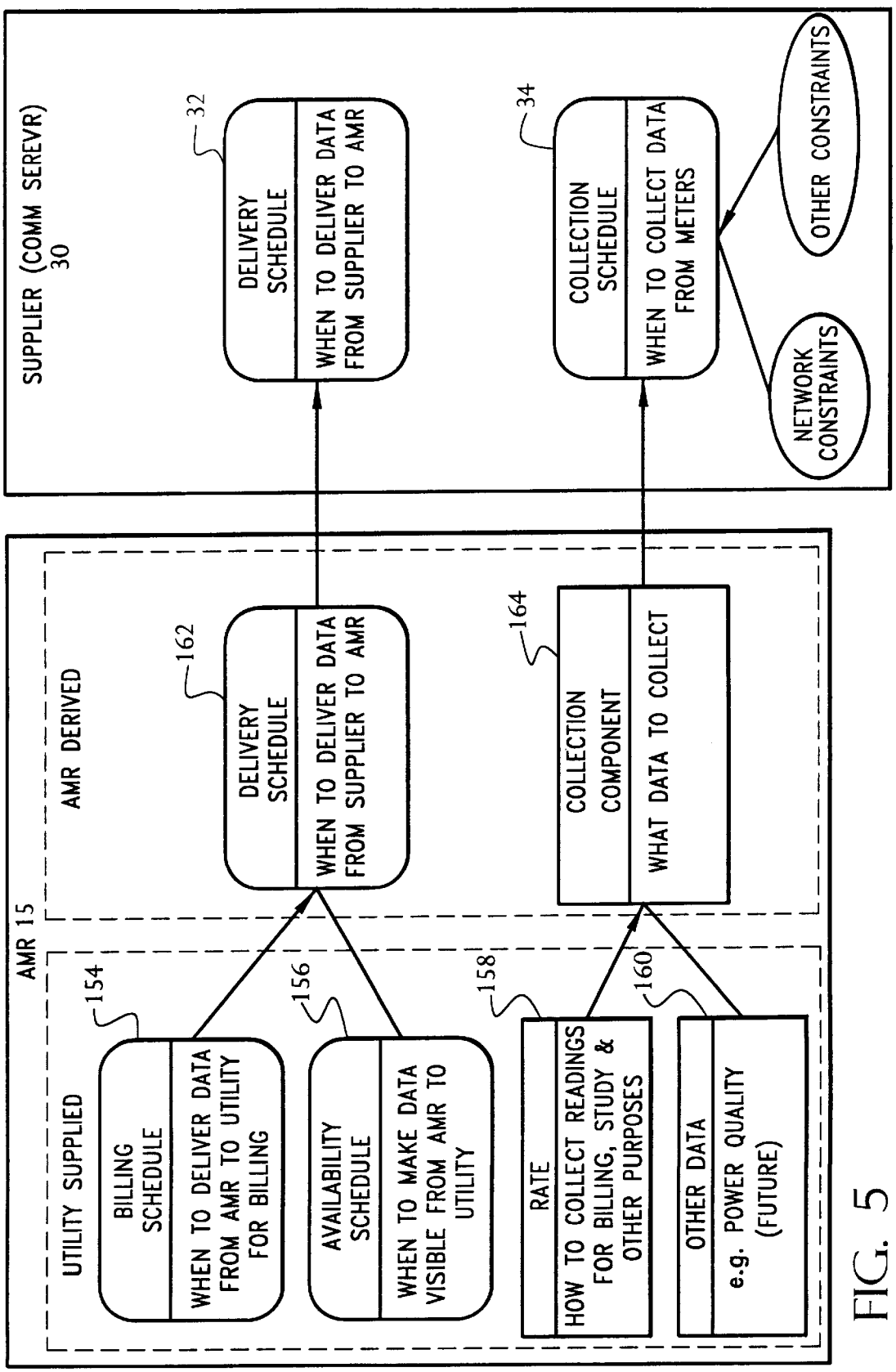
FIG. 5 illustrates the relationship of a delivery schedule to a Schedule Subsystem.

FIG. 5 illustrates the relationship of a delivery schedule 162/32 to the Scheduler Subsystem 138. The delivery schedule 162132 notifies the supplier 30 when to deliver data to the AMR Server 15 in a recurring manner. The delivery schedule 162/32 is owned by the AMR Server 15 and is the consolidated schedule of billing and availability schedules supplied by the utility. The billing schedule 154 determines the timing of data delivery from the AMR Server 15 to the utility for billing. The availability schedule 156 notifies the AMR Server 15 when to make the reading data available (or visible) to the utility. Both billing 154 and availability 156 schedules are created by the utility; however, the AMR Server 15 will keep the schedules in its database. The AMR Server 15 derives the delivery schedule 162/32 by taking the most restrictive timing from the billing 154 and availability 156 schedules. For example, if the billing schedule 154 is once per month (the last day of the month), and the availability schedule 156 is daily (for increased customer service), the AMR Server 15 will choose a daily delivery schedule 162/32 in order to meet billing and availability requirements.

A collection schedule 34 determines when to collect data and what type of data to collect. The AMR Server 15 provides the supplier with collection component information 164, i.e., the collection type and the load profile interval. The collection component 164 is based upon the rate 158 and other data requirements 160 (e.g., power quality) supplied by the utility. The AMR Server 15 does not inform the supplier of the timing of data collection since it is assumed that the supplier has a superior understanding of the communication network and other constraints. It is also noted that the delivery schedule 162/32 from the AMR Server 15 should be used to derive the collection schedule 34.

Schedules may be specialized into two types: Delivery Schedules and Receiving Schedules. Delivery Schedules specify when the AMR Server 15 is to deliver the data for the grouped meters 60 to external Application Systems. Billing schedules and data export schedules are examples of Delivery Schedules. Receiving Schedules specify when the data is to be received from the Communication Servers 30 (suppliers). Receiving Schedules are derived by the AMR Scheduling Subsystem from Delivery Schedules.

The AMR Server 15 preferably uses several data structures to transfer data and schedule/collection information between the AMR Server 15 and Communication Servers 30. The structures encapsulate the data required by the supplier API to allow for maximum flexibility and future expansion.

Referring again to FIG. 4, there is shown the Alarm Subsystem 134. The Alarm subsystem 134 receives requests for timed messages. The Alarm Subsystem 134 maintains a list of wake-ups for any requester in the system. The wake-up is stored with a message to send back to the requester when predetermined time expires. Activity Plans and the Scheduler Subsystem 138 most frequently request the services of the Alarm Subsystem 134.

The Alarm Subsystem 134 is comprised of a single server, the Alarm Server 134*a*. The Alarm Server 134*a* is designed as an Encina® server, and will use the Distributes Services Framework 104, described above, for its implementation. This service is preferably concurrent (multi-threaded) in order to support multiple clients concurrently in setting and processing alarms. The Alarm Server 134*a* may provide both synchronous and asynchronous interfaces to its functions. Requests will be transactional, in that if an operation fails for whatever reason, it will have no effect. All active Alarms managed by this service will be stored persistently through their life-cycles, which will allow the Alarm Server 134*a* to restore its state in event that it is shut down and restarted while active Alarms exist.

When an Alarm occurs, a callback is made to the subscriber via the asynchronous interface provided by, for example, the Queueutil library. If the Alarm was set with any information, this will be passed with the SOQueueElement back to the subscriber. Optionally, the Alarm Server 134*a* will support a callback mechanism using synchronous RPC for those subscribers that do not read from a queue.

Referring again to FIG. 4, the AMR Server 15 is also provided with a Concern Management Subsystem 136. The Concern Management facility 136 is a set of services providing distributed event management for other entities within the system. The entities may be either a "vendor" and/or "requester." A "vendor" is something that can provide notification of an "event," or more generically, something that can provide (vend) a particular item. The term "event" is used within the written description to mean the occurrence of one or more specific and well-defined circumstances that can be tangibly detected and described. A "requester" is something that has an interest or concern in an item that can be provided by a vendor, and usually wants to obtain the item or in the case of an event, be made aware of its occurrence. It is noted that a particular client of the Concern Management service 136 can be both a vendor and a requester, much like a server can also be a client in the RPC world. This design attempts to advantageously solve the problem of how to allow requesters to express a concern for particular events and vendors and forward these events to any concerned requesters in a distributed system of interacting services.

The above implies a process/server/device that tracks which vendors can provide specific events and which requesters have concerns for these events. The Concern-Manager 136a is a centralized service that coordinates the above-noted interaction. This relieves the burden on vendors to manage interaction with their requesters. The vendor will communicate all event information to a central service. Requesters need not know which vendor(s) can provide specific events, but only know the event types that can be provided. From the Requester's perspective, it simply notifies this central service that it is concerned for a particular event, and the concern manager forwards any occurrences of this event back to the requester. From the vendor's standpoint, it simply notifies the central service of any event it can vend, and forwards them on. to the central service when they occur. To be efficient, the central service can notify a vendor when it needs to begin forwarding events, since there is no need to forward a specific event if no requesters are concerned with the event.

The Concern Management Subsystem 136 is comprised of one server, the Concern Manager 136a. The Concern Manager 136a is designed as an Encina® server, and uses the Distributed Services Framework 104 as the basis for its implementation. This service is preferably concurrent (multi-threaded) in order to support multiple clients concurrently in managing concerns and events. The Concern Manager 136a will provide both synchronous and asynchronous interfaces to its functions. Requests will be transactional, in that if an operation fails for whatever reason, it will have no effect. All active Concerns managed by this service will be stored persistently through their lifecycles, which will allow the Concern Manager 136a to restore its state if it is shut down and restarted while active Concerns exist.

The Concern Manager 136a is responsible for accepting concerns from requesters and retaining a mapping of the concern. This map contains enough information to make a callback to the requester at a later time with notification of the event if it occurs. The Concern Manager 136a provides an interface for vendors to register what events they can produce and callback information to enable and disable forwarding of these events.

At startup, all vendors register the events that they can produce. Vendors register each type of event separately. The vendor will provide the event type and enabling and disabling callbacks. Event reporting is considered disabled for a vendor until the Concern Manager 136a receives a concern for a particular event. The Concern Manager 136a then makes the enable callback to any vendors that have registered that they can provide this particular type of event. Whenever this event occurs within the context of an enabled vendor, the vendor forwards the event to the Concern Manager 136a to be handled.

On the requester side, requesters register concerns for each event separately. The request consists of the event name and a callback in the requester to notify it when such an event occurs. When a vendor forwards an event matching a type that a requester is concerned for, the requester is notified via the callback of the event occurrence. Requesters explicitly withdraw concerns for events. Callbacks can either be provided through the queue of a requester or vendor; or for non-queuing servers (i.e., DCE only/non-Encina), through a synchronous callback interface.

To assist in integrating other servers in the system with the Concern Manager 136a, the Distributed Services Framework 104 is utilized which allows the developer to model the server as a Vendor and/or Requester and use the respective member functions just like other server member functions.

Referring again to FIG. 4, a Mapping Subsystem 140 provides services that allow easy customization of file formats for exporting data from and importing data to the AMR Server 15. The mapping subsystem comprises the canonical mapper 140a, which is included to enhance the customization of the AMR Server 15. The purpose of the Canonical Mapper 140a is to produce maps that can be used to map information across subdomains. The mapper assumes that there are at least two subdomains mapped in which to transfer information across. Both subdomains are mapped under the same root domain. The user invokes the Mapping tool rather than the Map Builder to create a utility capable of transforming information from one selected subdomain to another. The User Interface is simple. It displays all maps in two lists and allows the user to select one map from each list. One list represents the subdomain to map data from. The other list represents the subdomain to map data to.

Figure 6:
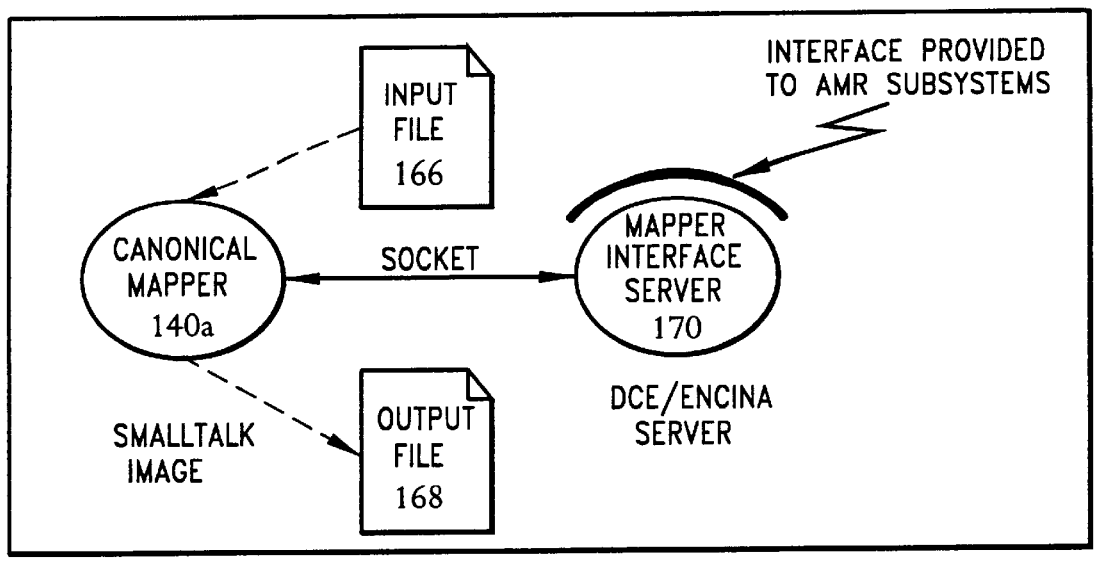
FIG. 6 illustrates the relationship of a Mapping Interface Server to the AMR Subsystems.

The Canonical Mapper 140a is preferably implemented in Smalltalk and hence requires integration into the DCE/Encina® environment of the AMR Server 15. To accomplish this integration, a Mapping Interface Server 170 provides the DCE/Encina® service requests from the AMR Subsystems, as shown in FIG. 6. The Mapping Interface Server 170 will interface with the Canonical Mapper Server using a socket connection. The Mapping interface server 170 will provide a service that allows an AMR Subsystem to specify an input file 166, an input map, an output file 168, and an output map. The Mapping interface server 170 will send this request to the Canonical Mapper 140a through the socket interface shown in FIG. 6. The input and output maps are derivation trees. Using these maps, the Canonical Mapper 140a, running in a headless mode, will build a scanner/parser for the FROM sub-domain. The Canonical Mapper 140a will then traverse the input map, parsing the data from the input file into a canonical list. After the input map traversal is complete, a canonical list will exist, populated with the elements from the input sub-domain. Next, the Canonical Mapper 140a will map from the canonical list to the output sub-domain by traversing the output map and re-interpreting the corresponding element from the canonical list to conform to the new data format. This action creates the specified output file.

The Canonical Mapper 140a may be configured to accommodate differing file formats as follows. As noted, the purpose of the Canonical Mapper 140a is to standardize data formats so that information spanning across different business units can be easily converted from one format to another.

In the detailed description of the canonical mapper 140a, the following terms are used to describe the features of the canonical mapper 140a. A "canon" is a tree relating all data attributes within a domain of information (e.g., Bill of Materials). "Canonical elements" are specific parts of a Canon. A "map" is a data structure that describes the format of a particular file in terms of the Canon. A "domain" is a collection of data that is semantically consistent (e.g., the same data format). "Scanning" is the process of identifying elements of input text. "Parsing" is codifying input text in terms of its relationship to the output text. A "token" is an item added to a value in a file to describe the format of the text. An "action" is a tool for modifying the appearance of a particular file, i.e., an "action" performs operations upon text (e.g., add carriage: returns, add quotation marks, etc.)

The Canonical Mapper 140a preferably consists of utilities to create Canons, build Maps, and translate files. A Canons utility may be included to create a Canon. The Canon is an abstract template or master file that describes a general structure for a domain of information. In other words, the Canon is a template that describes a general format for a domain of information that is to be converted. A Canon may be analogized as a tree or an outline that is used as a template for the conversion of information. The Canon starts with a root from which other subordinate parts stem. The root of the tree is the name of the Canon, thus the root is the parent to every other part of the tree. That parts that are nested or indented within the root are the children. The Canon is described from top to bottom by the relationships of each part to the other, similar to an outline. Each parent contains specific information (i.e., children) and a child may contain other children. Each child and parent is a node in the tree. A node that does not contain any children is a terminal node or leaf node.

Figure 27:
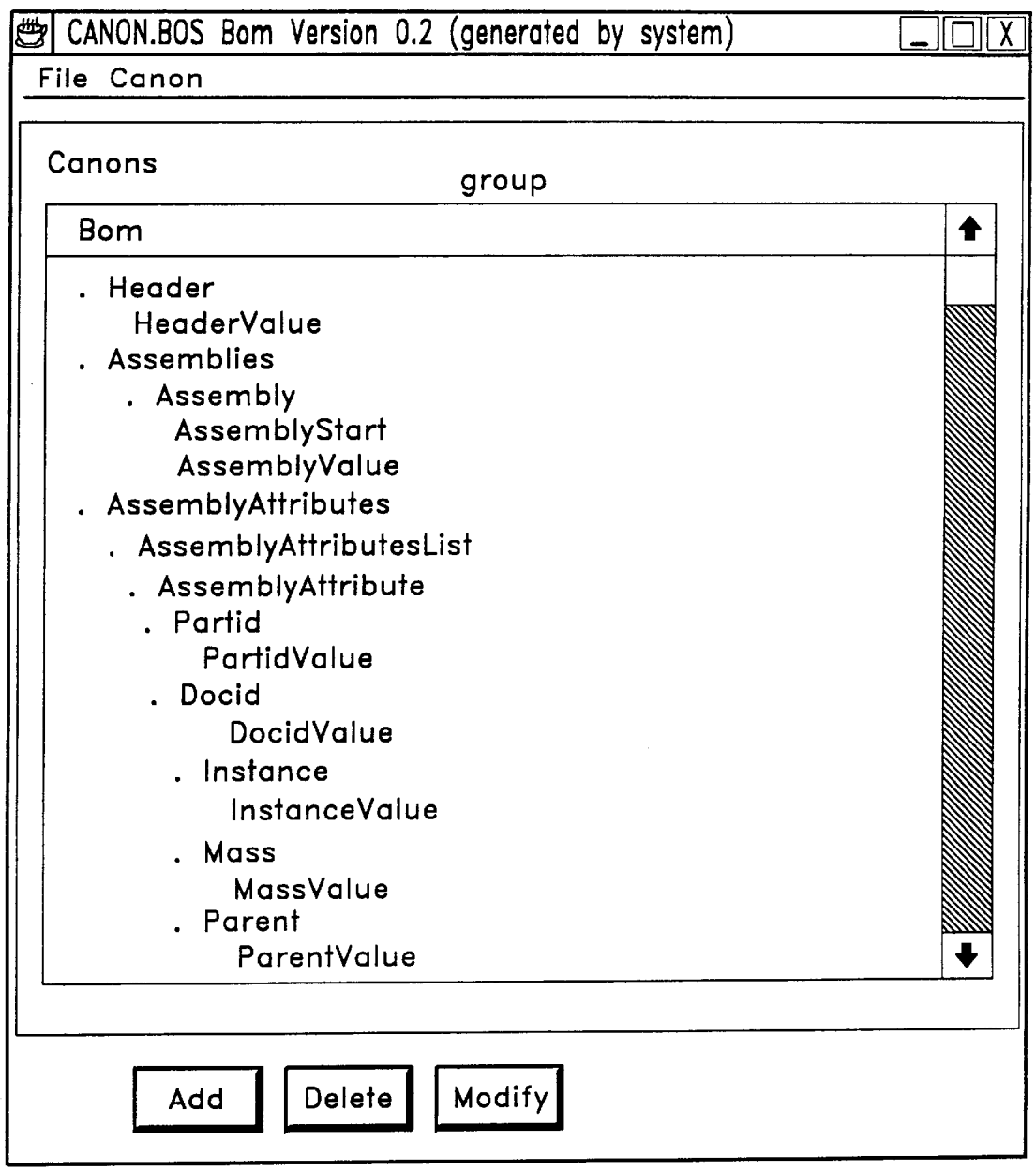
FIG. 27 illustrates a canonical element "BOM"

Every item in the Canon is a Canonical Element. In order for the Canon to function correctly, each element must be defined so that when data is fed through the Canon, the data can be accurately interpreted. The entire domain is described in terms of a canonical element that is an abstraction, and then each division or part of that element is subsequently defined in terms of less abstract elements until the entire document is defined. Each abstract element ultimately resolves to a concrete element. For example, as shown in FIG. 27, if a user is mapping a domain that is a bill of material (BOM) document, they select the entire domain sample and select the canonical element "BOM". As this point, the user has abstractly represented the entire input as a "BOM". Then, the user proceeds to identify more detailed abstractions in the input. For example, the user selects the domain input comprising all the assemblies and select assemblies from the canon. Within that selection, they further sub-select a single occurrence describing an assembly and map it to the canonical element "Assembly". Mapping proceeds in this manner until all discreet elements of the input have been mapped to the canon.

Relationships exist when a domain contains data that is dependent upon other data in the domain. For example, a domain input describing a part, wherein a part has a plurality of attributes. The word "has" infers a relationship, i.e., the part may include a part identifier, material identifier and a parent identifier.

The domain may be mapped to the canon with the following relationships:

+Parts (Group)
  +Part (Group, isRepeating)
    +PartIdentity (Group)
      PartIdTag (Id)
      PartIdResult (Result)
    +MaterialIdentity (Group, is Optional)
      MaterialIdTag (Id)
      MaterialResult (Result)
    +ParentIdentity (Group)
      ParentIdTag (Id)
      ParentResult (Result)

As exemplified above, the part may be described as a first canonical element Parts. This is an abstract element denoted by its type (i.e., group). The next element nested is Part, which indicates that Parts have a Part. The nesting indicates a relationship. Part has three relationships, PartIdentity, MaterialIdentity, and ParentIdentity. The user controls how relationships are formed by selecting a previously mapped element to add a new relationship.

Figure 28:
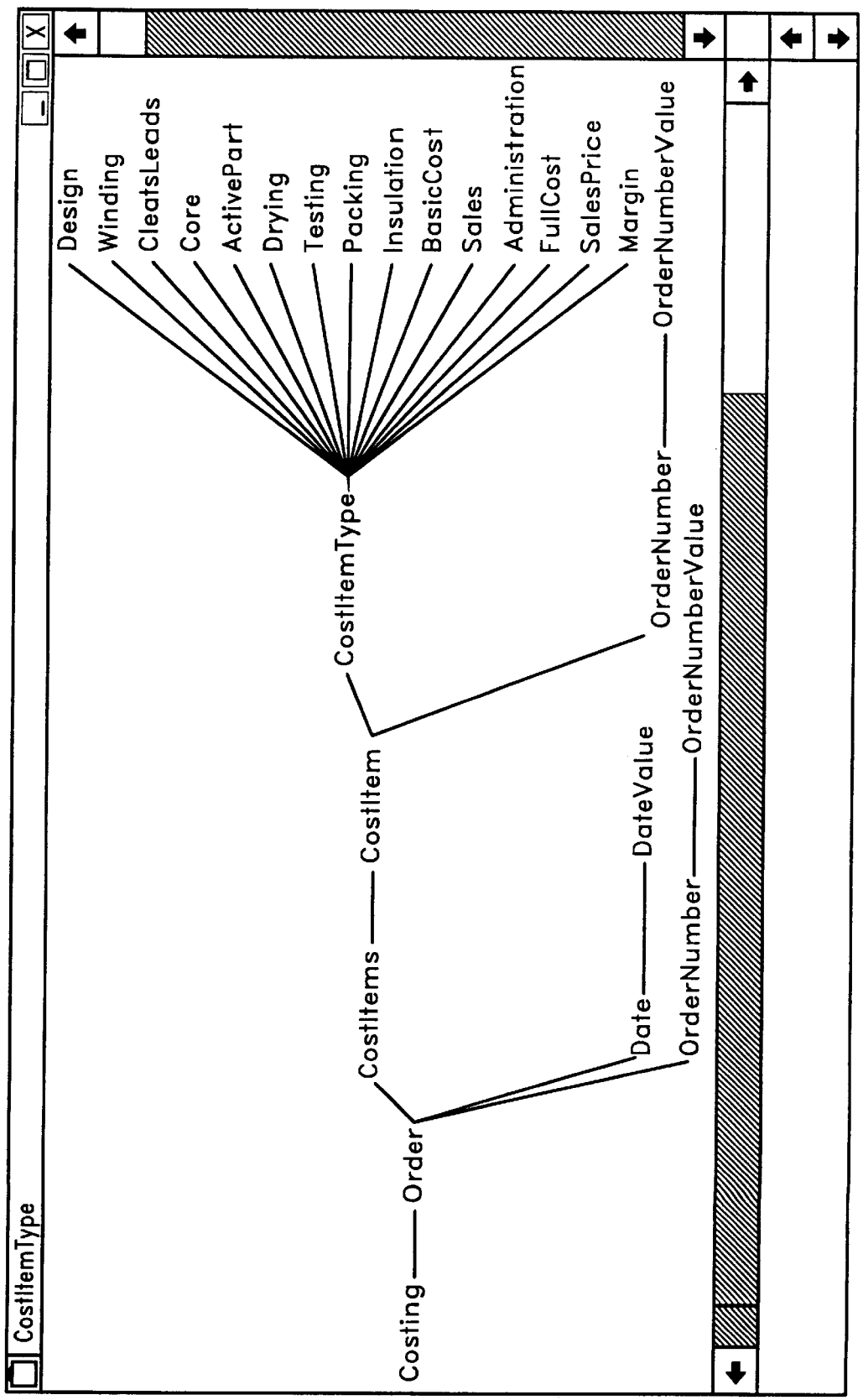
FIG. 28 illustrates the Canon "Costing"

The canonical elements may also be assigned attributes that define certain qualities about those elements. For example, the attributes may include element types (e.g., group and result elements) and modifiers. Group elements are elements that contain children (e.g., "PartId" contains "PartIdValue") and result elements contain a variable piece of information that identifies a specific value (e.g., "PartIdValue" contains a particular value). A graphical view of the Canonical Elements may be derived, as shown in FIG. 28 for the Canon "Costing."

A Maps utility is included to create a map for translating data from one format to another. Since there may be many different file formats and applications within a particular domain, it is desirable that the software be flexible enough to allow users to create customized maps for their particular applications and file formats. These maps are based on the Canon for which the data conversion is needed. Maps specifically describe formats for the conversion of information between two applications, i.e., a map is a way to describe the intended output in terms of the Canonical Elements. The map does not perform actual converting, but rather acts as a liaison between the Canon, the input file and the application used to create the input file. A map is essentially a tree that represents a formula for converting a file. Anytime there is a need for data conversion between different applications and there are no existing maps for these applications, a map must be created that describes what the converted information should look like. In other words, for every two tools that need to communicate with each other, there must be a map for each tool. Once maps are created, they can be repeatedly used to convert information between the two applications.

Building a map entails selecting each component of the input file and defining its function in terms of the Canon being used. Attributes about certain Canonical Elements are defined during the process of building a map. For example, group elements may have modifiers defined for them. A modifier is a conditional statement that further defines its function. The modifiers may indicate that a group element is not required, indicate that the group element appears more than once, indicate that the group contains a series of results that are grouped within that element, or indicate that the element is required. In addition to modifiers, identifier may be included for constant information within the file. The identifiers may be used to identify a Result element for a particular piece of information. An exemplary identifier may be an order number for a BOM.

Tokens and actions are defined in the maps utility. The token specifies the format of the results (i.e., values) in the map. Tokens are defined because they define specific values that change depending on the input text. Actions structure the appearance of certain parts of the file. For example, a carriage return action instructs the mapper to insert a carriage return at a particular point in a file. Two types of actions may be performed, Canon Actions and Output Actions. The Canon Actions are performed on the input text as it is converted to the canonical form (step 202) or when any actions are necessary prior to the output map has acted on the file (step 204). Once the information has traveled through the Output Map, the Output Actions are activated. These actions are performed because the file has been changed and may need to be re-interpreted before they can be displayed correctly.

An Interactive Translator utility is provided to test the actual translation of a file to be mapped for the conversion process. The Interactive Translator bases the conversion on the Canon, the Input Map that was created to describe the conversion of the input text, the Output Map that is used to describe the output text, and the input text being converted. The Interactive Translator then produces an output text file based on the information provided.

Once a successful translation has been made in the Interactive Translator, then the translation across domains is performed in a Headless Translator. By selecting the appropriate input map, output map, and input text, the Headless Translator performs the conversion to create the translated text file.

Thus, the mapping process can be broken down into four main steps: Creating the Canon (Canons Utility), creating the maps for the Canon (Maps Utility), testing the file conversion (Interactive Translator), and mapping the information from the Input Map to the Output Map (Headless Translator) to create the converted file.

Figure 7:
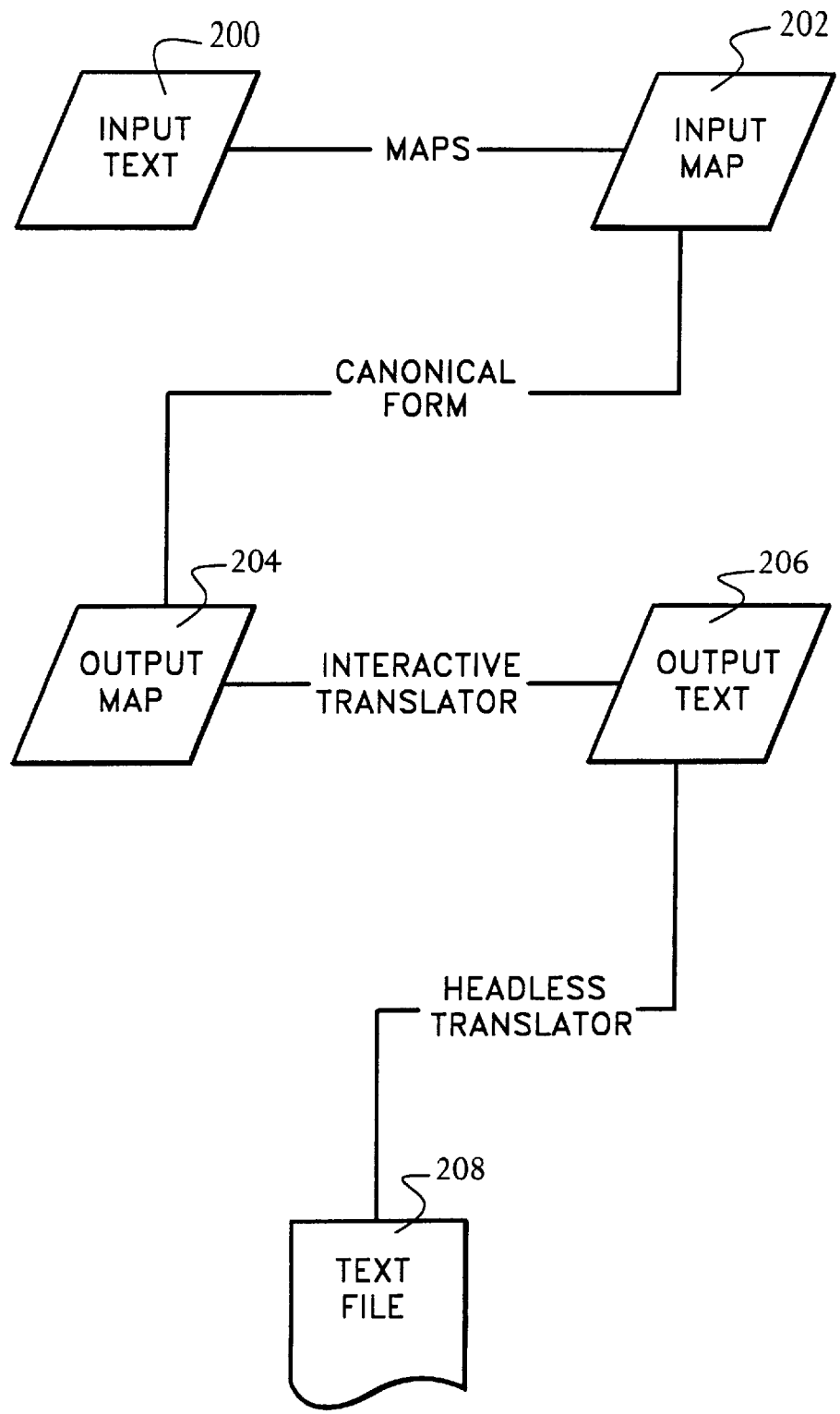
FIG. 7 illustrates the process of converting a file between two applications.

Referring now to FIG. 7, the process of converting a file between two applications (i.e., from one domain to another) will be described. Using the Maps utility, the input text file 200 is selected. In order for the mapping to be successful, the input text 200 is translated to a Canonical Form in accordance with an input map 202. The particular Canonical Form of the input text depends on the Input Map 202 that is being used. The text must be transformed into a Canonical Form at step 202 so that the text can be sent to the Output Map 204 in a format it can accept. Once the text file has been converted to its Canonical Form, it is interpreted by the Interactive translator in accordance with the Output Map 204 that was specifically designed for converting files between the two applications to generate an output text file 206. The output text file 206 is parsed and translated by the Headless Translator into a text file 208 that can be printed, saved, or placed into a word processing document.

Referring again to FIG. 4 and FIG. 8, a Log/Trace Subsystem 142 is provided which is a group of class libraries available to all servers through the AppServer class. The Log/Trace 142 provides all servers with a common mechanism for logging and tracing. Logging and tracing are initialized from a system configuration file 174 that activates logging and specifies the default log file 176 destination. These settings can be modified during runtime by using an administration utility (ASADMIN 180) provided with the system.

The ASADMIN utility 180 is a program that allows system level control of servers running the AMR Server 15. The ASADMIN 180 is capable of starting and stopping the servers. In addition, the ASADMIN 180 can modify and query system configuration variables. The configuration options (asadmin config) may provide options for reloading the server's particular configuration file 172b, returning the configuration filename used by the server, setting a variable in the server, returning the configuration information by variable, returning the configuration information by group, and retrieving all possible log settings from the server.

Several scripts may be used for configuration. A first script (rc.amr) may be written to start or stop all servers. The script preferably attempts to start all servers in order of dependence by the AMR Server 15. A second script (configServer) may be used to configure an individual Encina® 106 server. The Encina® cell, however, must be properly configured before this script is executed. After configuration of Encina® 106 cell, the configServer script may validate the many parameters, configure the server in Encina® set the interface ACLs, start the server, modify the server directory permissions to be more open, and set the queue ACLs. A third script (amrsetup:) may be used to configure or unconfigure all the AMR servers. It uses the configServer script to configure all the servers and configure a location of the config file to reference, additional environment variables needed, list of interfaces exported by the server, various switches (-noasync-nodatabase-singlethreaded), the Encina® name, and the name of the executable. It is noted that when the AMR Server 15 is implemented and distributed on Sun platforms, the Sun Packaging utility is used. This is the same utility that is used to distribute Sun software.

Users of the AMR Server 15 can retrieve logs 176 from the Logging Subsystem 142. The Logs 176 may be used for auditing purposes and can support certain standard types of queries. An example of a typical log requirement is to log the activation of each invoked Application System API call with, for example, the following information: API invoked, User, Time and Supplied parameters.

The Log 176 is internationalized, since users of the system may view its contents. Log messages contain e.g., the following levels: INFO, WARNING, ERROR, and FATAL. Users may use Tracing 142 to "trace" the execution of the system to resolve problems. When the tracing component is activated, it will place messages in a specified trace file 178. The trace messages have trace categories that can be controlled by adjusting the trace masks of servers in the system. Typical trace categories are defined for performance, auditing, function, exception, debugging, and user-defined categories.

Tracing is initialized from the system configuration file 174. The default configuration for a delivered system is to have tracing disabled. Tracing is only required to track down problems that occur in a running system and can be activated at runtime on the entire system or any of the individual servers within the system using the ASADMIN utility 180. The ability to specify trace masks for running servers provides a mechanism to adjust (increase or decrease) the amount of information traced by the server. Tracing might be used when there is a problem with the Supplier Manager 148a and a user needs to view the trace messages for function, exception and debugging to understand and isolate the problem. At runtime, the ASADMIN utility 180 may be used to activate tracing on the Supplier Manager server 148a, with a trace mask that enabled these categories (function, exception, debugging), and a trace file specified for the output. By viewing the trace messages output by the Supplier Manager 148a when the problem occurs, the developer has much more insight into how the system is reacting.

Each of the above-described subsystems comprise the Infrastructure subsystems of the AMR Server 15. The Application Subsystems will now be described, also with reference to FIG. 4.

The AMR Server 15 Graphical User Interface (GUI) 92 provides users with access to the functionality of the system. The GUI 92 provides a User Interface that is self-explanatory and easy to use. For example, the GUI 92 utilizes the mouse and keyboard input devices and as such is not geared towards volumes of data entry. For mass data entry, the AMR Application Systems automate mass data entry through the provided DCE 132 and file based interfaces 128. The GUI 92 is intended for rapid access to the functionality for smaller data entry jobs.

The AMR GLTI 92 preferably runs on Windows NT® 4.0 or UNIX workstations and is preferably implemented in a windowing environment. The GUI 92 provides a user friendly and intuitive environment for accessing various AMR activities. The GUI 92 allows user to manually invoke all business system interfaces online, allows user to search on specific meter/account/rate/event information, provides access to Activity Management System 146c monitor, and provides interface to schedules.

The GUI 92 is preferably developed in Java™ to provide platform independence and the capability of remotely running as an applet from standard Internet Browsers. The GUI 92 uses Standard Application System APIs provided by the Utility Interface Subsystem 144 to initiate requests. In order to connect a Java™ client to the AMR Server 15 through DCE some technical challenges have to be overcome due to the relative immature state of Java™. The following section explains the GUI Interface Architecture required to accomplish this unique connection.

Figure 9:
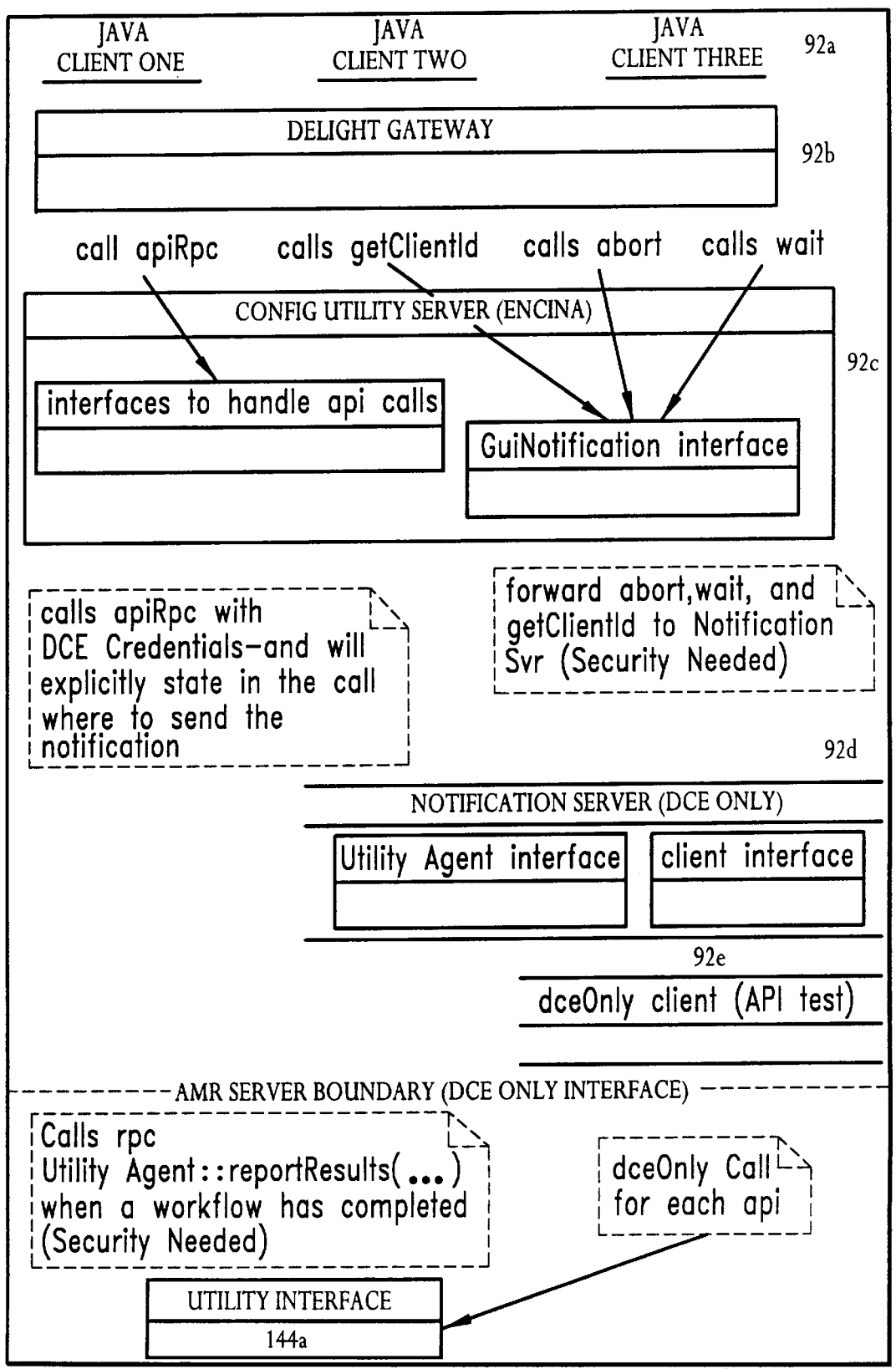
FIG. 9 illustrates in block diagram format a client GUI connected to the AMR Server.

As shown in FIGS. 4 and 9 below, there are five major "pieces" involved in connecting the Java™ client GUI to the AMR Server 15. They are: a Client GUI 92a, a DCE Encina® Lightweight Client™ (DE-Light) gateway 92b, Custom gateway server (ConfigUtility) 92c, Custom notification server 92d, and an AMR Server 15 (Utility Interface) 144a The Client GUI 92a is preferably implemented in Java™ and performs all communication using the DE-Light gateway 92b. The client 92a provides a "thin" client that is capable of running on a large variety of platforms. The GUI 92 submits end user requests to the AMR Server 15 and is responsible for interpreting and displaying any data returned from the AMR Server 15. The GUI 92 is capable of performing a variety of activities related to meter management, such as adding a new meter, installing a meter, uninstalling a meter, terminating a meter, modifying a meter, estimating a meter reading, entering a meter reading manually, reading a meter, adding a meter to an account, removing a meter from an account, adding a rate to a meter, removing a rate from a meter, adding a meter to a data collection group, removing a meter from a data collection group, and defining communication parameters for a meter. To perform each of the following activities, the user may click on icons or press a combination of keys to be presented with a data entry screen. The data entry screen includes a list of required and optional fields into which information may be entered using the keyboard and/or mouse. The DE-Light gateway 92b, available from Transarc™ Corporation, is provided to allow the Java™ GUI client 92a to make RPC calls into Encina® 106 servers. It is used as communications middleware to connect the Java™ client 92a to the Encina® ConfigUtility server. The DE-Light gateway 92b enables the Java™ client 92a to make a secure connection to the AMR Server 15 using the DCE security service.

The ConfigUtility server 92c is provided to work around limitations in DE-Light 92b. In particular, it acts as a custom translator between the Java™ client 92a and the AMR Server 15. It mainly performs data conversion (such as serialization) and does not contain any significant application logic. All RPC calls from the GUI 92 are directed to the ConfigUtility server 92c. This server 92c will provide the Java™ client 92a with a mechanism to poll for asynchronous replies from the Utility Interface 144a via a Notification Server 92d.

The Notification server 92d acts as a queue that allows clients that cannot handle incoming RPC calls to process asynchronous notifications. The server 92d assigns a unique client ID to each client. Clients then tag their requests to the AMR Server 15 with their client ID. The AMR Server 15 calls the Notification server 92d when asynchronous requests are complete and stores any information provided, including the requesting client's ID, in a delivery queue. Clients execute a simple loop, fetching available notifications and processing each in turn. If a client tries to fetch a notification when none are available, the call will block until a new notification arrives (or a timeout occurs), thus preventing busy polling. The Notification server 92d is preferably written using straight DCE (without Encina®) and does not use the AMR framework. In accordance with an aspect of the present invention, the AMR Server 15 performs all the real processing. Therefore, it accepts client requests and returns data back to the client (either synchronously or asynchronously) via the Notification server 92d.

When the GUI client 92a receives a notification that an activity plan is complete, the GUI client 92a receives data passed back in a wait call, or the client 92a may call the Utility Interface 144a, as noted below. The call to the Utility Interface 144a is preferably a RPC call, however, may be performed by directly accessing the blackboard. In addition, the GUI 92 is designed to handle a situation where the client 92a terminates. For example, if the client 92a cores, then the server 15 will timeout. If the client 92a shuts down peacefully, then the Notification server 92d will call an abort. On the other hand, if one of the servers in the AMF, Server 15 terminates, then the client 92a will attempt to reconnect for a predetermined number of times or period of time (e.g., 10 times or 5 minutes). If the server is brought back up, then the client 92a will reconnect and pending requests, if any, can be reissued. If the server fails to come up, then the client 92a will be unable to reconnect and will be notified such that the application calling the server can be closed.

Referring again to FIG. 4, the AMR Server 15 includes Support Services that are a group of Subsystems that accept requests, and communicate with systems 90 external to AMR Server 15. The Utility Interface Subsystem 144 is the entry point for Application System requests to the AMR Server 15. All customer requests come in through this Subsystem. Every external business service the AMR Server 15 may be asked to perform is represented by a service API in this interface. The services within the Utility Interface 144a have some common features (by using a common set of services within this Subsystem). When a service API is invoked, the accompanying arguments or parameters are validated, and translated to a form used within the AMR Server 15.

The Utility Interface Subsystem 144 is comprised of a single server, the Utility Interface Server 144a. This server is an RPC server that provides the DCE only interface for external Application Systems 50. This server controls access to services within the system by security mechanisms built into the messaging layer and translates proprietary data from the utility client to a format useful to the AMR Server 15. The Utility Interface server 144a does not directly accomplish the work requested. The services the utility interface provides are "windows" into the system through which work requests pass. After necessary mapping/validation of parameters has been completed, these services message the Activity Dispatcher 146a to invoke an Activity Plan to accomplish the business tasks of the request. All services are synchronous in that they immediately return a result to the requester. However the nature of the result differs, based on whether the invoked service is interactive, or the initiator of a batch process.

Interactive services, or those requiring an immediate response to the user will wait for the Activity Plan to complete and return an answer. These types of requests can be quickly satisfied within the system through access to warehoused data. Other services initiate batched background work. These services message the Activity Dispatcher Panel 146a to begin an Activity Plan that will complete at some time in the future. These types of requests are called asynchronous or deferred requests. When the Utility Interface 144 activates an Activity Plan, it receives the unique Activity Plan identifier assigned by the Dispatcher Panel 146a, and uses this identifier to register an activity completion concern with the Concern Manager 136a.

The external requester of the work is also immediately answered with the identity of the Activity Plan. The requester can later use other services to check on the status of a Activity Plan and/or be notified when a Activity Plan has completed. The Activity Dispatcher Brain 146b communicates to the Concern Manager 136a who in turn notifies all interested parties when an activity has finished. When the Utility Interface Manager 144a receives the Activity Plan completion notification, it will return the results to the requesting client.

This asynchronous or deferred service requests from external systems to the Utility Interface Subsystem can provide a client context, which is carried through the AMR Server 15 unmodified, and returned with the corresponding results. This service allows an external system to create a context identifier meaningful to their application that can be used to marry the response to the original request.

In addition, the Utility Interface 144 allows an external system to specify in each asynchronous/deferred request, the binding information of the RPC server within their system that should receive the results of the request. If the request does not provide this binding information, then the RPC server specified as a system-wide default will be used. The system-wide default RPC server can be set using the configuration file.

Figure 10:
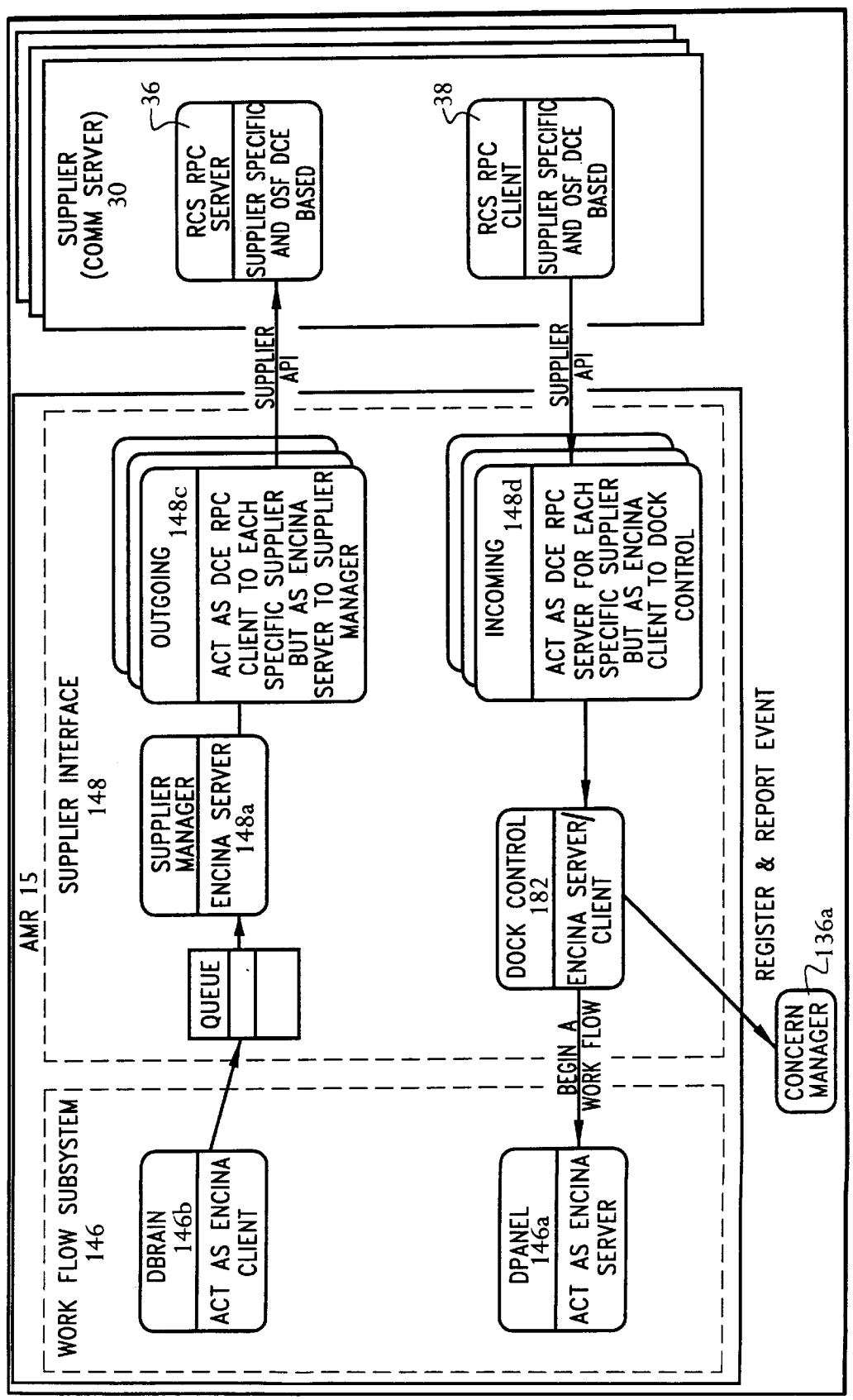
FIG. 10 illustrates a Supplier Subsystem in accordance with the present invention.

Referring to FIGS. 4 and 10, there is illustrated the Supplier Subsystem 148. The Supplier Subsystem 148 is analogous to the Utility Interface Subsystem 144. It could be considered the "Order Fulfillment Center" for the system. There are two terms used to discuss the systems that provide the metering data to the AMR Server 15. The terms "Supplier" and "Communication Server" are used interchangeably herein. The name "Supplier" is used because the external systems that are communication with the AMR Server 15 are not "communication systems" in the normal computer sense of the word. Rather, they are simply other computer systems that have their own APIs or database formats for retrieving information which is supplied to the AMR Server 15.

From the perspective of the AMR Server 15, a "comm" or communications system is one that operates asynchronously and delivers its data in a raw (or non-structured) format and in its own time not the system's (i.e. real or near-real time). The external information systems 50 that collect and report meter information should appear to communicate with the AMR Server 15 in the same manner that the AMR Server 15 might communicate with any other information system. With this in mind, it is preferable that the AMR Server 15 communicate with an external system the same way that the internal systems or components within the AMR Server 15 communicate. For example, a message model can use a broker to resolve location and an IDL to define interfaces. Accordingly, the AMR Server 15 uses this same model to communicate with external systems. The AMR Server 15 views each of the external systems by "type" and list attributes or types of information that it will require as input, and the type of information that it will supply as output. The AMR Server 15 then is able to find commonalty between systems and define a high level of interface descriptions that will work with each type.

The AMR Server 15 maintains the interface to external systems abstracted as far out of the system as possible to protect itself from future change or new systems. Specifically, the AMR Server 15 accomplishes this isolation by finding the commonalty in the existing systems and defining generic interfaces that will communicate to the AMR Server's 15 "wrappers" for the specific communication systems. Thus, the only components that will change over time will be the third-party interfaces and how the AMR Server 15 wraps those interfaces. The AMR Server can add new systems by building wrappers that communicate with generic IDL definitions for services inside the AMR Server 15.

Legacy systems can be treated similarly to the external communication systems. However, due to the nature of these legacy systems, it is likely that the type of information that is retrieved will not be compatible with the message-based architecture of the AMR Server 15. In particular, it is likely that legacy systems will transmit information via flat files which must be parsed into message sends, and conversely, the AMR Server 15 messages will need be collected in batches to form flat files for import into the legacy system. This can best be accomplished by determining the superset or canon of attributes that will be communicated by the legacy systems. The canonical mapper 140a, described above, maps legacy specific formats into common formats that have optimized parsers designed for messaging.

The Supplier Subsystem 148 houses services that are specific to how a supplier communicates information; meaning that there will be separate supplier interfaces for different interface modes (asynchronous/synchronous) with limitations and extensions necessary to support fixed networks, telephony, etc. The type and capabilities of a supplier are determined by meter identity. The supplier interface asks suppliers for actions, such as remote disconnect, and standing orders (sample delivery). The interface encapsulates the differences between synchronous and asynchronous forms of interface as well as differences in network types so that clients of the interface need not know what "type" of supplier they are interacting with.

These services are similar to utility interface services in that they perform any required translation of internal key codification into proprietary formats expected by external suppliers of information. All outgoing requests to suppliers are accomplished through Activity Plans (via the Activity Dispatcher 146a). Services triggered from a supplier will begin Activity Plans to accomplish tasks such as requesting information for a group of devices and then moving the results to the Receiving Subsystem 150d in the Data Access Object Subsystem 150 (discussed below) for processing.

Thus, the primary purpose of the Supplier Subsystem 148 is to provide the AMR Subsystems with secure access to data collected and stored on any supported Communication Server 30. To accomplish this, the SupplierMgr 148a, SupplierOutgoing 148c, and SupplierIncoming 148d servers interact with each other, AMR business objects, the Activity Management Subsystem 146, and the AMR Event services (see FIG. 4). In addition, the SupplierOutgoing 148c and SupplierIncoming 148d servers are designed to interact with specific types of supported Communication Servers 30. The Supplier Manager 148a is used within the Supplier subsystem 148 to hide the differences in communication systems. From the AMR service level, all communications systems appear identical as viewed from the Supplier Interface.

It is also the purpose of the Supplier Subsystem 148 to provide a single point of secure access for AMR Subsystems 100 to all supported meter Communication Servers 30. The appropriate interface is chosen by the Supplier Subsystem 148, thus shielding other AMN. Subsystems from the intricacies of binding to a specific interface. The Supplier Subsystem 148 also provides a single point of secure access for all supported meter Communication Servers 30 to services provided by the AMR Server 15. Further, the Supplier Subsystem 148 encapsulates the differences between Communication Server 30 interfaces, as well as differences in network types, so that AMR Subsystems need not know what "type" of supplier with which they are interacting. The Supplier Subsystem 148 support both synchronous and asynchronous Communication Server 30 interfaces, performs required data transfer between internal AMR business objects and the data structures supported in the Supplier API, and performs any required translation of internal key codification into proprietary formats expected by external suppliers of information.

The primary constraints on Communication Server 30 access are security considerations and transaction control. Security considerations are addressed by DCE security services. Transaction control internal to the supplier Subsystem and during interactions with other AMR services is provided by Encina® 106.

For Communication Servers 30 conforming to the synchronous model (FIG. 11 described below), the workflow Subsystem interacts with the SupplierMgr 148a through RQS and data is passed via business object proxies passivated in an AMR Blackboard object. Based on information obtained from the business object proxies, the SupplierMgr 148a can route the request, along with the required business object proxies, to the appropriate SupplierOutgoing 148c server. The SupplierOutgoing server 148c translates the data as required by the Supplier API and forwards the request to the Communication Server 30. Return information is then used to update AMR business objects. Service requests from Communication Servers 30 are forwarded by the Supplier-Incoming server to a DockControl 148b interface, which then starts a workflow to perform the required tasks.

The asynchronous Communication Server 30 model (FIGS. 12A and 12B described below) is similar to the synchronous model with the exception that the requesting activity does not wait for the response from the supplier Subsystem. The result is returned at a later time though a SupplierIncoming server 148d and can be tied to the original request using the AMRContext passed to the Communication Server 30 with the original request and returned with the response.

Figure 11:
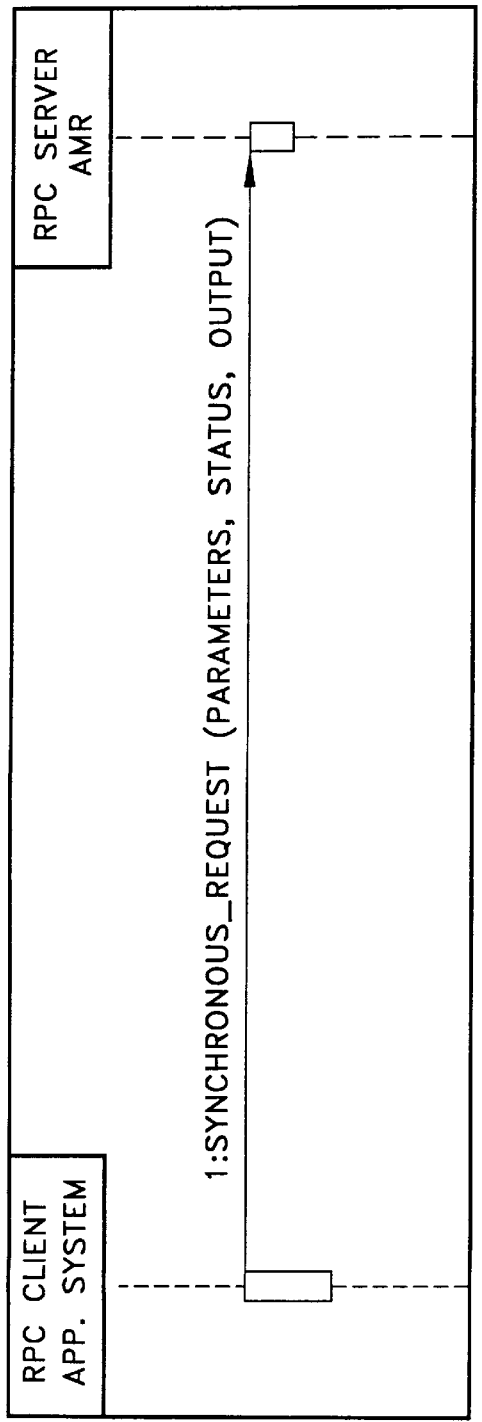
FIG. 11 illustrates the process of a synchronous requests to the AMR Server.

Referring to FIG. 11, synchronous requests (from the Application System) return their specific outputs directly. They also provide the status of the request and AMR context information that can be used to retrieve information about it from the system log. Synchronous requests usually provide the fastest execution of an AMR service. However, they tie up the requesting thread and user window (if any) until they are done.

Figure 12A:
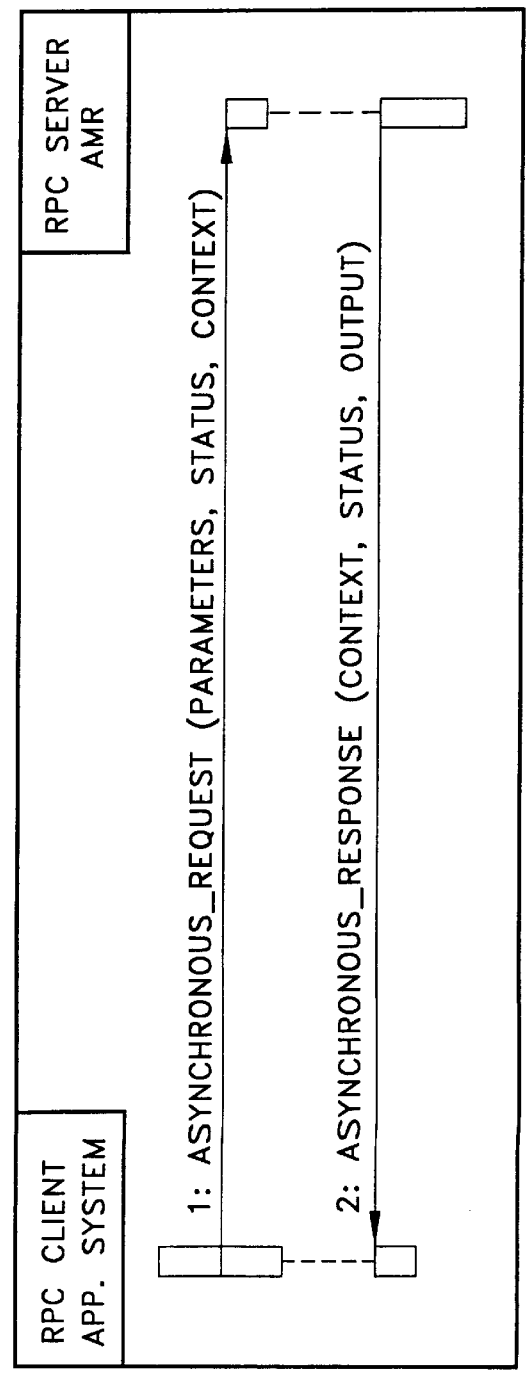
FIGS. 12A and 12B illustrate the process of an asynchronous requests to the AMR Server and asynchronous notifications from the AMR Server.

FIG. 12A illustrates the process of an asynchronous request. Requests that may require data from the communications servers or physical meters 60 will be made through the asynchronous mode because they can take relatively longer to carry out. Requests that may return a large volume of data should also be made through the asynchronous mode. RPC through DCE does not support true asynchronous requests, so the AMR Server 15 will realize asynchronous requests by generating a separate RPC call to inform the Application System when the request is complete. Asynchronous requests (from the Application System) return the status of the request start-up, and the AMR context (reference) of the requesting RPC call. The response (message) provides the overall status of the service. The response contains either the output data directly or the output locations. The Application System may also provide its own context information returned with the response so that the Application System can associate the appropriate request with its response.

Figure 12B:
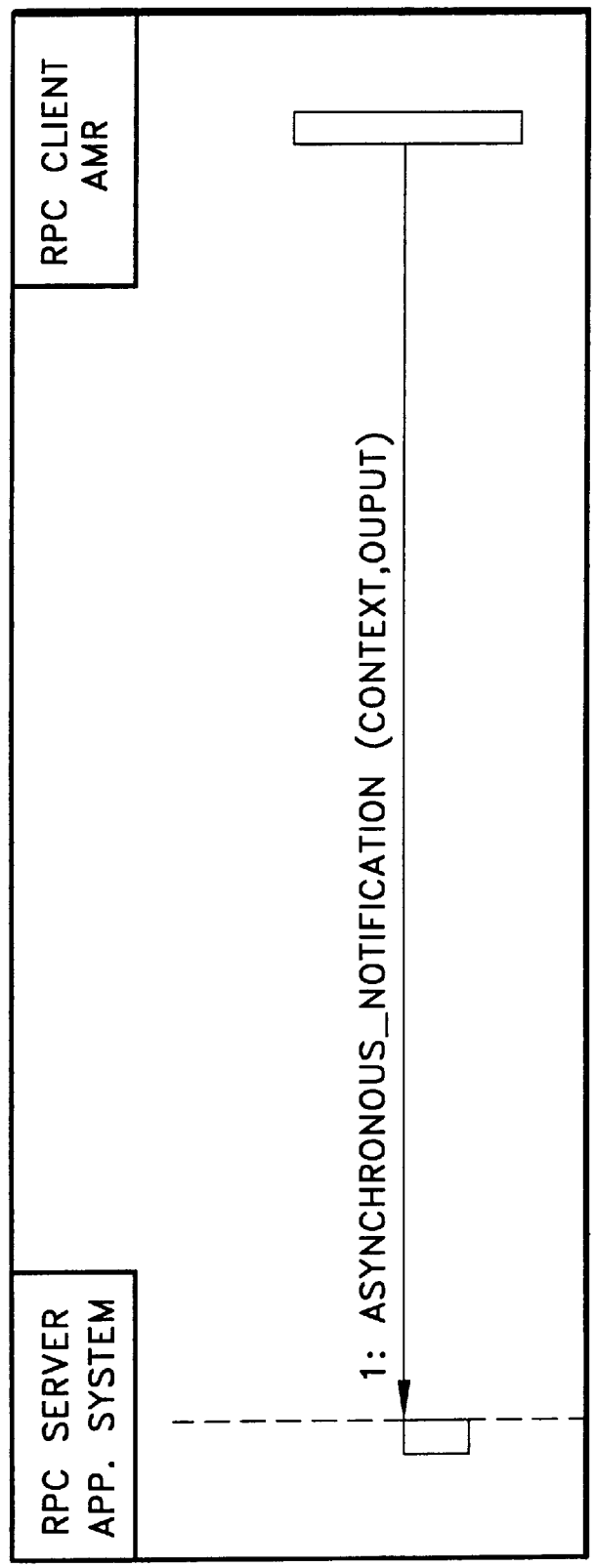

Referring to FIG. 12B, Asynchronous Notifications will now be described. The AMR Server 15 will generate some scheduled services. For example, it generates services periodically to store and collect meter readings for each billing schedule. The AMR Server 15 will notify the Application System when these services are complete by invoking an RPC call to the Utility. The Notification call will contain the outputs, and the AMR context (reference) of the service.

The Supplier Subsystem 148 is composed of three actual servers, a Supplier Manager 148a, a Supplier Outgoing 148c, and a Supplier Incoming 148d, and one logical server (not shown), and a Dock Control 148b.

The Supplier Manager Server 148a is the primary point of access for other AMR Subsystems. As shown in FIG. 4, the Supplier Manager 148a serves as the interface between the AMR Activity Management Subsystem 146 and the specific AMR Server 15 handling communication with Communication Servers 30. It routes meter service requests from AMR. services to the AMR Outgoing service 148c responsible for interfacing with the Communication Server 30 handling the requests for the specified meter. The Supplier Manager 148a also manages the delivery schedules and collection component distribution to the Communication Servers 30 (FIG. 5). For example, when an AMR schedule for data (billing schedule, data collection group schedule, etc.) is added or deleted, it is the responsibility of the Supplier Manager 148a to determine which Communication Server 30 should have the delivery schedule added or deleted based upon the meters 60 that the Communication Server 30 supports.

It is noted that the Communications server network layer preferably supports various network technologies without changing application code. A successful communications architecture should assure that network specific instructions are pushed as low as possible, and common communications instructions are elevated to assure minimal amounts of new code development with each different communications environment.

There may be multiple Supplier Outgoing Servers 148c running in the AMR Server 15. As its name implies, the Supplier Outgoing Server 148c handles the communication from the AMR Server 15 to the communication server(s). In general, each Supplier Outgoing Server 148c is responsible for a particular type of Communication Server 30 (not a particular instance). There may be a one-to-many relationship of the Supplier Outgoing Server to communication servers 30.

The Supplier Outgoing Server 148c shown in FIG. 4 acts as an Encina® 106 server to the Supplier Manager 148a and as a RPC client to the Communication Server 30, assuming the Communication Server 30 supports DCE. The AMR Server 15 publishes a Standard DCE API for interfacing with Communication Servers 30. If a Communication Server 30 does not support DCE, but provides some other interface, then it is the job of the Supplier Outgoing to bridge this interface gap and hide the implementation details of this custom interface from the other AMR Subsystems.

The Supplier Outgoing server 148c is responsible for the data transfer between the internal AMR business objects and the data structures and files supported in the Standard Supplier API (discussed below), or to customized data structures for different types of Communication Servers 30. In general, it is assumed that a customized Supplier Outgoing Server 148c will be required for each different type of Communication Server 30 supported by the AMR Server 15.

There may be multiple Supplier Incoming Servers 148d running in the AMR Server 15. As its name implies, the Supplier Incoming Server 148d handles the communication from the communication server(s) to the AMR Server 15. In general, each Supplier Incoming Server 148d is responsible for a particular type of Communication Server 30 (not a particular instance of a communication server). In the specific case of the RCS-250 communication server, there will be a one-for-one relationship between a Supplier Incoming Server 148d and the communication server.

The Supplier Incoming Server 148d shown in FIG. 4 acts as a Encina® 106 client of Dock Control 148b and as a RPC server to the communication server 30, assuming the Communication Server 30 supports DCE. The AMR Server 15 publishes a Standard DCE API for interfacing with Communication Servers 30. The AMR Server 15 has a designed flexibility regarding how meter (and other) data suppliers communicate information. It is preferable to keep the AMR interface for receiving information is as open as possible as some suppliers will be sophisticated and make use of the RPC interface while others may push (or pull) flat files into our file system. Other possibilities include, but are not limited to, remote table reads and reading remote message queues.

One important note is that Supplier Incoming 148d does not retrieve information directly from devices and is not a data supplier. If the AMR Server 15 is required to read data from devices, a separate (sub)system acting as a supplier needs to be added. If a Communication Server 30 does not support DCE 112, but provides some other interface, then it is the job of the Supplier Incoming 148d to bridge this interface gap and hide the implementation details of this custom interface from the other AMR Subsystems. The Supplier Incoming server 148d is responsible for the data transfer between the external data structures into internal AMR business objects. In general, it is assumed that a customized Supplier Incoming Server 148d will be required for each different type of Communication Server 30 supported by the AMR Server 15.

As shown in FIG. 4, the Dock Control 148b is a logical server, (actually contained within the same process space as the Supplier Incoming Server 148d) that interfaces between the Supplier Incoming Server 148d and the Activity Management Subsystem 146. Dock Control 148b directs incoming service requests from Communication Servers 30 to the activities responsible for servicing the request In some situations, Dock Control services 148b are triggered by data arriving from suppliers, which then directs the work to the appropriate receiving point (Receiving Services). Data may be sent from suppliers as files moved into a receiving DFS directory, an RPC with a reference to a table space, an RPC with a reference to a remote file, an RPC containing an individual update, and an RPC with reference to available messages in a supplier queue.

Dock control 148b is an object whose API acts as a "traffic director." Dock control 148b begins Activity Plans to handle data from suppliers. The differing nature of data (large loads versus outage messages) requires subhandlers (delegated objects) to do the actual work. Therefore, dock control 148b is simply a hand-off point much like the Utility interface 144. As discussed above, Dock Control 148b provides an interface for use by the Supplier Incoming Server 148d.

Referring again to FIG. 4, the Application Subsystems also comprise the Data Management Services. The Data Management Services are provided by two Subsystems, a Data Access Object Subsystem 150, and an Export Subsystem 152.

The Data Access Object (DAO) Subsystem 150 shown in FIG. 4 is the primary Subsystem of the Data Management Services. The DAO Subsystem contains Persistence objects to manipulate the Oracles database, thus isolating the use of the Persistence middleware 108 to a set of specialized servers within this Subsystem. The Persistence objects (DAOs) are object representations of tables within a relational database. Data access objects represent the different components of a database. The objects have a hierarchical relationship to one another; one type of object or collection contains or is contained by another type of object or collection. The DAO Subsystem 150 is responsible for providing the Application Support Services with access to the Data Repository 120. This Subsystem simplifies the storage and manipulation of collected meter samples. Relationships between requesting, storing, retrieving and combining collected data are understandably complex.

The DAO subsystem 150 is provided such that application developers do not need to have an understanding of the relationships of the complex data in the system in order to access the data. Successive layers of encapsulation isolate the complexity of dealing with the complex, data of the system. To this end, proxy objects are used to encapsulate the relationships and behavior of this data. These proxy objects are collectively called "Business Objects." The proxy objects are typically utilized by Manager Servers, as well as by other Application Support Services. For instance, the data and behavior of rate information is complex. This complexity is hidden within a set of rate business objects (e.g., Rate, MeterRate, RateComponent, at MeasurementCapability, etc.) which have a higher level interface called a "Rate Manager 150b."

There are many such business object managers through which application developers access business objects or perform medium-grained operations. There are successive layers of encapsulation that isolate the complexity of dealing with the complex data of the system. These layers comprise the Data Access Object Framework 102 shown in FIG. 3 and discussed below.

The Distributed Access Object Framework 102 is provided to simplify the development of distributed objects in the Encina® environment 106. The system can be considered as consisting of two main framework components, a DOFactory library, which provides a dynamic/runtime interface for creating server objects in the Encina® environment 106. and a code generator (genInterface), which generates business objects and proxies. The Distributed Access Object Framework 102 advantageously provides an environment wherein the creation, deletion and usage of distributed business objects are transparent to the user. The Distributed Access Object Framework 102 also provides standard methods and implementations for all business objects, and hides all details of the Persistence 108 data access objects (DAOs), DCE communications, DCE datatypes, etc.

Figure 14:
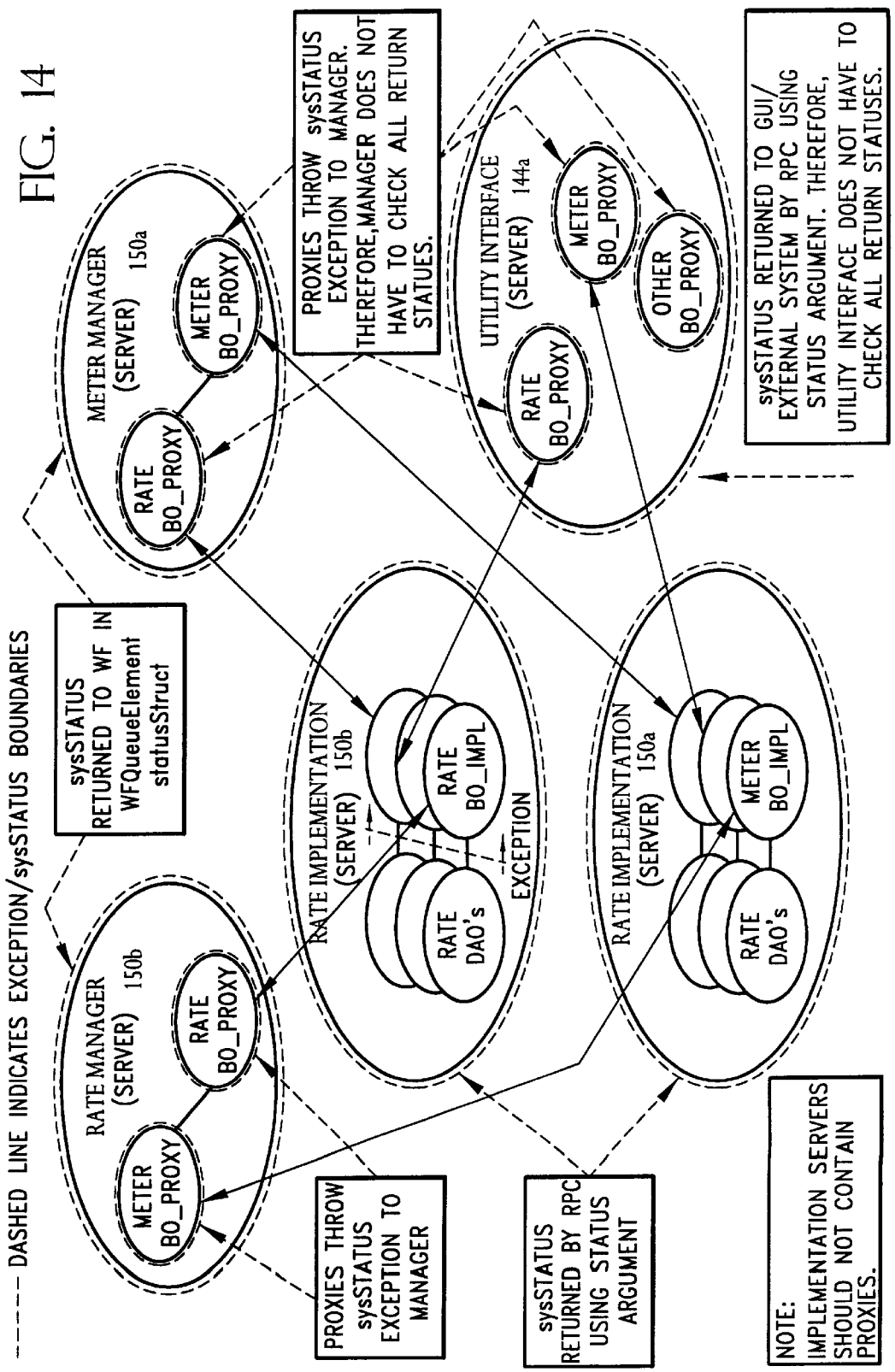
Figure 15:
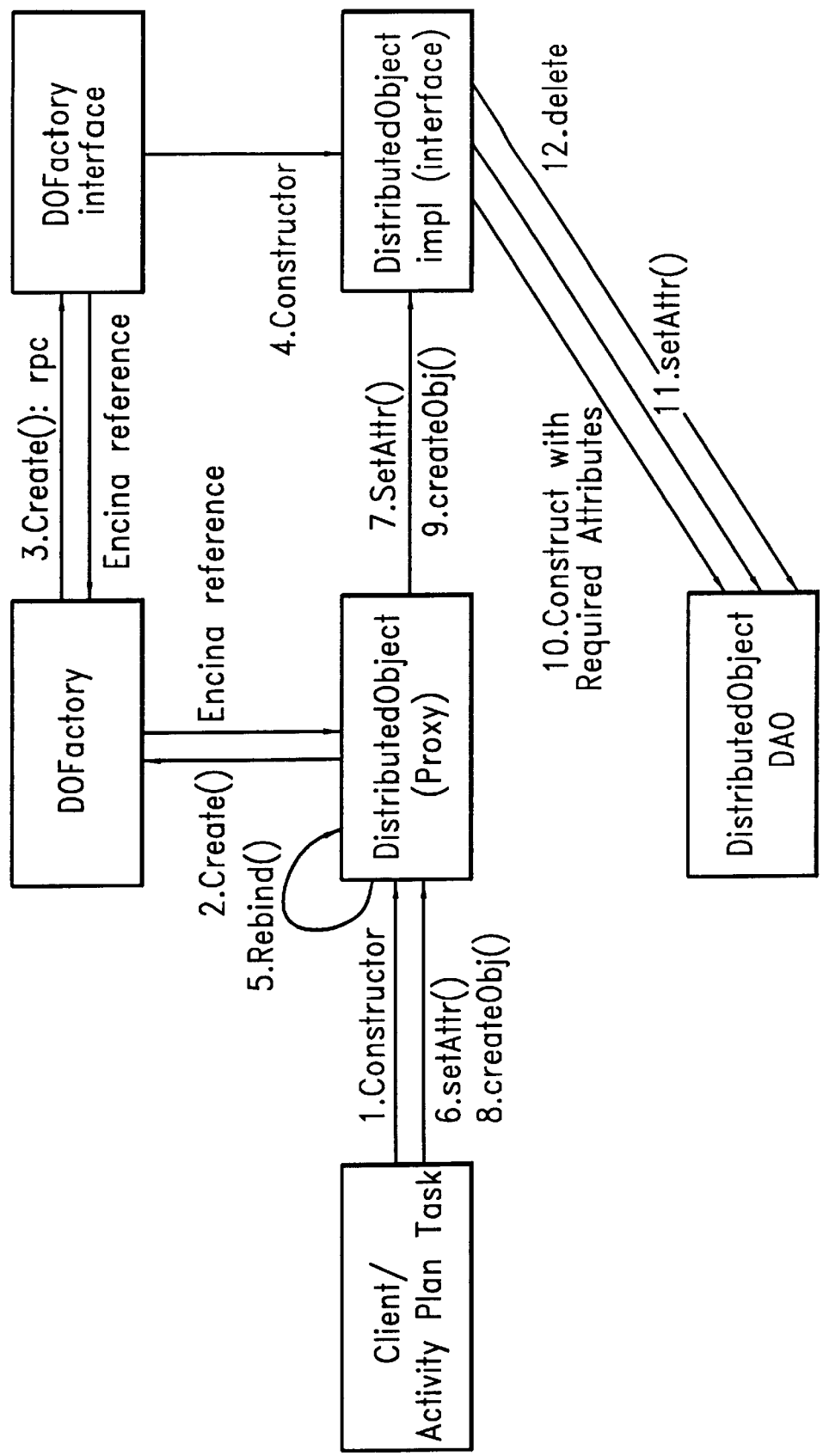
FIG. 15 illustrates the process performed each time a method is invoked on a proxy.

To this end, the Data Access Object Framework 102 provides proxies, manager servers, and back-end implementation servers for the various business objects in the AMR Server. 15. FIGS. 14 and 15 show an example of a meter object, showing the role of the proxy, a meter manager server, and the meter back-end implementation server 150a. As noted above, proxy objects are mapped to DAOs, which in turn are object representations of tables within a relational database. The logical architecture of the DAOs for the various managers and subsystems will now be described.

When a manager server invokes one of the client methods on a proxy, the proxy will call the back-end implementation counterpart to perform the actual work with the associated DAOs. The call to the back-end implementation may be performed via RPC if the proxy and DAO are not in the same process space. The proxies are distributed objects which "stand-in" for DAOs in an Encina® Server. DAOs, by their nature, cannot be distributed and cached in memory. Therefore, proxies represent, or "wrap", their respective DAOs from within Encina® servers, while the DAOs reside in cache for fast access. In this manner, data and transactional integrity are maintained in a distributed environment. This distribution creates a relative lightweight manager server that is responsible for the coordination of various proxies to accomplish the requested AMR domain service. It also provides an isolation of the Persistence middleware 108 to the implementation servers. The manager and implementation servers (shown together in FIG. 4) can hence be distributed across machines if necessary, as the system is required to scale up, without sacrificing transaction integrity. To be efficient, this framework is developed with an option to build the back-end implementation behavior local with the manager server.

Figure 13:
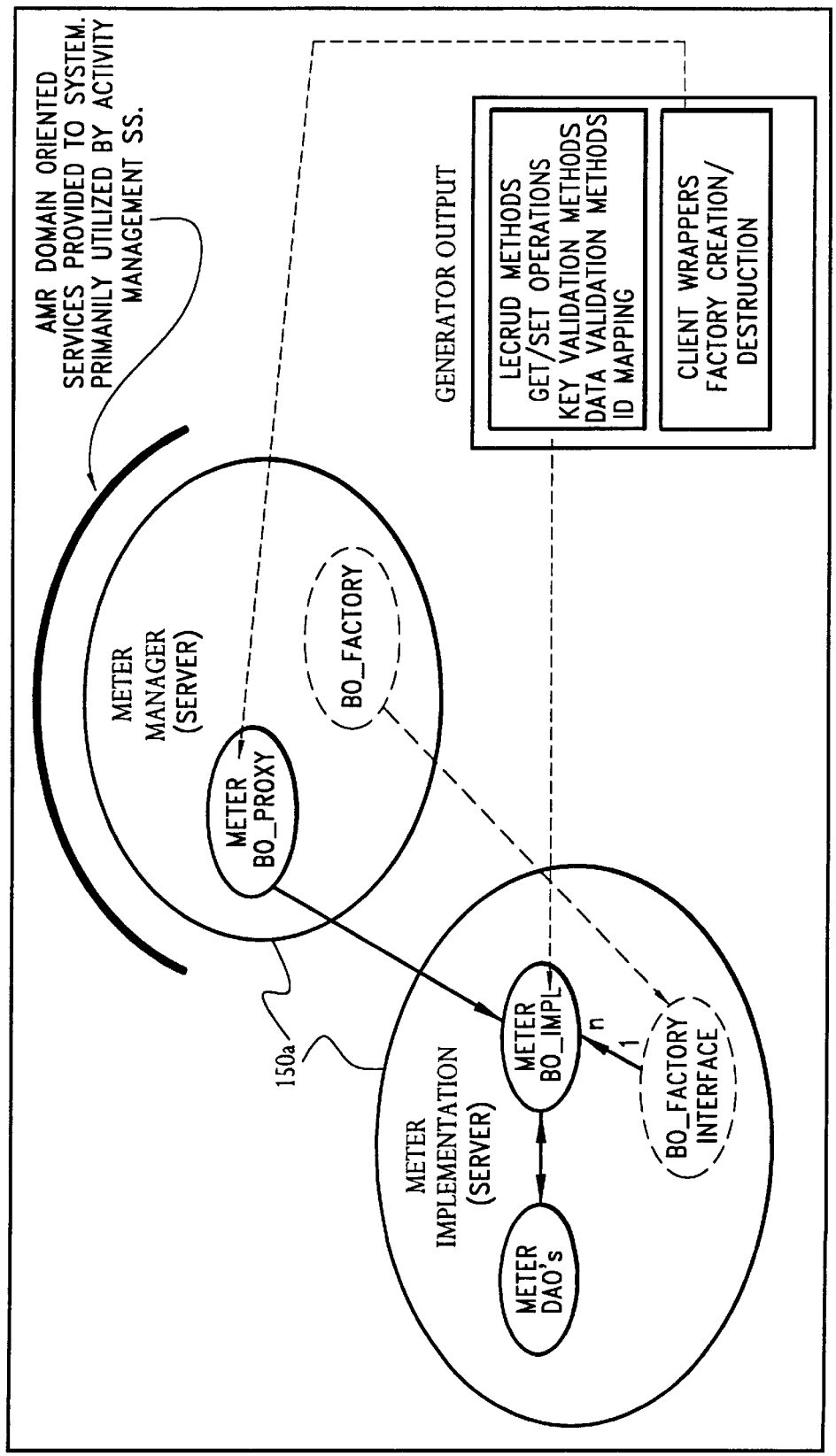
FIGS. 13 and 14 show the interaction between manager servers, proxies, and implementation servers within a DAO Subsystem.

FIGS. 13 and 14 show the interaction between manager servers, proxies, and implementation servers within the DAO Subsystem 150; how other Subsystems can utilize the proxies directly to increase efficiency when simple Create, Read, Update, Delete, List, and Exists (CRUDLE) types of requests are needed; and how exceptions are managed and converted into the standard sysStatus object within the DAO Subsystem.

The Meter Manager Server 150a contains a Rate BO-Proxy in addition to a Meter BO_Proxy. This is typical in the design of all Manager Servers, because the Manager Servers are responsible for providing AMR domain services. For example, the Meter Manager provides the retrieveRatesForMeter service, which requires that it create a Rate Proxy in order to perform "Reads" for the specified meter. Each proxy is coupled with a dedicated back-end implementation, which in turn is coupled to a dedicated set of DAOs (see the Rate Implementation Server 150b and Meter Implementation Server 150a discussed below with reference to FIG. 16).

FIG. 13 additionally shows how the Utility Interface Server 144a (an Application Support Service) may directly create and utilize proxies. This is the typical usage that any Application Support Subsystem can make of the proxies. In these cases, the Application Support Subsystem uses the wrapped Create, Update, Read, Delete, List and Exist (CURDLE) methods, provided by the proxies to perform these simple operations against the Implementation Servers and the Data Repository 120. In these examples, the AMR domain knowledge provided by the Manager Servers is not required.

Although not explicitly shown in FIG. 13, the design also supports Implementation Servers that do not have an explicit Manager Server like Meter Manager 150a and Rate Manager 150b. An example of this type of Implementation Server is the External Translation Implementation Server. In this case, other Manager Servers that need translations from this Implementation Servers will create and use the External Translation Proxies, whose back-end implementation and DAOs reside in the External Translation Implementation Server.

FIG. 13 also shows the exception handling and sysStatus conversion performed within the DAO Subsystem 150. The primary purpose of the system status (sysStatus) is to drive the activity plan logic. In addition, sysStatus is used for information purposes outside of the AMR Server 15 system. Exceptions should not be thrown across a server boundary due to the limitations of Encina® exception handling.

The responsibilities of the Manager/Other Servers (users of proxies) are to catch sysStatus exception thrown by proxies (for logic control), convert sysStatus exception into appropriate sysStatus based on context and return via RPC in the status argument or in WFQueueElement statusStruct, catch communication exceptions, and catch base exceptions. The responsibilities of the Implementation Server is to: catch all exceptions, translate to sysStatus and return via RPC in status argument, and never re-throws exception across server boundary.

Referring to FIG. 15, there is shown the process performed each time a method is invoked on a proxy. When the client needs to use a distributed object, it calls the constructor (step 1) on the distributed object. From the client's view, this is similar to calling constructors on any object. Internally, however, the distributed object/proxy knows that it is named DOFactory, and calls a Create (step 2) on the factory. This results in the Create RPC (step 3) to the DOFactoryInterface on the server. The Create routine implementation on the server calls (step 4) the constructor on the DistributedObjectInterface using ObjectStore and Performer. The RPC then queries the interface object for its Encina® reference and returns it to the caller of the Create RPC, which returns it to the proxy. Once the distributed object proxy receives the reference, the proxy calls a Rebind (step 5) on itself using the reference. At this point, the proxy is setup with a one-to-one correspondence with a back-end interface object.

If the user calls, e.g., setattr( ) on the proxy (step 6), the framework routes the call through a corresponding RPC. With regard to transactional work, any work that it is peformed by the distributed object that needs access to the database is accomplished via transactional RPCs between the proxy object and the back-end implementation (e.g., CURDL methods). The distributed objects perform CURDL methods using key values/attributes that are set (step 7) on the business objects. Typically, the client starts a transaction by invoking a transactional method, such as createObj( ) (step 8) on the proxy. This results in a transactional RPC to the back-end implementation (step 9). With the transactional RPC, a XA connection through Persistence is opened and the Persistence DAOs are constructed (step 10). All of the attributes are next copied from the back-end implementation to the DAO (step 11). The DAO is deleted (step 12), which flushes its data to the database 120. The XA connection is then closed. Thus, the Persistence DAOs never exists across a transaction RPC, as they are mainly used to pass data to the database. Once a client commits, all changes are committed to the database. Top level scenarios of the above are contained in Appendix A.

The Data Access Object Manager Servers 150a–150p illustrated in FIG. 4 will now be described. The Manager Servers 150a–150p are primarily used by the Dispatcher Brain 146b of the Activity Management Subsystem 146. The services/methods provided by the Manager Servers 150a–150p are typically tasks of an Activity Plan. This section will highlight the medium grained services provided by the various Manager Servers 150a–150p shown in FIG. 4. As will be evident to those of skill in the art, the services are named are merely exemplary as other services may be performed by the various servers.

The Meter Manager Server 150a is responsible for providing all services related to meters 60. The Meter Manager 150*a* may provide services to add a meter, add a meter mapping, install or uninstall a meter, update meter data, terminate a meter, computer or verify a meter stage, set a meter connect status, and retrieve accounts or rates for a meter.

The Rate Manager Server 150*b* is responsible for providing all services related to rates. For example, the Rate Manager 150*b* may provide services to add or remove a rate, retrieve rate components, and assign and de-assign a meter to a rate.

The Meter Group Manager Server 150*c* is responsible for providing all services related to meter groups (e.g. Accounts, Data Collection, etc.). To provide these services, the Meter Group Manager 150*c* will interact with the Account Implementation Server, and the Data Collection Implementation Server. The Meter Group Manager 150*c* may provide services to add, modify or remove an account, retrieve meter rate for an account, terminate meter groups, retrieve meters for a group, assign meters to a group, de-assign meters from a group and compute a group stage.

The Receiving Manager 150*d* is responsible for loading the received and mapped data into the repository. This is accomplished either through a bulk loading process for large shipments of data, or through the DAOs for individual on-request meter reads. The Receiving Manager 150*d* may provide services such as receiving a meter reading, and receiving a but loading.

The Reading Manager 150*k* is responsible for retrieving reading samples from the AMR Data Repository 120. The Reading Manager 150*k* services include retrieving readings (using freshness), assembling reading data, and retrieving readings for meter rates.

The Capability Manager 150*j* is responsible for determining the abilities of a particular component instance. "Capabilities" are attributes of various types of component an AMR Server 15. For example, meters 60 of different types have different capabilities that can support. In addition, the different communication systems have different capabilities they support. "Abilities" are enabled "capabilities" for an individual component. In other words, abilities are instance-based. The Capability Manager 150*j* may provide services that assign capabilities and validate rate components.

The Reference Data Manager 150*n* is responsible for efficiently providing various lists of reference data like meter ID's, meter types, communication types, etc. from the AMR Data Repository 120. The Reference Data manager 150*n* utilizes Persistence DAOs directly to retrieve this information via simple queries from the AMR Data Repository 120. The Reference Data Manager 150*n* does not use proxy objects and hence an Implementation Server does not exist for reference data. This information is primarily utilized by the GUI Subsystem to obtain lists from the AMR Data Repository 120 for users to select from. The Reference Data Manager 150*n* a service to retrieve reference data.

As discussed above with reference to FIG. 14, the Data Access Object Implementation Servers 150*a*–150*p* contain the back-end implementation for the proxy objects and the Persistence DAOs. The back-end implementation provides users of proxies with services that operate on associated Persistence DAOs and, hence, their related Oracles tables. The services performed by the implementation servers below are provided for exemplary purposes and are not limited to only the noted services.

The Meter Implementation Server 150*a* provides the users of meter proxies with the meter-related services, such as changing or setting a meter, and retrieving and setting meter configuration information. The Rate Implementation Server 150*b* provides the users of rate proxies with services, such as creating, updating and reading rate information from a meter. The Schedule Implementation Server 150*i* provides the users of schedule proxies with services that include retrieving and schedule times and events. The Meter Group Implementation Server 150*c* provides the users of meter group proxies with services that include modifying meter groups, defining meter group properties, and mapping meters to groups. The Account Implementation Server 150*p* provides the users of account proxies with services, such as determining account names, group status, and defining account information. The MeterGroupManager Server 150*c* is the primary server that will utilize the services of the Account Implementation server 150*p* through the proxies. The Data Collection Implementation Server 150*g* provides the users of data collection group proxies with data collection services. It is primarily the MeterGroupManager Server 150*c* that will utilize these services through the proxies. The SampleDataImplementation Server 150*f* provides the users of sample data proxies with services, such as reading sample data, and determining validation information. The External Translation Implementation Server 150*h* translates from external to internal representation and vice versa. All manager servers that require ID translations between internal and external representation utilize the services of the External Translation Implementation Server 150*h*. Some typical objects that have external representations are: meters 60, rates, schedules, Communication Servers 30, accounts, data collection groups, etc. The External Translation Implementation Server 150*h* provides the users of external translation proxies with services that perform operations on the associated Persistence DAOs and hence their related Oracles database tables. The External Translation Implementation Server does not have a specific manager server, but is used primarily by the Utility Interface 144.

Referring again to FIG. 4, the AMR Server 15 is responsible for generating exports of data to the external application systems. The AMR Server 15 reports scheduled billing data, deferred requests, supplier performance statistics, etc. The data used for these reports is available through the business objects managed by the Business Object Servers. However the results are gathered, mapped, and formatted for the export to Application Systems. These services are encapsulated by the Export Subsystem 152. The export operation is driven by activity plans specific to a export scenario, but the services necessary to produce the export are contained within the generator along with fine and medium-grained control objects.

Referring to FIG. 4, the Export Subsystem 152 is comprised of two servers, an Export Manager (EM) 152*b* and a Validation, Editing, and Estimation (VEE) Manager 152*a*. These servers will process a large volume of data, so efficiency is an important consideration. One of the first functions the Export Subsystem 152 supports is generating a report for Billing. In order to perform the billing process, data may require validation, editing, and estimation.

The data export subsystem 152 of the AMR Server 15 uses template files to dynamically define what data is exported from the AMR database 120. The basic concept of the export process is to extract data for a given hierarchy of information from the AMR database 120 for a given date range and write the data to a file using a specific file format. This file format is termed herein the AMR File Format. For example, an export of billing data from the AMR Server 15 consists of producing a file containing a hierarchical grouping of accounts, meters, data components and meter readings. That is, an account contains meters which contain data components which contain meter readings, all of which are scoped by the supplied date range. A template file defines what attributes will appear in the export file for each object in the hierarchy. For example, a meter has many attributes associated with it, such as its transformer factor, meter id, communication status, type, etc., but for billing purposes, this information may not be relevant. However, for the purpose of loading this meter into another database, all of the attributes may be necessary. The concept of a template helps solve this problem by allowing specification of what attributes will be extracted from a given object for a particular export job. Each type of export can use a different template, which allows extraction of only the required information. This advantageously provides for faster export times and smaller export files.

The following is an example of a template entry for a meter object in the AMR server 15.

+Meter
  MeterId:meterid|getMeterId|long
  TransformerFactor:transf|getMeterMultiplier|float
  CommStatus:commst|get|CommunicationStatus|
    RWCString
-Meter As an example export, a script is used that maps the AMR Format File into the export format. As an example import, the import file may by converted into a set of C++ objects. The template is applied against the objects to produce the AMR Format File, similar to the business objects noted above. The AMR Format File is then loaded into the Receiving Subsystem 150d.

The Export Manager (EM) 152b is one of the agents in an activity plan. When generating a billing report, the EM 152b will receive a list of account IDs to process and a Utility ID and Role. For each account, the EM 152b will retrieve a list of meters 60 for that account. The EM 152b then interrogates each meter to determine the rate for the given Utility ID and Role. Once the Rate for that meter is known, the meter components can be determined. For each meter component, one or more readings are gathered. As is evident to one of skill in the art, this nesting of information will make it difficult to assemble the export data in a mass query manner.

Each reading is preferably validated (and possibly estimated) before it is exported. This creates a problem for EM 152b in that data must be written for estimated readings and each reading must be updated as having been validated. In addition, this makes what would normally be non-transactional database operations transactional. Such operations pose problems in that there is a limitation in the number of database operations that can be performed in a single transactional unit (smaller batch units), and that transactional reads involve XA overhead and can significantly slow the process.

The Validation, Editing, Estimation (VEE) Manager 152a is responsible for performing the validation, editing, and estimation specified by a particular Regulatory Agency to produce settlement quality data for export from the AMR Server 15. As with all Encina® Servers in the system, the VEE Manager 152a uses the AppServer classes to receive service requests through RQS. The VEE Manager 152a uses a directed graph and the performer to execute different functions. Each request is for VEE 152a on a particular meter/rate combination and will be executed within its own thread. Although shown logically as existing within the Export Subsystem 152, the VEE Manager 152a is actually contained within the same process space as the Reading Manager. The VEE Manager 152a will nonetheless provide a separate interface and be bound to as if it was a separate server. It physically resides with the Reading Manager as a performance optimization to minimize the transport of data across the network and benefit from local Persistence object caching. FIGS. 34A–D illustrate the various threads executing in the VEE 152a.

The validation, editing and estimation tasks must be performed on raw data to certify the data as settlement quality. Associated with these validation checks are specific estimation algorithms that must be performed on the raw data when a validation checks fails. The raw and estimated data values may also need to be stored and maintained for years due to legal stipulations regarding billing disputes. The additional storage of estimated data not only compounds database sizing and performance problems, but also creates the need for temporal solutions (discussed below).

A thorough analysis of abnormal billing scenarios yields several situations that require an AMR Server 15 to maintain multiple versions of history of both the raw and estimated. data for a meter 60. For example, consider the scenario where all of the billing data from an individual meter cannot be collected due to a communication failure. The specified VEE rules will plug the missing data to produce settlement quality data for this meter to support the customer billing process. In the case where the actual raw data for this meter happens to arrive after the customer billing process has completed, then a bill adjustment process is required. The actual raw data received from this meter requires validation to be performed before it can be used to determine the appropriate bill adjustment. This validation process may fail any one of the specified validation tasks fail and require estimation to produce settlement quality data for the bill adjustment. For example, if in the future (one month later), the customer has a billing dispute related to this abnormal billing period, a complete history of both the original and the adjusted billing transactions (including the raw and estimated data) will be required to resolve the customer dispute.

Another example of billing abnormalities is a case where configuration data (e.g., the transformer factor) for a customer's meter was entered incorrectly and went undetected for several monthly billing cycles. In this case, the MDMA needs to correct the configuration data (transformer factor) for the meter and recompute the several months of bills for this customer to determine the adjustment. Since both the original and recomputed raw and estimated data sets were used to support the billing process, this data must be maintained by the system to resolve any future billing disputes.

In order to accomplish validation, editing, and estimation the VEE Manager 152a will use local Activity Plans and a local dispatcher to run these plans. This Local Dispatching approach has been designed for use in VEE 152a to take advantage of the fact that all primary objects used in VEE 152a are in the same process space. The Local Dispatcher performs a Local Activity Plan which only executes Local Operations that carry out actions on local objects. Local operations generate a workflow slot, and a ForcedRereadNeeded, which indicates the need to reread the physical meter 60 or communication server 30 to retrieve more accurate readings for a specified time period and then reapply the readings to the VEE 152a. All parameters are in the blackboard. Other batched services may use the Local Dispatching approach for performance enhancement, if they also depend strictly on Local objects performing synchronously. This implementation uses a modified version of the infrastructure developed for the Activity Management Subsystem 146. The directed graph logic will contain the Regulatory Agency specific tasks and rules.

The Local activity plan (workflow) acts as a task list which the Local dispatcher reads. For each task, the Local dispatcher requests the Performer to perform the task. The Performer uses a method dictionary to lookup the Functor associated with the task. A Functor object executes the appropriate C++ method to do the actual work of the task.

The VEE interface 152a is used by the other Subsystems within the AMR Server 15. The service provided by the VEE 152a include checking for missing components, usage interval information, computing various consumption data, estimating load profile usage, determining if a meter requires maintenance, prorating usage and load profile, and estimating usage.

Figure 16:
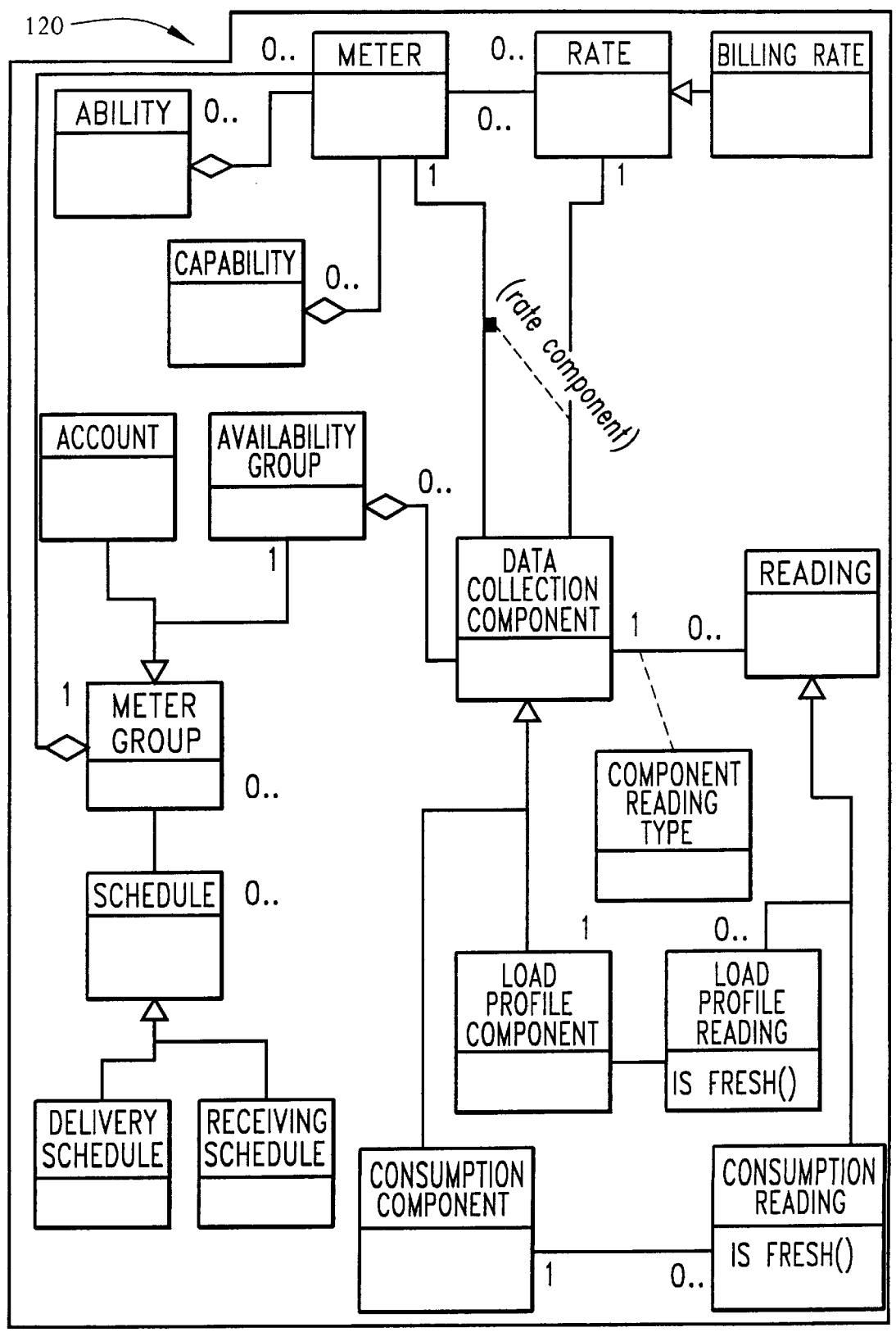
FIG. 16 illustrates an exemplary structure of the database designed as a high-level object model.

Referring now to FIG. 4, the Database (AMR Data Repository 120) is an Oracle® Relational Database Management System (RDBMS.) The structure of the database is designed to represent a high-level object model, as shown in FIG. 16.

With respect to data storage, two signal factors of the AMR Server 15 preferably utilizes a distributed approach because of the tremendous volume of data stored, and the extremely high rate of data capture, manipulation, and extraction. For example, one meter undergoing 15 minute load profile readings on 2 channels for 24 hours per day, having a 37 month data retention period, requiring an average of 63 bytes per row, one VEE reading per raw reading and a 10% re-read and re-validation, will require 14.97 megabytes (Mb) of storage space for its readings only. Given this per meter storage requirement, data storage requirements are as follows:

| Metered Points | Data Storage Requirement |
| --- | --- |
| 1000 | 15 Gigabytes |
| 10,000 | 150 Gigabytes |
| 100,000 | 1.5 Terabytes |
| 1,000,000 | 15 Terabytes |

In addition, the data insert rate is also large. Using Ardis, communication with meters is available only 4 to 6 hours per day, usually between 10 p.m. and 4 am. In the 1000 meter system scenario above this means the AMR database 120 performs 96 raw readings per meter, with an average size of 63 bytes per reading, or 96,000 inserts. This works out to 4.44 inserts per meter per second for a six hour collection period. When scaling is considered:

| Metered Points | Inserts per second |
| --- | --- |
| 1000 | 4.44 |
| 10,000 | 44.4 |
| 100,000 | 444 |
| 1,000,000 | 4440 |

A conventional Unix relational database server installation consists of a single Unix host with a single relational database server process (or set of processes). Given this configuration, conventional relational databases begin to experience trouble keeping up with an insert rate somewhere between 200 to 500 inserts per second. Thus, the conventional relational database server is inadequate to support the desired scalability of the AMR database. To resolve this, the data repository 120 of the present invention employs a distribution of the workload. This is accomplished by using multiple hosts to perform database duties. This type of parallelization may take two forms. The first being a true database distribution, in which multiple, wholly separate hosts operate separately under the control of a managing process, and the second being parallelization, in which a machine may have multiple CPUs, I/O busses, etc, and may further participate in a loosely-coupled cluster of machines that address a shared disk farm.

Meters 60 can be associated with one-or-more Rates, combined into Meter Groups, and have many Capabilities and Abilities. Capabilities are based upon meters types and specify the functionality supported by this meter type. Abilities are associated with a particular instance of a meter and represent capabilities that are enabled by the programming of this particular meter. Rates specify what data is required to be collected for particular purpose (i.e. Billing). When a Meter 60 is assigned to a particular Rate, the Meters Abilities are checked to verify that the Meter 60 can support the data requirements specified by the Rate. A Rate is made up of Data Collection Components. These components have various types (Load Profile Components, Consumption Components, etc.). These components have Readings (Consumption Reading, Load Profile Reading) that are associated with Data Samples. Meter Groups are associated with Schedules and are specialized into two types Account and Data Collection.

Accounts are specialized groups that are related to the billing process. Accounts contain meters that have different Rates that are used to bill a particular customer. Data Collection groups are meters 60 that share the same Data Collection Components. These groups are primarily used for collecting like data from meters 60 possibly for export from the AMR Server 15 to an Application System.

Each of the objects in the high-level object diagram of FIG. 16, is mapped to the database as illustrated in FIGS. 17–25.

Figure 17:
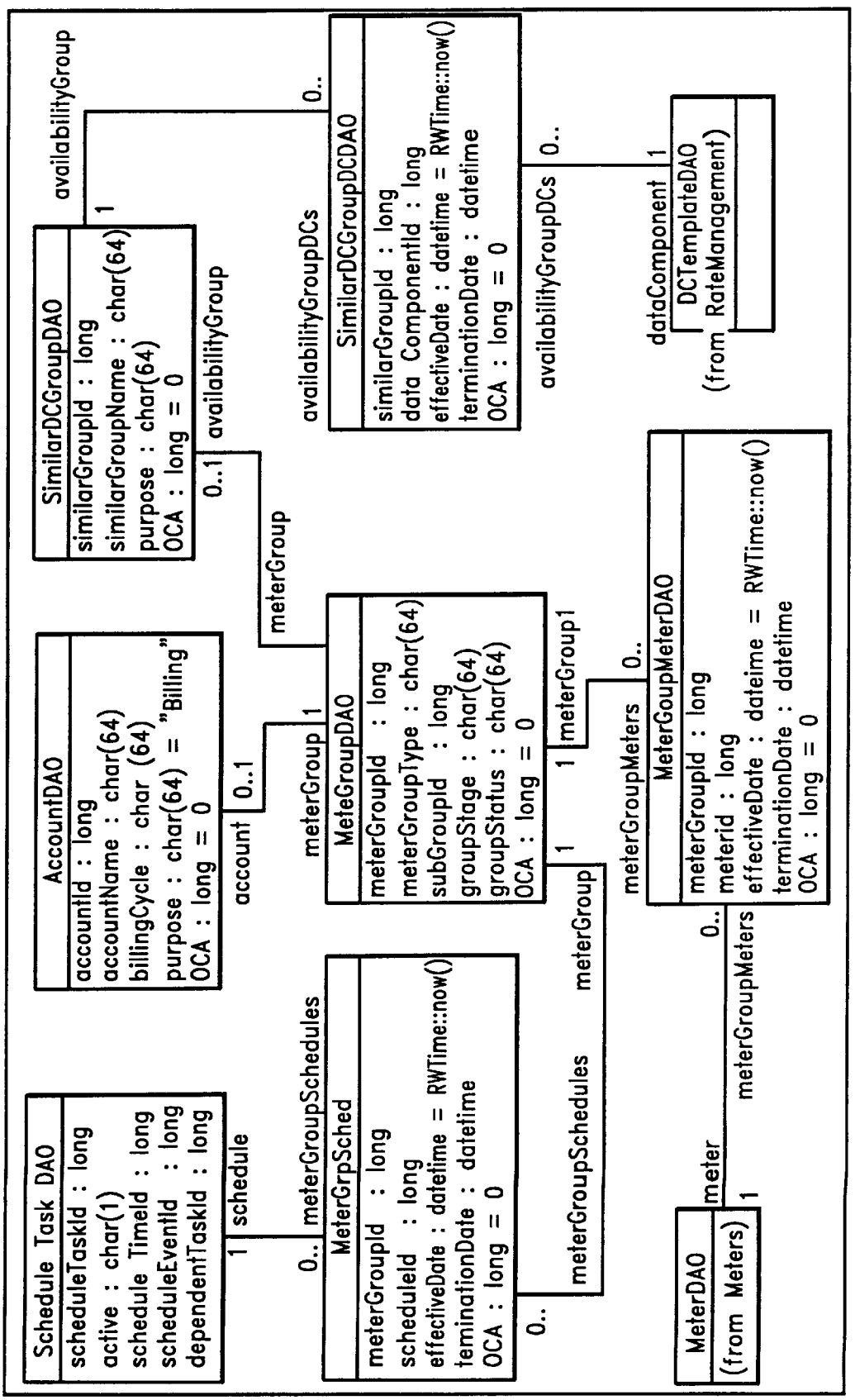
FIG. 17 illustrates the logical architecture of the account management subsystem.
Figure 18A:
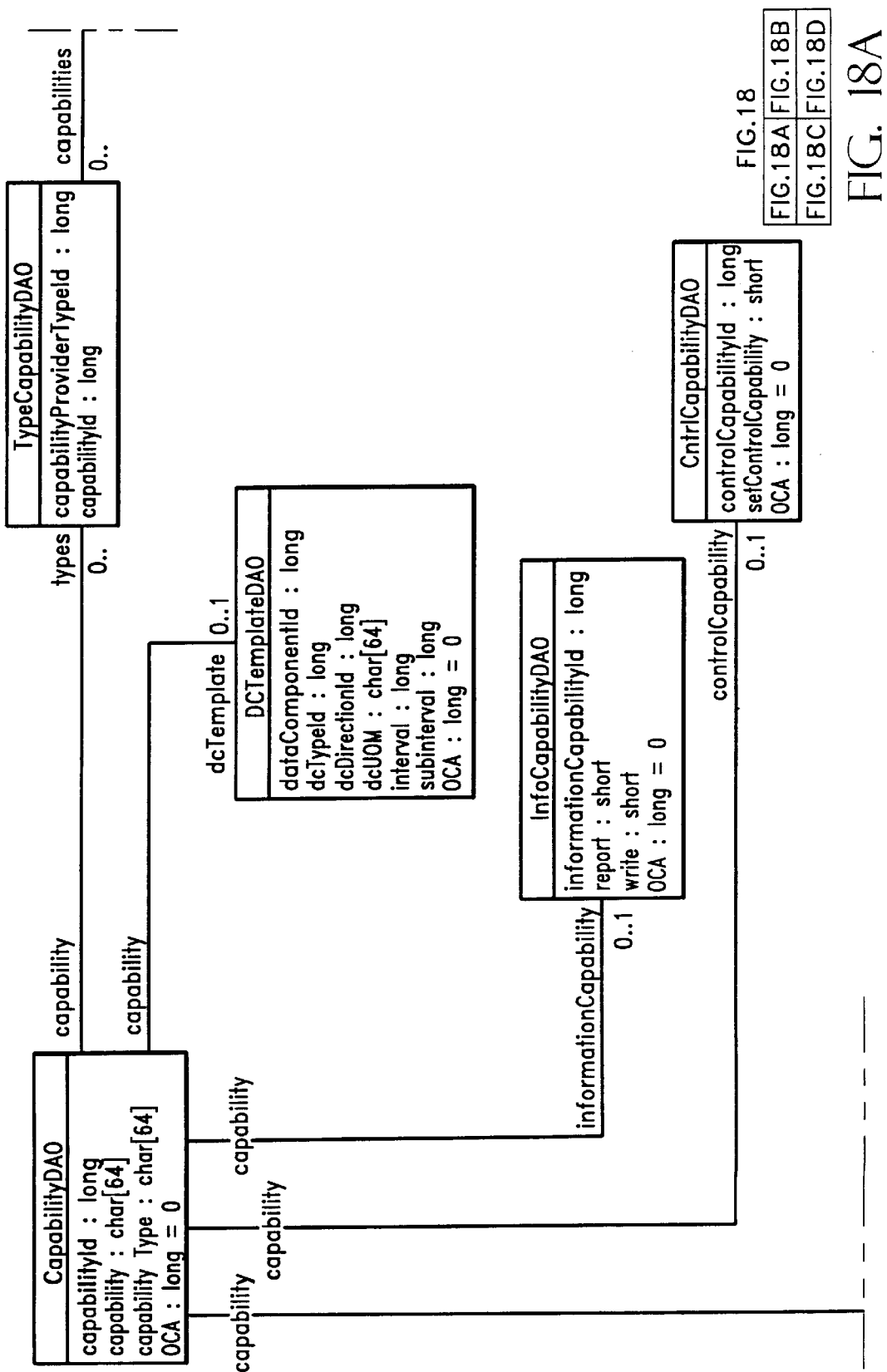
FIGS. 18A–D illustrate the logical architecture of the capability manager.
Figure 18B:
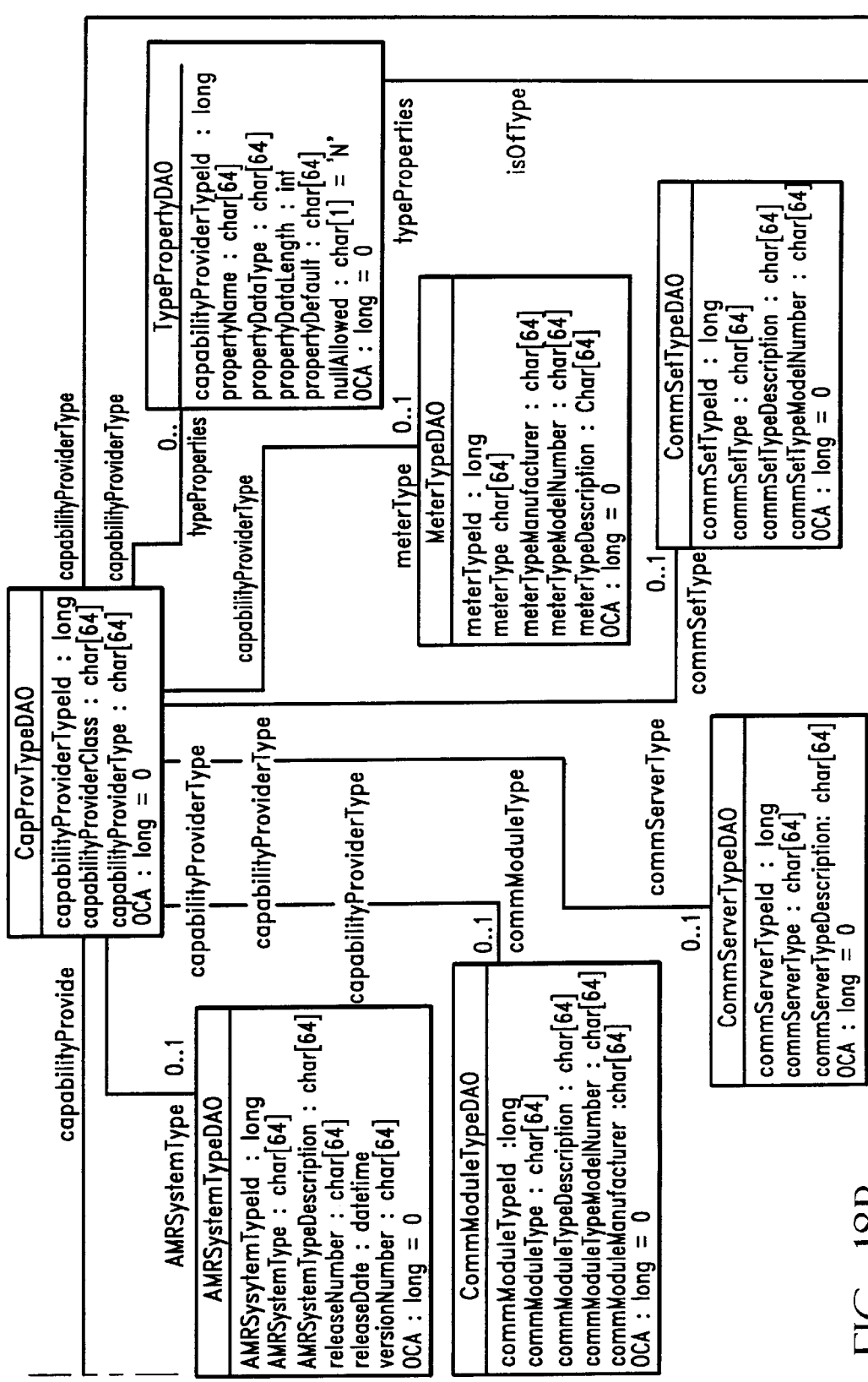
Figure 18C:
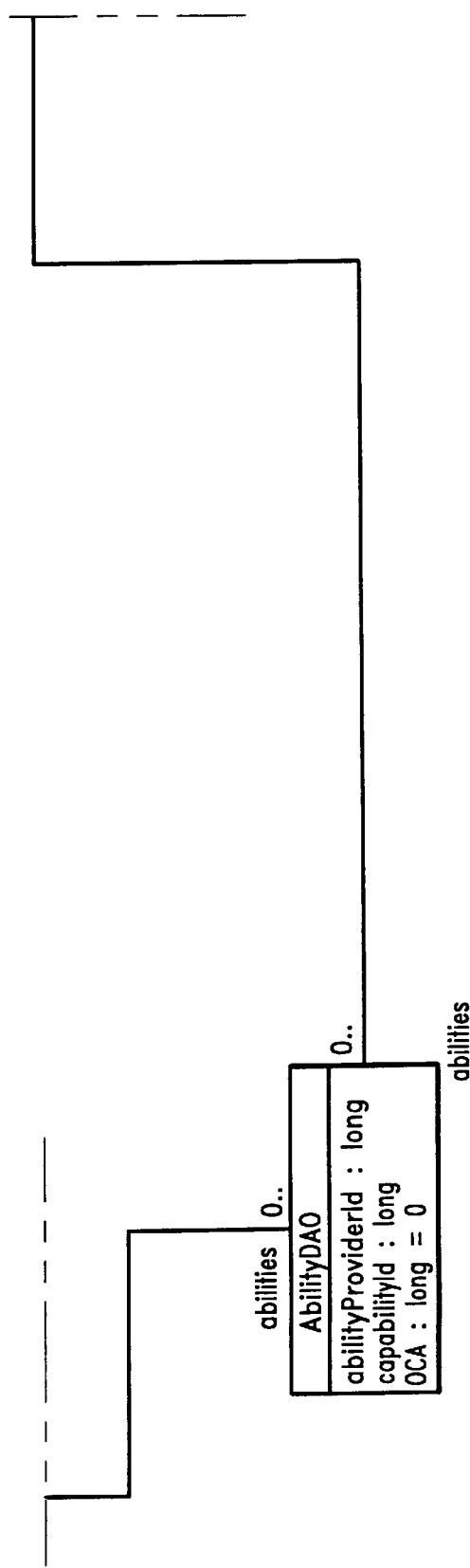
Figure 18D:
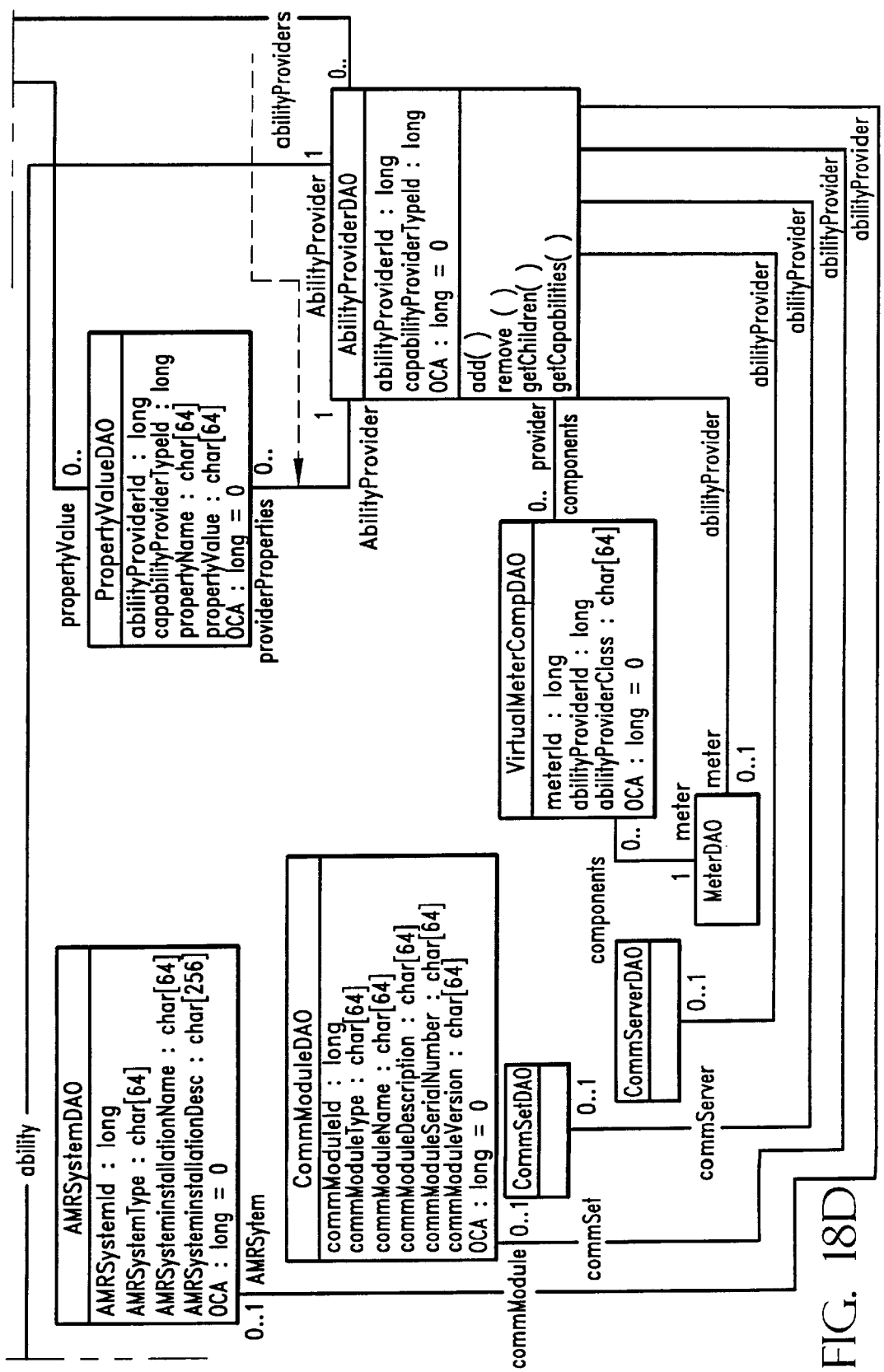
Figure 19A:
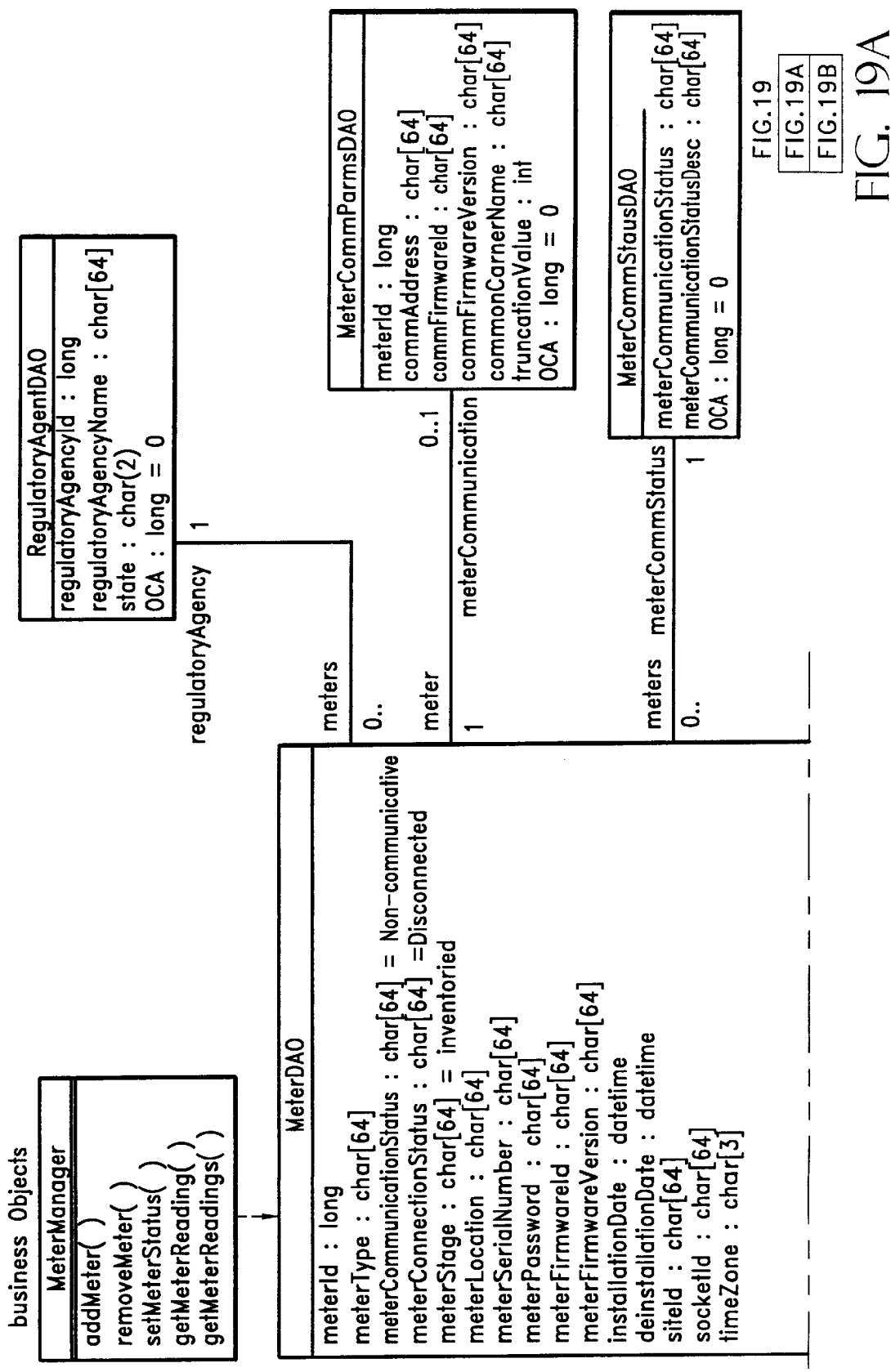
FIG. 19 illustrates the logical architecture of the meter manager.
Figure 19B:
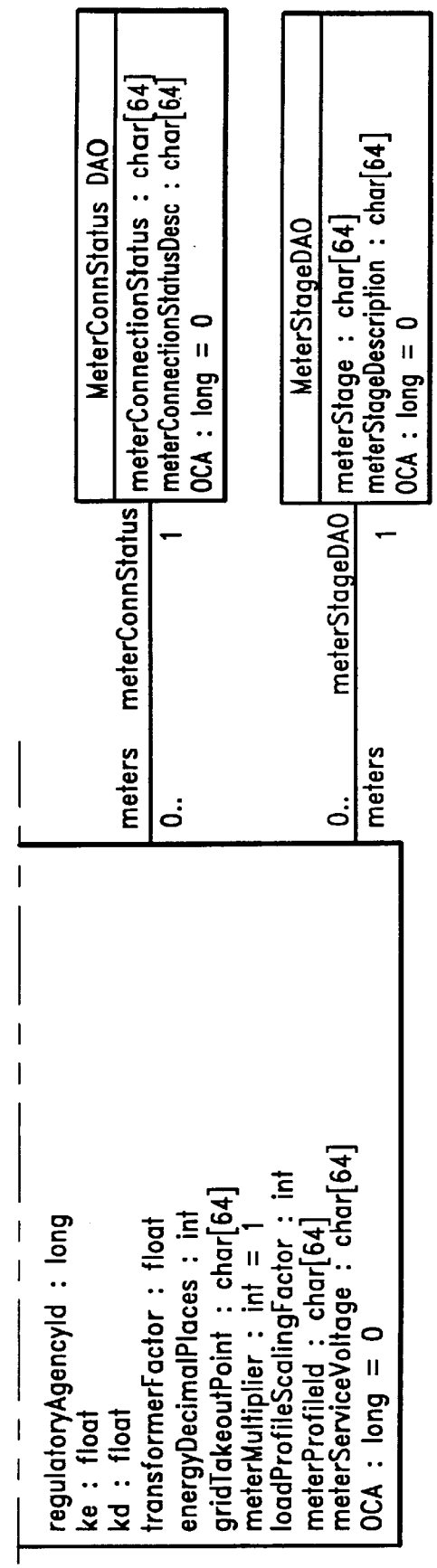
Figure 20:
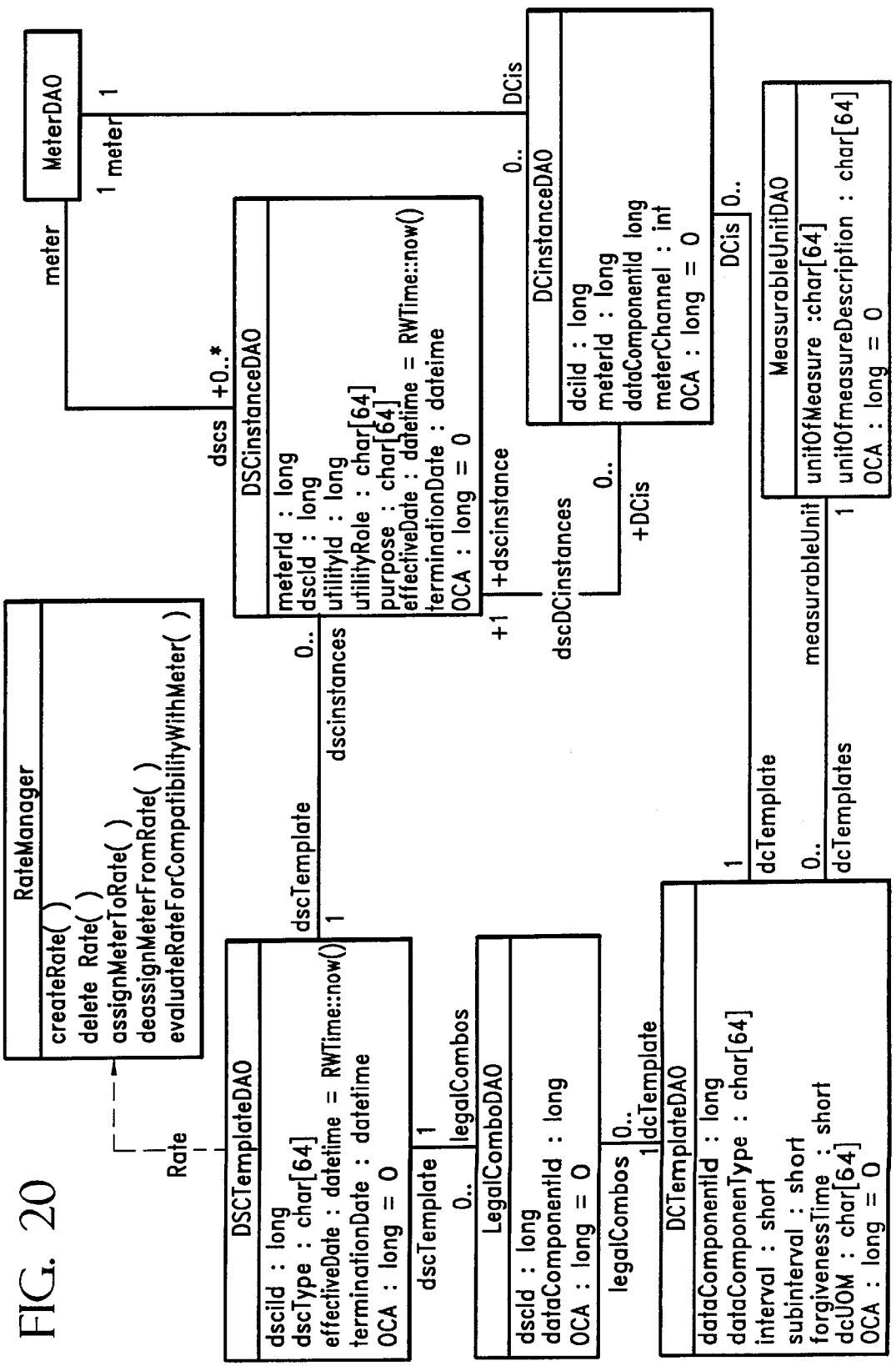
FIG. 20 illustrates the logical architecture of the rate manager.
Figure 21:
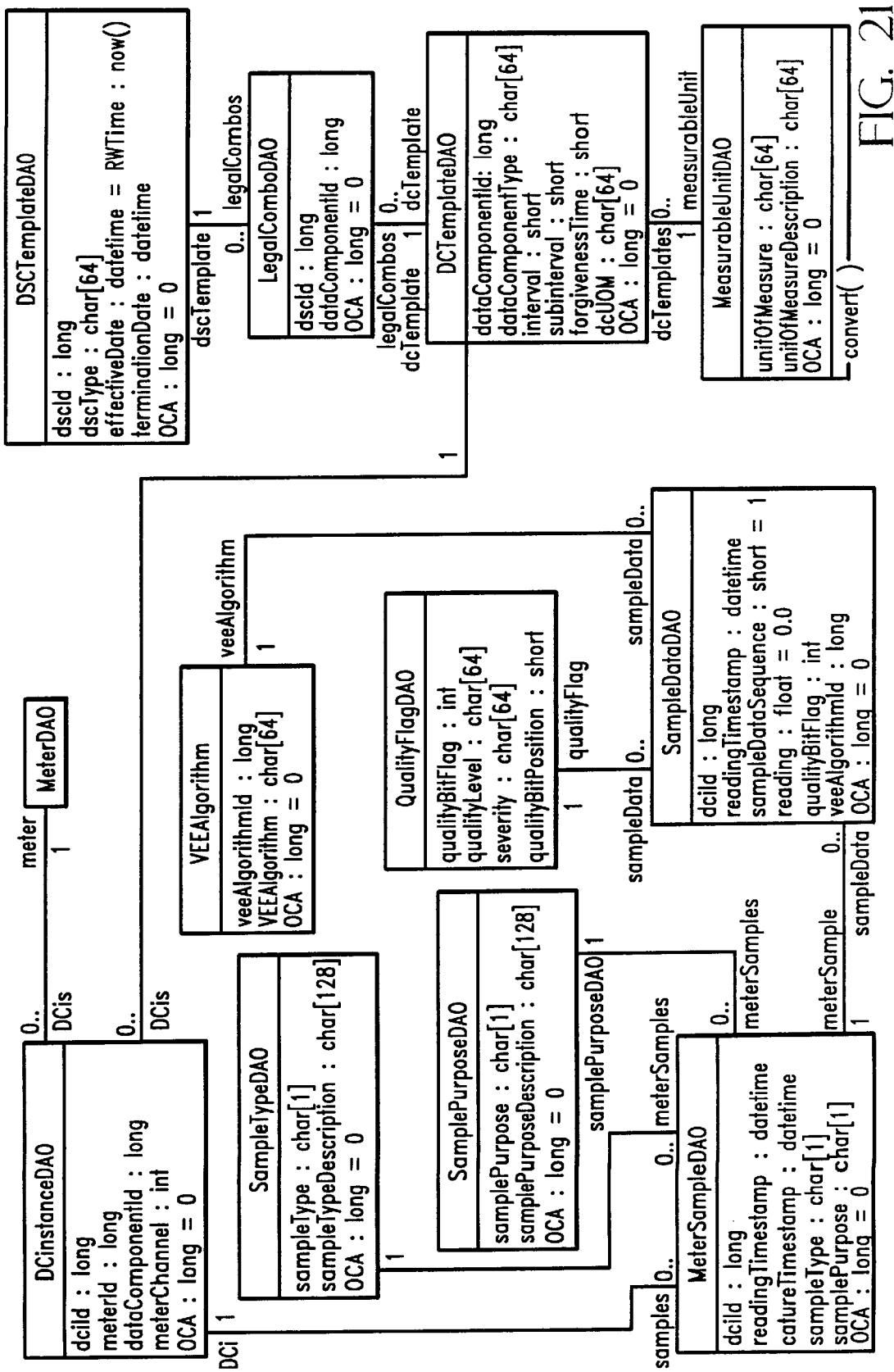
FIG. 21 illustrates the logical architecture of the reading management server.
Figure 22A:
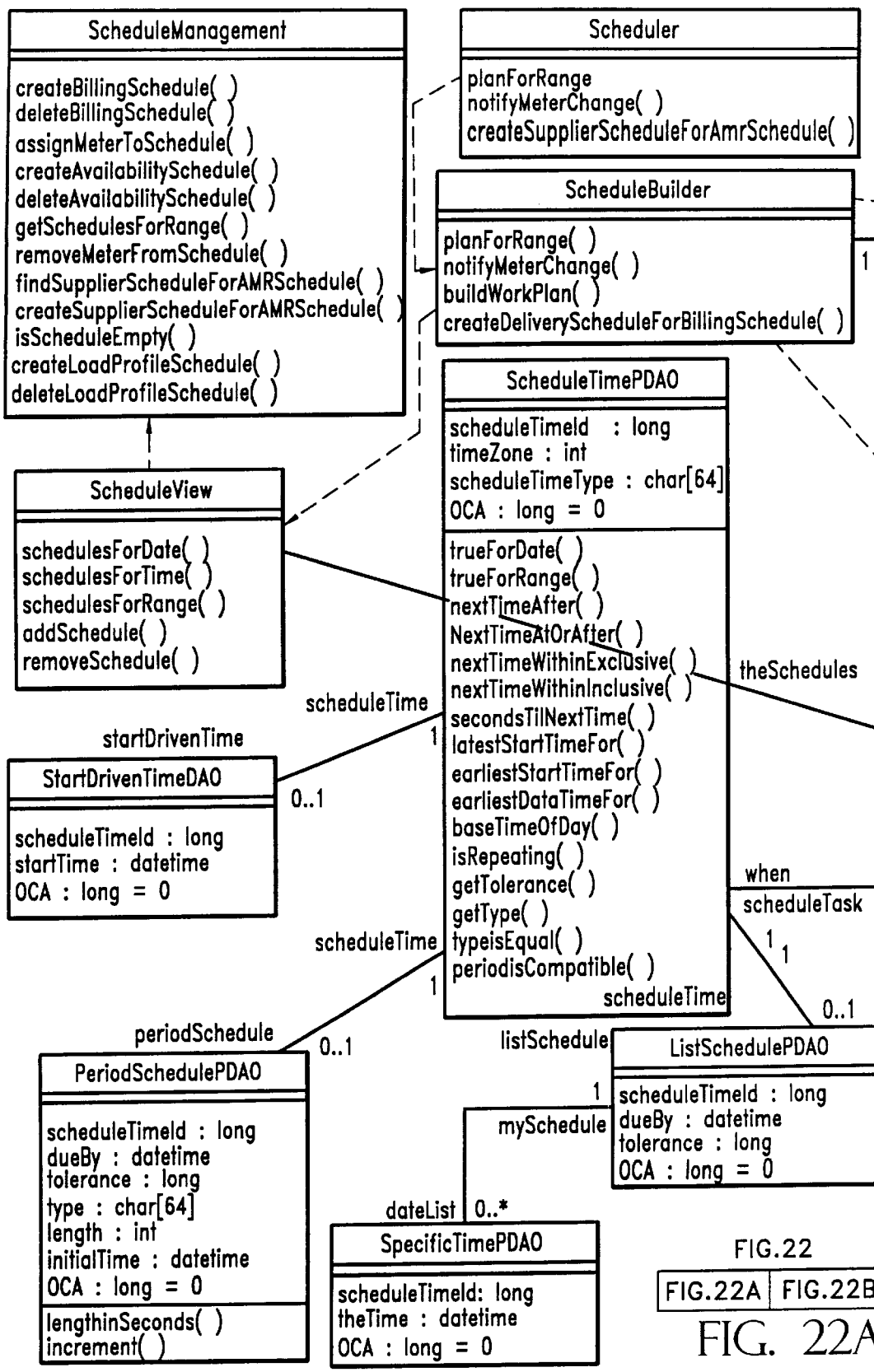
FIGS. 22A–B illustrate the logical architecture of the schedule manager.
Figure 22B:
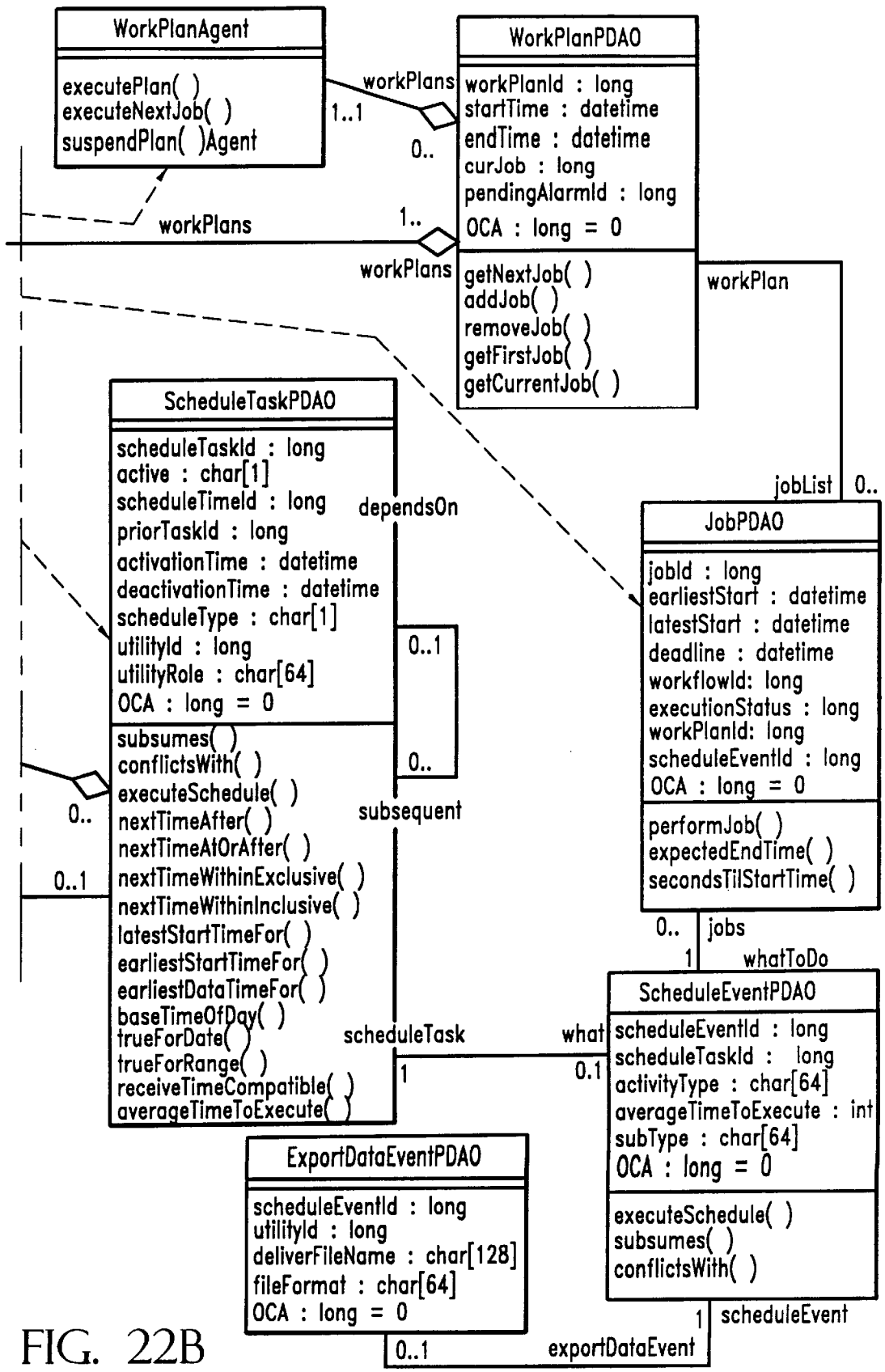
Figure 23A:
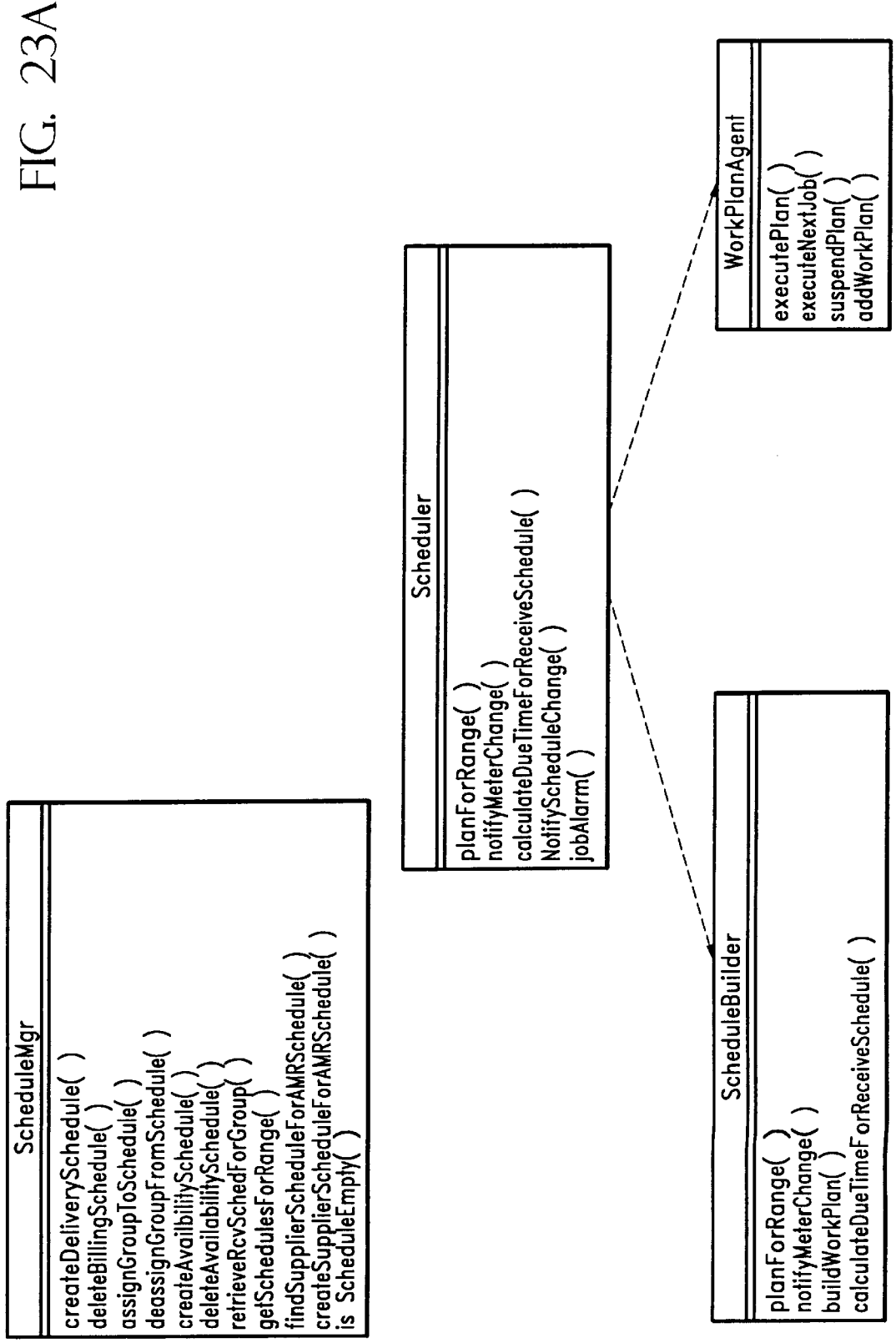
FIGS. 23A–E illustrate the Schedule Manager.
Figure 23B:
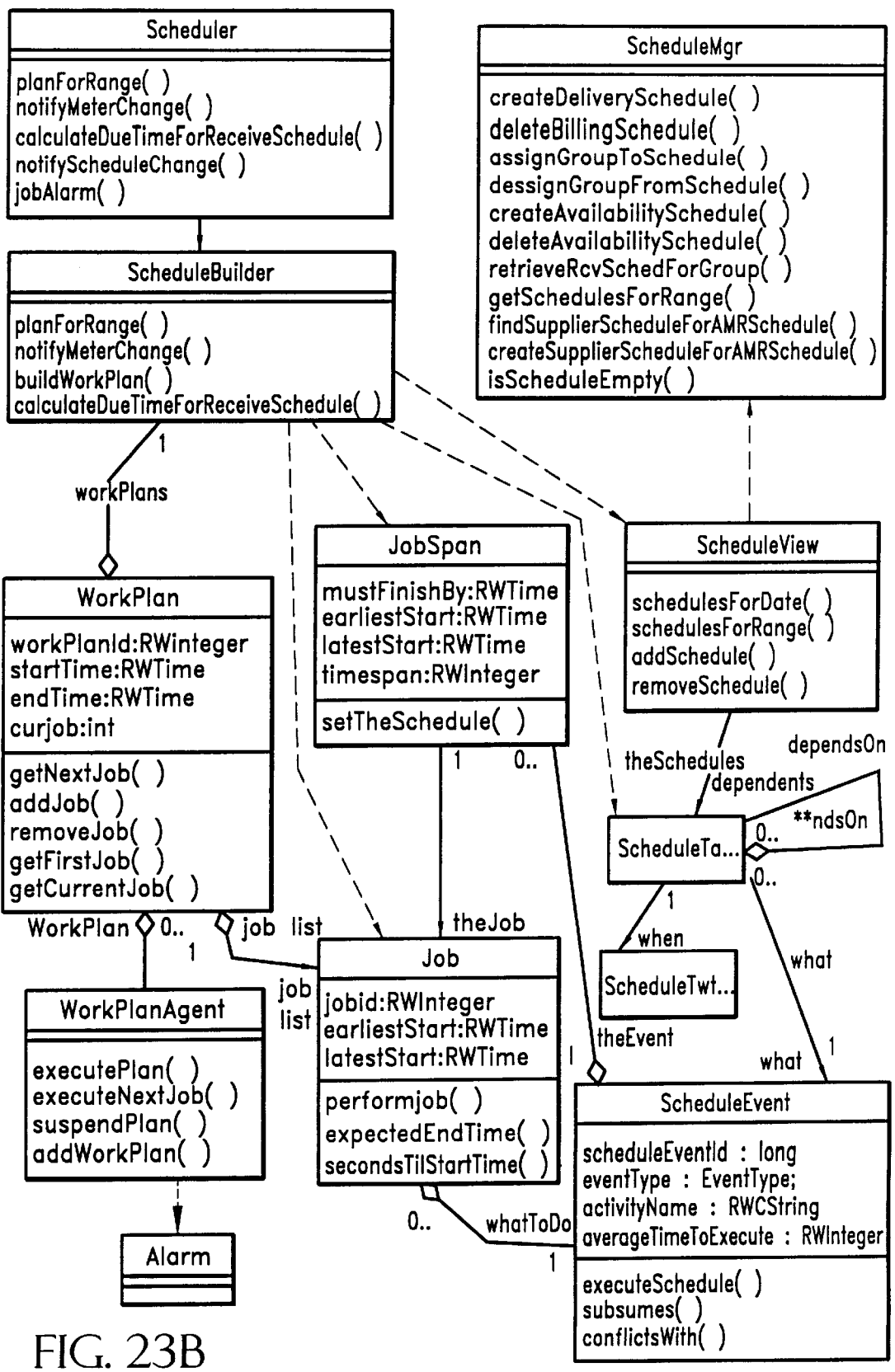
Figure 23C:
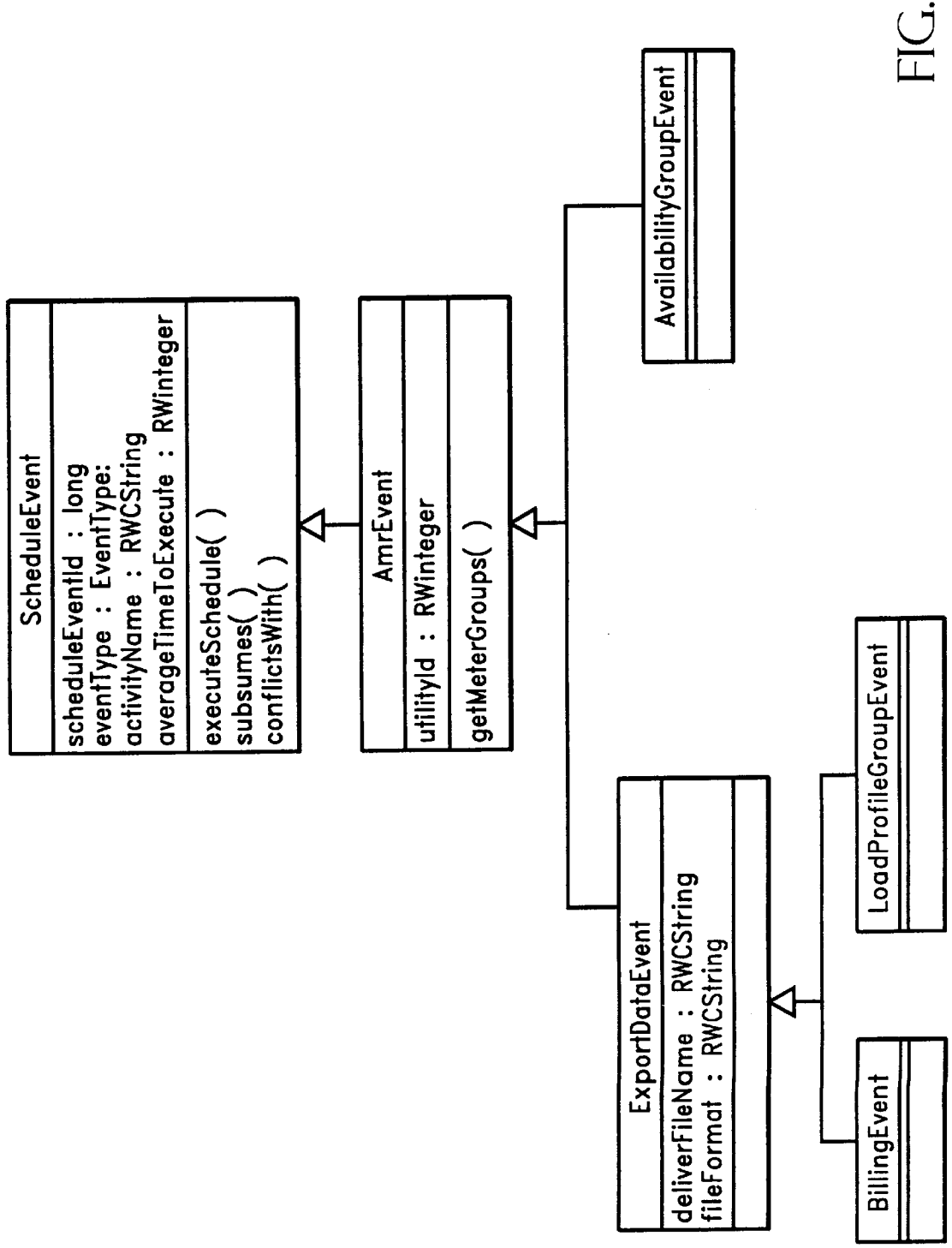
Figure 23D:
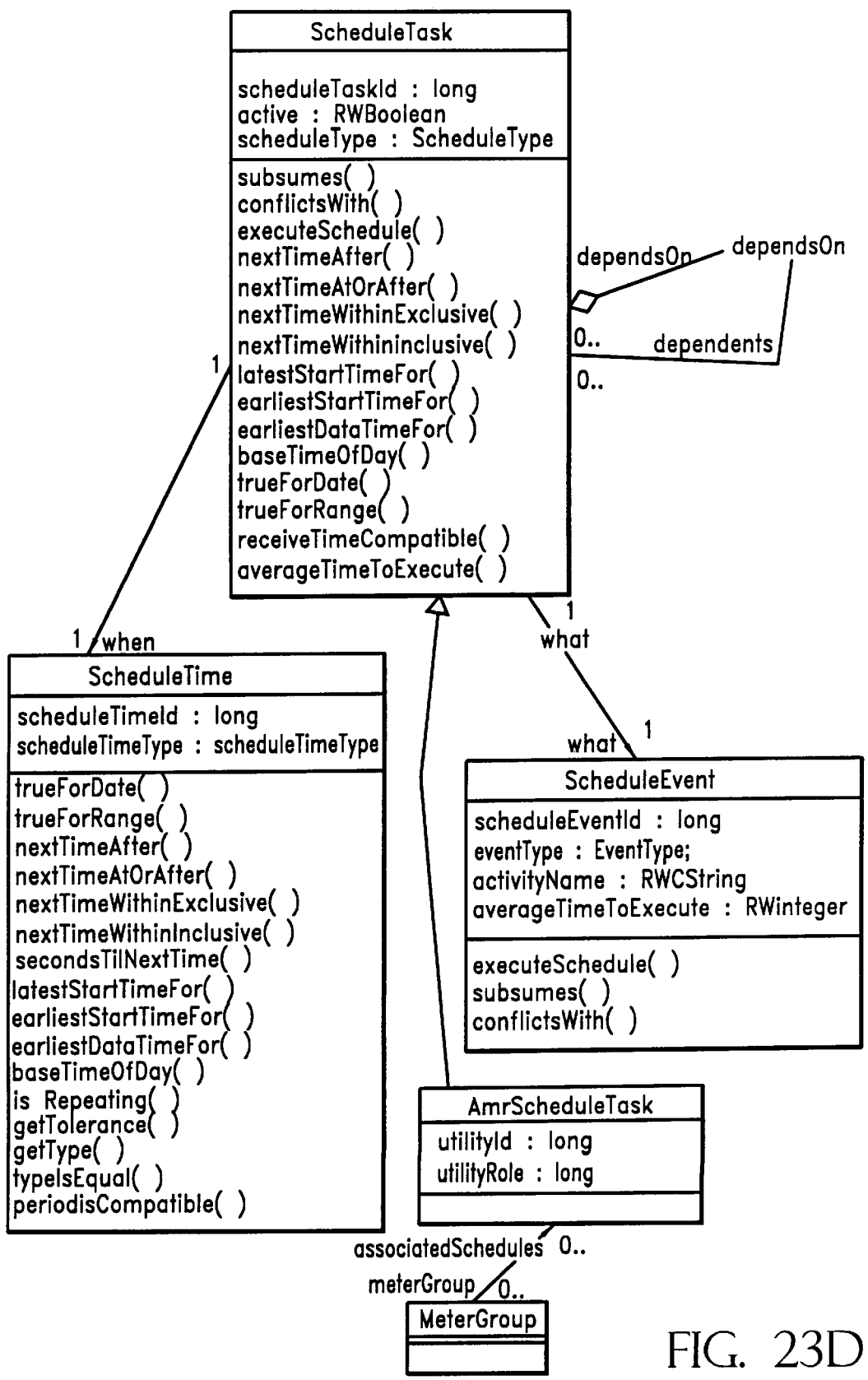
Figure 23E:
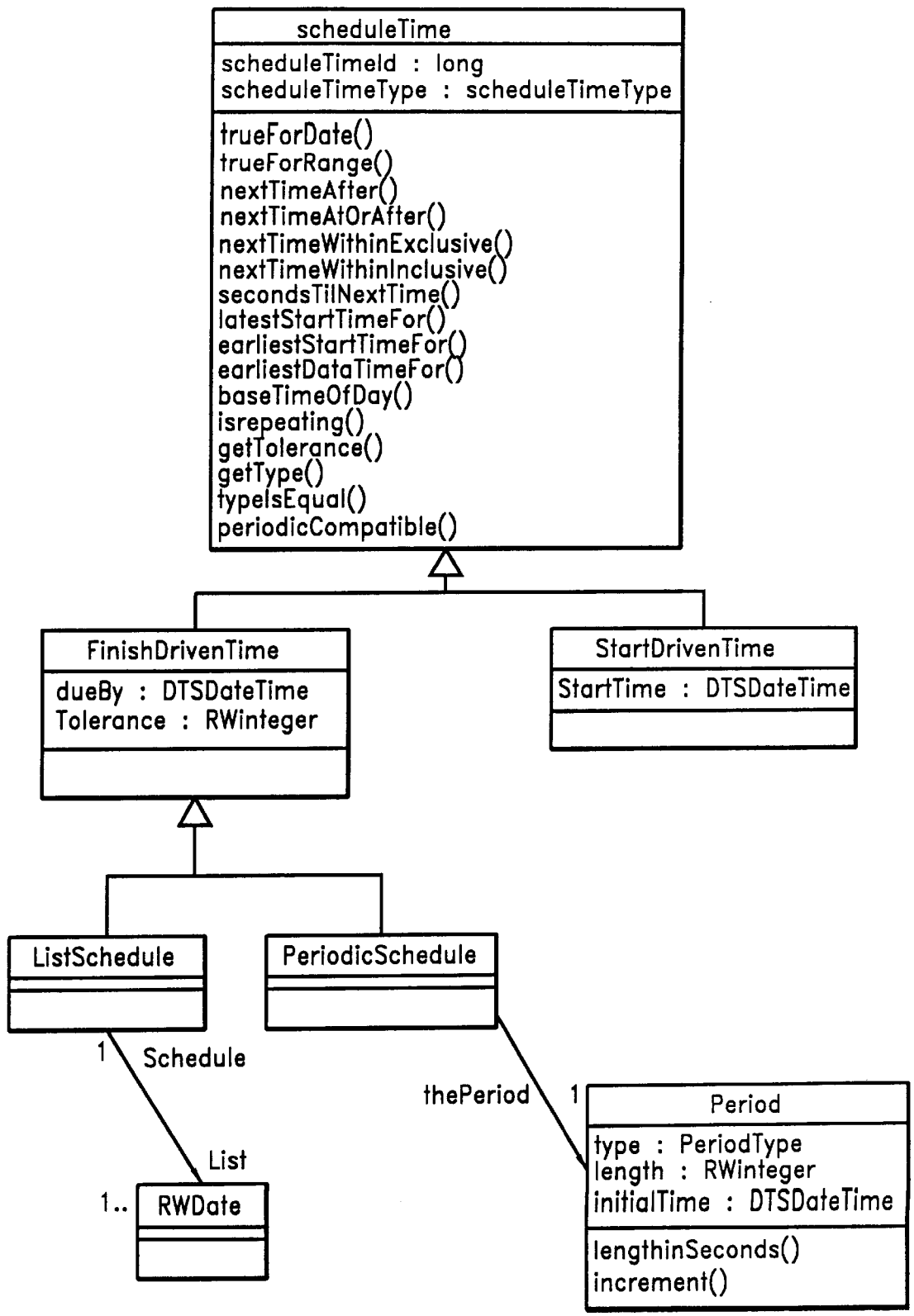

FIG. 17 illustrates the logical architecture of the account management subsystem 150p. The account management subsystem 150p provides for operations on groups of meters 60, and resolving many-to-many relationships between a group and its elements. FIGS. 18A–D illustrate the logical architecture of the capability manager 150j. As noted above, abilities are enabled capabilities. The capabilities are actions a mechanism is capable of performing (e.g., measurement, information and control). Abilities may be enabled either intrinsically or explicitly. An ability belongs to a particular object and no others (i.e., abilities are instance-based). FIG. 19 illustrates the logical architecture of the meter manager 50a. As illustrated, the meter manager 150a provides for setting the communication parameters specific to a particular meter. The meter manager 150a also contains a list of the communication statuses that a meter may have, the status of a meter's electrical connection, the meter's current stage in the life cycle (e.g., ordered, inventoried, installed, readable, billable, terminated). FIG. 20 illustrates the logical architecture of the rate manager 150b. The rate manager 150b sets rates for particular meters 60 (or vice-versa). The data component (DC) instance is the application of a data collection template (DCTemplate) to a particular meter. Only certain combinations of DCTemplates are allowed. FIG. 21 illustrates the logical architecture of the reading management server 150k. The reading management server 150k provides for scalar readings (consumption or demand) or arrays (load profile or time of use) and the meter reading is split between two tables (MeterSample and SampleData). The method of acquisition of each data point in a meter reading is determined for quality of data purposes, in addition to why the meter was read. FIGS. 22A–B illustrate the logical architecture of the schedule manager 138b. The schedule manager 138b provides for setting the periodic delivery schedule of exported data to a utility. To perform the exportation, the external characteristics of the data are set, e.g., file name, when to deliver the data. The schedule manager 138b is also responsible for scheduling of all workflows. The expected time for each workflow and a total number of workflows are taken into account to determine when to start the workflow so that the system is not overloaded. Receiving events and internal events within the AMR are also scheduled by the schedule manager 138b. For example, data to be received from a supplier is scheduled as well as actions the AMR may have to take to make the data available to the utility.

The logical view of the Schedule Manager 150f is shown in FIGS. 23A–E. The ScheduleManagement subsystem accepts requests via workflow create and update schedules of data collection. It is the Encina® server interface for building workplans (Activity Plans) for billing schedules. ScheduleBuilder builds workplans by arranging the activities in the various schedules into jobs, determines when to start the activities, and to set the alarms to trigger execution. For example, when a new billing schedule is entered into the system, a delivery schedule for the supplier of the data needs to be determined. In addition, a workplan for a range of time needs to be built including, finding all schedules with times within the range, arranging in chronological order, figuring start times that result in acceptable finish times, putting jobs into a workplan, setting alarms to trigger the jobs and RPC operation for the subsystem. In addition, actions scheduled, event conflicts, and whether an event subsumes another event are also determined. A schedule task is something to do at a schedule time. As noted above, it consists of "what to do" and "when to do it." "What to do" is a scheduleEvent, which carries all of the information about the activity. "When to do it" is a scheduleTime, which carries all of the timing information.

Figure 24:
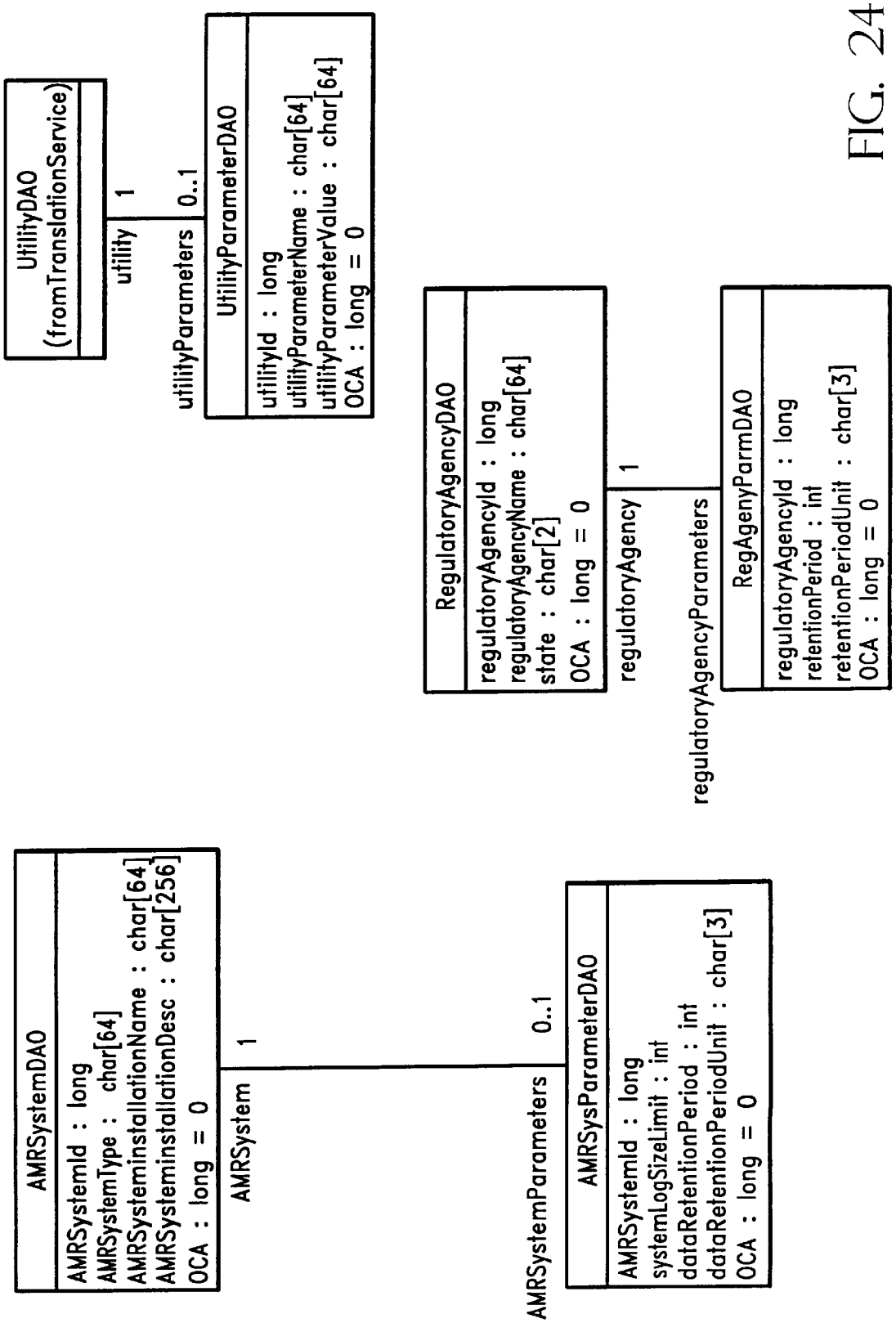
FIG. 24 illustrates the logical architecture of the System Parameters.
Figure 25:
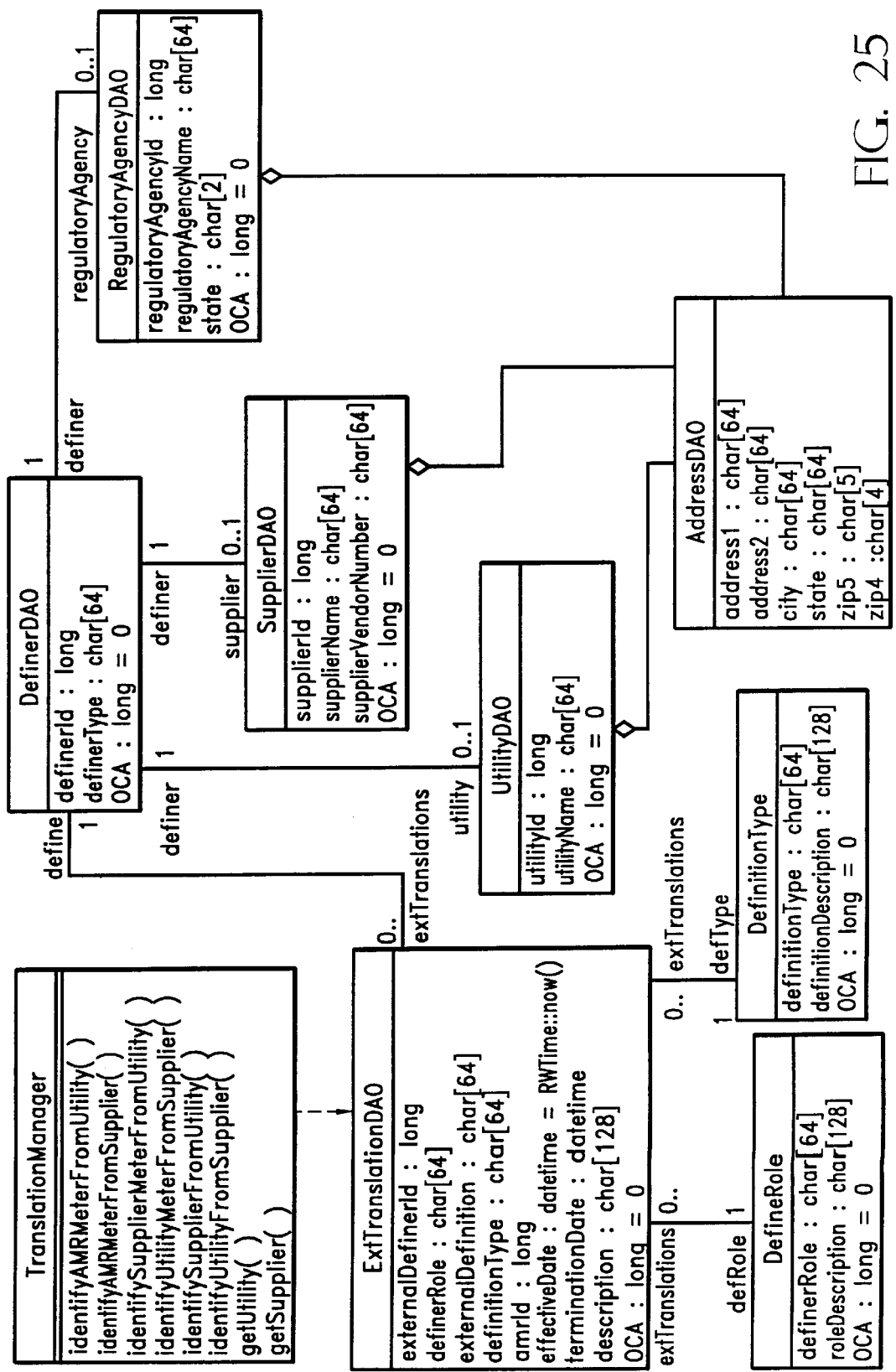
FIG. 25 illustrates the logical architecture of the Translation Service.

FIG. 24 illustrates the logical architecture of the SystemParameters. The SystemParameters are a catalog of the properties of the AMR Server 15. They can be used to set defaults on a system-wide basis, and set utility defaults on a utility-wide basis. FIG. 25 illustrates the logical architecture of the TranslationService 150h. The TranslationService 150h may be used to validate fields such as state and zip codes, and determining a regulatory agency for a jurisdiction in which the meter resides.

Relational databases suffer from a deficiency in that they generally hold only current data, as all previous versions of the data are overwritten. Thus, the relational database approach will not provide an historical view of the data. The solution to this problem is to use a temporal framework approach. This approach includes augmenting the database to hold two timestamp ranges for each table, enhancing the stored procedures to perform the temporal equivalent of relational inserts, updates and deletes, providing a templated technique for selecting the correct version of data from the database for different views of history, and performing relatively minor recoding of application servers to use the temporal framework.

The database 120 is implemented utilizing temporal timestamps on the relational tables. An explanation of the use of temporal timestamps on relational tables follows. The Bitemporal Conceptual Data Model is preferably used in the AMR Server 15 because of the capability of this model to meet the requirements of the electrical deregulation information marketplace.

The Bitemporal Conceptual Data Model is an extension of the relational data model which allows for two independent, orthogonal time periods to be associated with each tuple (row) in a relation (table). It accomplishes this by using the timestamp datatype to append two time periods to each tuple: Valid time and Transaction time.

Valid and Transaction each have two boundaries, startTime and endTime. The two periods are orthogonal, i.e., they record different, independent aspects of the tuple. The Valid period is the time range during which a fact is true. The Transaction period is the time range during which knowledge of a fact is current, or stated another way, the time range during which a fact is recorded in the database. The temporal timestamp is modeled as two dependent relational attributes, startTime and endTime, where startTime is always be less than or equal to endTime.

The boundaries of the two time periods also have different meanings. For Valid, the startTime is when a fact becomes true or effective. The Valid endTime is when a fact ceases to be true. For the Transaction time period, startTime is when a fact (row) was recorded in the database; endTime records how long the fact represents the current state of the relation. In other words, the endTime records the expiration or deletion time of a fact as representing current relations.

With regard to database operations, there are three possible write operations that involve temporal timestamps: inserts, updates, and deletes. In addition, there are two possible scenarios for updates: the Valid attributes are modified or not modified. Modification of Valid timestamp may be done to reflect a new understanding of the time period during which a fact was (is) true. In the temporal sense, the three database write operations work as follows:

1. During an insert, a row is inserted into the appropriate database table.
2. During an update, a new row with the updated data is inserted into the appropriate database table. The Transaction endTime of previously current row is updated to the commit time of the update operation.
3. During a delete, the current row is not truly removed from the database, but is logically deleted by updating the Transaction endTime to sometime less than infinity, though not necessarily less than or equal to the delete operation commit timestamp. If the Transaction endTime is set to a time greater than now, the fact is current until that time, i.e. the fact is preset to expire at the Transaction endTime.

As an example, one meter may have many rates and one rate may apply to many meters 60. What needs to be determined is when this relationship of meters 60 and rates is effective (valid). That is indicated by the Valid and Transaction timestamps of the Meter, Rate and the intersection table that resolves the many-to-many Meter-Rate relationship. Some samples of those tables are shown below:

TABLE 1

| | | | Meter | | | |
|---|---|---|---|---|---|---|
| MeterId | Meter Type | OCA | Vs | Ve | Ts | Te |
| 1 | A1D | 0 | 4-1-1998 | 2-5-2037 | 4-1-1998 | 2-5-2037 |
| 2 | A1K | 0 | 4-1-1998 | 2-5-2037 | 4-1-1998 | 7-4-1998 |
| 2 | A1-K2 | 1 | 4-1-1998 | 2-5-2037 | 7-4-1998 | 2-5-2037 |

MeterId is the primary key of the Meter table, while MeterType is an a periodic time-variant attribute. OCA is the Optimistic Control Attribute; it is compared to the OCA value stored in a passivated proxy object, to determine if the data retrieved from the database represents the state of the proxy object before passivation. Vs and Ve are the start time and end time boundaries of the Valid timestamp. Ts and Te are similar. It is helpful to think of these two values as comprising one datatype. As shown in Table 1, Meter 1 has meter type A1D, and this is valid and current from April 1st forward. This is an example of a straight insert. Meter 2 originally had meter type A1K, and this was valid from April 1st forward, and current from April 1st until July 4th. The meter type for meter 2 was changed to A1-K2 on July 4th, and became the current fact. Note, since the valid timestamp was not changed, this reflects a correction of the meter type back to April 1st, in essence correcting the history of the meter. This is an example of an update that does not modify the Valid timestamp. Note the OCA value for Meter 2 also changed from 0 to 1. This flags the row as being different than before, and is used for optimistic locking. Optimistic locking will be discussed below.

TABLE 2

Rate

| Rate Id | RateType | OCA | Vs | Ve | Ts | Te |
|---|---|---|---|---|---|---|
| 10 | LP KVA | 0 | 4-1-1998 | 4-25-1998 | 4-1-1998 | 4-15-1998 |
| 10 | LP KVAR | 1 | 4-26-1998 | 2-5-2037 | 4-15-1998 | 2-5-2037 |
| 11 | CONS | 0 | 4-1-1998 | 2-5-2037 | 4-1-1998 | 2-5-2037 |

As shown in FIG. 2, Rate 10 has rate type LP KVA as the current rate type from April 1st until April 15th, at which time the customer requests to change the rate type to LP KVAR at the end of the fourth billing cycle. The valid period for the previous rate type ends at the end of the 4th billing cycle (April 25th), and the new rate type is valid from the beginning of the fifth billing cycle (April 26th) forward. The change was recorded in the database on April 15th, however, and so becomes current at this time. This logical update represents a new state for Rate 10. This is an example of an update that does modify the Valid timestamp. Rate 11 is another example of a straight insert.

TABLE 3

MeterRate

| MeterId | RateId | OCA | Vs | Ve | Ts | Te |
|---|---|---|---|---|---|---|
| 1 | 11 | 0 | 4-1-1998 | 2-5-2037 | 4-1-1998 | 2-5-2037 |
| 2 | 10 | 0 | 4-1-1998 | 4-25-1998 | 4-1-1998 | 4-15-1998 |
| 2 | 10 | 1 | 4-26-1998 | 2-5-2037 | 4-15-1998 | 2-5-2037 |

As shown in Table 3, MeterRate is an intersection table that resolves the many-to-many relationship between Meter and Rate. As such it has a two part key, MeterId and RateId. For MeterRate (1, 11), the association between Meter 1 and Rate 11 becomes valid on April 1st and continues forever. As used herein, the term "forever" refers to the date 2-5-2037, as this is the latest date that may be represented by the preferred database software. The association between Meter 1 and Rate 11 is also current for the same time period. It represents a straight insert into the intersection table.

For MeterRate (2, 10), there are two possibilities. The first possibility is represented above in Table 3. When Rate 10 changed on April 15th, MeterRate could be updated to reflect a change in the association, i.e. MeterRate (2, 10) shows the state change of one of its associates. Another possibility is that the association itself has not changed, so the two rows shown above for MeterRate (2, 10) could be represented by a single row:

TABLE 4

MeterRate

| MeterId | RateId | OCA | Vs | Ve | Ts | Te |
|---|---|---|---|---|---|---|
| 1 | 11 | 0 | 4-1-1998 | 2-5-2037 | 4-1-1998 | 2-5-2037 |
| 2 | 10 | 0 | 4-1-1998 | 2-5-2037 | 4-1-1998 | 2-5-2037 |

With this representation, however, the ability to distinguish which rate to use during the association's Valid time period is ambiguous. If selecting the current state, Rate 10 with the current Transaction timestamp (the one whose endTime is greater than now) would be used. During a billing run for billing cycle 4, Rate 10 with the Valid timestamp(s) that span the billing cycle time period is used. The logic used to select the correct Rate 10 representation can be inherent to the navigation of the relationships in Table 3. If represented as in Table 4, it is left to the programmer to sort out which Rate 10 representation to use. Techniques for selecting the correct data are presented below.

Changes to Valid times may cause an overlap with the Valid time period of other versions (rows) of the entity instance. In this case, a special operation, coalescing, may be required. It is noted that this should not to be confused with the Oracle® COALESCE operation. Two or more rows with identical non-temporal attribute values are value-equivalent. Value-equivalent rows with adjacent or overlapping time periods represent a temporal extension of a single fact and therefore should be coalesced into a single row. This is the case with MeterRate (2, 10) present in Table 3, if the OCA value is not taken into account. The coalescing operation is similar to duplicate elimination in a "select distinct" operation.

Coalescing is an extremely expensive operation in a purely relational database engine, and should be avoided if possible. To determine how to avoid coalescing, it is necessary to examine the three ways in which value-equivalent rows may materialize in a database.

The first way value-equivalent rows may appear is through the insert of value-equivalent rows with differing timestamps. Consider Table 5:

TABLE 5

MeterRate

| MeterId | RateId | OCA | Vs | Ve | Ts | Te |
|---|---|---|---|---|---|---|
| 2 | 10 | 0 | 4-1-1998 | 4-25-1998 | 4-1-1998 | 4-15-1998 |
| 2 | 10 | 0 | 4-26-1998 | 2-5-2037 | 4-15-1998 | 2-5-2037 |

In Table 5, the validity of MeterRate (2,10) is extended from April 25th to forever, and the currency is extended from April 15th until forever. These two rows are value-equivalent and have adjacent timestamps. Therefore they may be coalesced into a single row without any loss of semantic information, as shown in Table 6.

TABLE 6

MeterRate

| MeterId | RateId | OCA | Vs | Ve | Ts | Te |
|---|---|---|---|---|---|---|
| 2 | 10 | 0 | 4-1-1998 | 2-5-2037 | 4-1-1998 | 2-5-2037 |

The coalescing operation, however, is performed either in the application modifying the data, or by the database stored procedure code. If performed by the C++ programmer, the appropriate coalescing pre-conditions are detected and a method called that literally updates the database, rather than performing a temporal update. If performed by the insert stored procedure programmer, each new record inserted into the database are preferably tested with all other records of the same primary key. If coalescing criteria are met, the stored procedure extends the Valid or Transaction timestamp, or both, of an existing row by performing a classic database update.

To effectively perform coalescing in C++ code, the programmer needs to perform a search for value-equivalent rows prior to every insert, retrieve any candidates, evaluate the coalescing criteria, and call a special method that performs a classic database update on an existing row. This algorithm is also duplicated for each low level proxy implementation. This technique, however, is expensive in terms of processing time and network bandwidth, but has the advantage in a multi-tiered environment of spreading the work over many processes. It may also be templated, after a fashion, and the requisite code generated by the Proxy code generators.

Code generators are like software production lines, given an order, the generator creates reproducible code that shares characteristics with other units from the production line. To further the analogy, an automobile manufacture's models differ from each other in size, model, style, color, options, and price. Each automobile, however, shares a core set of similarities that enable the driver to operate any of the vehicles without retraining. For instance, steering wheels always are round, and when rotated clockwise cause the vehicle to turn right. The pedal layout and operation is always the same. Gauges present familiar information, though possible in a different format. Fuel is standardized, as is the basic drive train operation. This standardization extends to the production line that produced the automobiles. Though the list of available options is fixed for a certain model and year, each customer can specify which options they want for their vehicle. The production line can then take this specification and produce the appropriate vehicle for that customer. The customer is then responsible for any further customization they wish to make to their car.

The code generators serve a similar function in the AMR Server 15. By creating the specification for an AppServer, Proxy, or DAO, the programmer can have most of the standard, shared code generated for them. This code represents a substantial portion of the code required to implement one of these classes. Furthermore, the result is reproducible, since the code is not hand-built each time, which reduces the potential for error and rework time. Thus, the overall quality of the AMR Server 15 is thus vastly improved by using code generators, and the cost in terms of time is proportionately reduced.

If the insert stored procedure is responsible for coalescing, it also evaluates the table for any value-equivalent rows with satisfy the coalescing criteria, and then perform a classic database update on an existing row. This approach has the disadvantage of localizing all processing in the database engine, which is less distributable than Encina® servers. Localization can become an advantage, however, in that it simplifies the C++ programmers' job, and the stored procedure code can be generated via an appropriately modified generator. Also, this approach trims network traffic, which preferably avoids bottlenecks in overall AMR Server 15 throughput.

The second way value-equivalent rows may appear is by temporally updating a row with adjacent or overlapping timestamps. Table 7 shows the Meter table containing a single row, valid and current forever.

TABLE 7

MeterRate

| MeterId | RateId | OCA | Vs | Ve | Ts | Te |
|---|---|---|---|---|---|---|
| 2 | 10 | 0 | 4-1-1998 | 2-5-2037 | 4-1-1998 | 2-5-2037 |

If that row is temporally updated (a new row is inserted and made current, and the Te value of the existing row is changed to the commit timestamp) with value-equivalent values, a new row results, as shown in Table 8.

TABLE 8

MeterRate

| MeterId | RateId | OCA | Vs | Ve | Ts | Te |
|---|---|---|---|---|---|---|
| 2 | 10 | 0 | 4-1-1998 | 2-5-2037 | 4-1-1998 | 4-15-1998 |
| 2 | 10 | 1 | 4-1-1998 | 2-5-2037 | 4-15-1998 | 2-5-2037 |

This condition may be most easily avoided by detecting the value-equivalence of the "new" row in the proxy code, and disallowing the update.

A third way value-equivalent rows may appear is by updating a row to become temporally adjacent or coincident with another row, as shown in Table 9.

TABLE 9

MeterRate

| MeterId | RateId | OCA | Vs | Ve | Ts | Te |
|---|---|---|---|---|---|---|
| 2 | 10 | 0 | 4-1-1998 | 4-25-2037 | 4-1-1998 | 5-1-1998 |
| 2 | 11 | 1 | 4-25-1998 | 6-1-1998 | 5-1-1998 | 6-1-2037 |
| 2 | 10 | 2 | 6-1-1998 | 2-5-2037 | 6-1-1998 | 2-5-2037 |

Suppose Meter 2 was assigned to Rate 11 by mistake. If MeterRate (2,11) is corrected to reflect that the rate should really have been Rate 10 instead of Rate 11, the result is shown in Table 10.

TABLE 10

MeterRate

| MeterId | RateId | OCA | Vs | Ve | Ts | Te |
|---|---|---|---|---|---|---|
| 2 | 10 | 0 | 4-1-1998 | 4-25-2037 | 4-1-1998 | 5-1-1998 |
| 2 | 11 | 1 | 4-25-1998 | 6-1-1998 | 5-1-1998 | 6-1-2037 |
| 2 | 10 | 2 | 6-1-1998 | 2-5-2037 | 6-1-1998 | 2-5-2037 |

If this operation is allowed, then the three rows above represent a single, temporally continuous fact about MeterRate (2, 10) and should be coalesced. There is a problem with this specific operation. As a matter of policy, are "mistakes" valid data, and therefore are kept in the history, or may they be corrected without loss of information? If the former, then modifying the RateId of MeterRate (2, 11) should be disallowed, and a temporal update applied instead. This results in Table 11.

TABLE 11

MeterRate

| MeterId | RateId | OCA | Vs | Ve | Ts | Te |
|---|---|---|---|---|---|---|
| 2 | 10 | 0 | 4-1-1998 | 4-25-1998 | 4-1-1998 | 5-1-1998 |
| 2 | 11 | 1 | 4-25-1998 | 6-1-1998 | 5-1-1998 | 7-1-1998 |
| 2 | 10 | 2 | 6-1-1998 | 2-5-2037 | 6-1-1998 | 2-5-2037 |
| 2 | 10 | 3 | 4-25-1998 | 6-1-1998 | 7-1-1998 | 2-5-2037 |

By examining the Valid timestamps, it is seen that rows 1, 4, and 3 have adjacent and overlapping validities, and therefore form a temporally continuous single fact with respect to validity, i.e. row 2 represents a mistaken state. If they are coalesced, however, the details of the mistaken history shown in row 2 are obliterated.

By examining the Transaction timestamps of rows 1, 4 and 3, it is seen that rows 1 and 4 are not temporally adjacent, even thought their validities are temporally adjacent. Furthermore, rows 3 and 4 have overlapping Transaction and Valid periods. These two rows may be coalesced without loss of information, since the Valid period for the mistaken fact lies wholly within the Valid period of the coalesced rows 3 and 4, and the Transaction period for row 3 holly contains the Transaction period for row 4. The result is presented in Table 12.

TABLE 12

MeterRate

| MeterId | RateId | OCA | Vs | Ve | Ts | Te |
|---|---|---|---|---|---|---|
| 2 | 10 | 0 | 4-1-1998 | 4-25-1998 | 4-1-1998 | 5-1-1998 |
| 2 | 11 | 1 | 4-25-1998 | 6-1-1998 | 5-1-1998 | 7-1-1998 |
| 2 | 10 | 2 | 4-25-1998 | 2-5-2037 | 6-1-1998 | 2-5-2037 |

Note the Valid periods for rows 1 and 3 are adjacent, and the Transaction period for row 3 is later than the Transaction period for row 2, indicating row 3 supersedes row 2. The same information now occupies 37 fewer bytes.

To further illustrate this example, suppose a billing run was made in May on the above data. Row three would not have existed yet, so the mistake Rate 11 would be used in the billing run. Once the mistake was discovered in June and corrected, another billing run would use Rate 10 to publish the amendment to the May results, and Rate 10 would be used thereafter. Furthermore, the fact that an incorrect rate had been used at one time could be detected and accounted for, without degrading the proper performance of the system.

If Table 11 is reordered somewhat, the result is Table 13. Note the order of rows 4 and 3 are swapped.

TABLE 12

MeterRate

| MeterId | RateId | OCA | Vs | Ve | Ts | Te |
|---|---|---|---|---|---|---|
| 2 | 10 | 0 | 4-1-1998 | 4-25-1998 | 4-1-1998 | 5-1-1998 |
| 2 | 11 | 1 | 4-25-1998 | 6-1-1998 | 5-1-1998 | 7-1-1998 |
| 2 | 10 | 3 | 4-25-1998 | 6-1-1998 | 7-1-1998 | 2-5-2037 |
| 2 | 10 | 2 | 6-1-1998 | 2-5-2037 | 6-1-1998 | 2-5-2037 |

The second and third rows show the "mistaken" fact and the "corrected" fact. This reordering makes it apparent that MeterRate (2, 10) has been the valid association since April 1st. This is shown by the continuity is indicated by the adjacent Valid timestamps and the temporally greater (later in time) Transaction timestamp of row 3 compared to row 2. When asking the question "How long has Meter 2 been on Rate 10?" the time range that answers that question begins on April 1st and continues to now. This implies that the query should return a single answer, rather than multiple consecutive, adjacent results. This type of coalescing is done at query time, rather than during a database write.

Each scenario presented above should be examined and benchmarked to determine the most effective and efficient techniques for implementing history in the production AMR Server 15.

With regard to data manipulation techniques, the following clauses are used. To select the current version of the data, the following where clause is used in the select statement:

where transactionTimeStart<:now
and transactionTimeEnd>:now where :now is a variable holding the select transaction start time.

To select a version of data that matches a specific date, use the following where clause:

where :specificDate between validTimeStart and validTimeEnd where :specificDate is the specific date of interest.

To select a version of data that falls in a certain time period, use the following where clause:

where validStartTime
between :timePeriodStart and :timePeriodEnd
and validEndTime
between :timePeriodStart and :timePeriodEnd The latter where clause is typical of navigational queries that traverse the relational schema, weaving the relationships between parent and dependent tables. The two variables are the boundaries of either the Valid or Transaction period of the parent record. The following explains the transitions each period experiences during database write operations. All times are recording in the UTC time zone.

During an insert, a row is inserted into the appropriate database table. The policy for the Valid and Transaction periods is as follows: Valid startTime may be set to a past or future date. If not set, if will default to the commit time of the database transaction. Valid endTime may be set to a past or future date, so long as it is greater than the Valid startTime. If endTime is not set, it defaults to infinity, which occurs on February 5, 2037 (the maximum time RogueWave can accommodate, RWTime(UINT_MAX) ). Transaction startTime is set to the commit time of the database transaction. This is kept consistent between all database writes that occur during a single database transaction. Transaction endTime is set to RWTime(UINT_MAX).

During an update, a new row with the updated data is inserted into the appropriate database table. The Transaction endTime of previously current row is updated to the commit time of the update operation. The policy for the Valid and Transaction periods of the new row is as follows: Valid startTime may be updated. If it is, Valid startTime may be changed to a past or future date. It may not exceed the endTime. If startTime is not updated, it will not be changed in the database. Valid endTime may be updated. Valid endTime may be changed to a past or future date, so long as it is greater than the Valid startTime. If the endTime is not updated, it will not be changed in the database. Transaction startTime is set to the commit time of the database transaction. This is kept consistent between all database writes that occur during a single database transaction. Transaction endTime is set to RWTime(UINT_MAX).

During a delete, the current row is not truly removed from the database, but is logically deleted by updating the Transaction endTime to some time less than infinity, though not necessarily less than or equal to the delete operation commit timestamp. If the Transaction endTime is set to a time greater than now, the fact is current until that time, i.e. the fact is preset to expire at the Transaction endTime. This can become problematic, however, and is not recommended. Valid startTime is not changed. Valid endTime is not changed. Transaction startTime is not changed. Transaction endTime is updated to the commit time of the delete operation.

The functionality of Bitemporal Conceptual Data Model accommodates both strategic and tactical directions of database vendors, standards, and the AMR Server 15, and it is preferably utilized to meet the needs of a deregulated electric utility industry.

As shown in FIGS. 3 and 4, the AMR Server 15 supports many External Application Program Interfaces (APIs) 124 and 132. The AMR Server 15 provides a DCE Remote Procedure Call (RPC) API for application systems. External systems will require DCE in order to utilize the AMR Server 15 API. DCE is supported on all major platforms including mainframes, UNIX servers/ workstations, and PCS. The AMR Server 15 API provides an external system with access to services within the AMR Server 15.

The initiator of an RPC call acts as an RPC Client and the recipient of an RPC call acts as an RPC Server. Each API service request returns the status of the request. Note that all API calls return the DCE error status. The diagrams below show the high-level interactions of the service initiator and recipient.

The following will highlight the API calls available to an RPC Client running in an Application System (APIs invoked from Application System to AMR).

| Meter Life Cycle APIs: | |
|---|---|
| Add Meter Synchronous Request | Defines a meter in the AMR database. The addition/definition of a meter to the AMR database is done by the Primary Metering Utility (or third-party vendor). |
| Install Meter Synchronous Request | Records the physical installation of a meter at its location. |
| Uninstall Meter Synchronous Request | Records the physical removal of a meter from its location. |
| Modify Meter Synchronous Request | Modifies the definition of an existing meter. |
| Terminate Meter Synchronous Request | Removes the meter from the database after a specified expiration. |

| Account Life Cycle APIs: | |
|---|---|
| Add Account Synchronous Request | Adds a new inactive account. An account may refer to a new or existing service. |
| Add Meter to Account Synchronous Request | Adds a meter to an account. The account may or may not have other meters 60 associated with it. |
| Remove Meter from Account Synchronous Request | Disassociates a meter from an account. This disassociation does not physically remove the meter. |

| -continued | |
|---|---|
| Account Life Cycle APIs: | |
| Modify Account Synchronous Request | Modifies the definition of an existing account. |
| Terminate Account Synchronous Request | Terminates an account. The account must not have any meters 60 assigned to it. |

Rates include the functions necessary to define and manage rates including usage and interval data. Different meters 60 for the same account may be on different rates; however, a single meter may only be associated with one rate at a time. Data available in the meter that could be used as "billing data" (and therefore included in the billing data required by a rate type) includes total "*" for this billing period, and "*" load profile (typically 5, 15, 30, or 60 minute); where "*" may be any of the following: kW(h) delivered, kW(h) received, kVA(h) delivered, kVA(h) received, kVAR(h) delivered, kVAR(h) received, kVAR(h) for quadrants 1, 2,3,4, kQ(h) delivered, kQ(h) received, and Power factor for peak demand, time-of-use peak demand and load profile.

| Rate APIs include: | |
|---|---|
| Create Rate Synchronous Request | Defines a Rate in the AMR database. A rate consists of one or more Data Components that provide specific information required for calculating a bill. |
| Assign Rate to Meter Synchronous Request | Assigns a rate to a meter. |
| Remove Rate from Meter Synchronous Request | Removes a rate from a meter. |
| Delete Rate Synchronous Request | Deletes a rate from the AMR database. |

With regard to interval data, the data is normalized when the clock in the meter does not agree with the clock in the computer reading the meter. This phenomena is called "clock drift." Clock drift can be either positive or negative depending upon whether the real time (at the computer) is greater than (negative drift) or less than (positive drift) the clock in the meter.

Metering data includes the functions necessary to retrieve meter-reading information used for billing and for information (rate studies), and sends it to the appropriate system(s). This includes both consumption and interval data.

| On Request Meter Read Asynchronous Request | Retrieves meter readings on request for a specific meter from the database using specific retrieval parameters that are passed with the request. If the readings stored in the database are not recent enough, the reading is retrieved from the meter. This retrieval can be done via a meter, account, or data collection group. |
|---|---|
| Export Scheduled Billing Data Asynchronous Notification | Collects billing data based on a schedule and prepares the billing data in a "Destination File." The customer is notified that the billing data file is ready for retrieval. Validation must be done to data prior to shipping |

| -continued | |
|---|---|
| Export Metering Data Asynchronous Notification | Records how the scheduler, an operator, or external system exports interval data from the AMR database to an external system. The export data can be in a range of times/dates and for a data collection group, specific meter channels, or meters 60. |
| Enter Data Manually Synchronous Request | Records the manual entry of meter data into the AMR database when an AMR reading is unavailable. The read could be actual or estimated. The reading is not imported from a file. |
| Import Metering Data Synchronous Request | Records the importing of Data Components for meters 60 from an external system or operator. This data may come from the meter via a device such as a hand-held and then entered into the system through this import process. The import of metering data represents a scenario that is not typical or automatic. |

The scheduler includes Billing Scheduling functions necessary to define which meters 60 are to be read on which days for billing or information purposes. The billing read schedule includes the "billing day", and identifies other information necessary to collect and process billing data. An account is assigned a rate and assigned to a billing schedule. The associated APIs are as follows:

| | |
|---|---|
| Create Billing Schedule Synchronous Request | Defines a billing schedule for the AMR database according to the schedule given to it by a customer. The schedule specifies both when billing readings are delivered to the billing system and what actually constitutes a valid billing reading (freshness). |
| Assign Account to Billing Schedule Synchronous Request | Assigns an account to a specific billing schedule. |
| Remove Account from Billing Schedule Synchronous Request | Removes an account from a specific billing schedule. |
| Delete Billing Schedule Synchronous Request | Deletes a billing schedule from the AMR database. |

| Group APIs are as follows: | |
|---|---|
| Create Data Collection Group Synchronous Request | Defines a data collection group. The data collection group defines metering data components that are to be periodically retrieved from the meter and stored in the database. |
| Add Meter to Data Collection Group Synchronous Request | Adds a meter to an existing data collection Group. The request includes the name of the data collection group and a list of meters 60 to be added to the group. A meter may belong to more than one data collection group. |
| Delete Meter from Data Collection Group Synchronous Request | Removes a meter from a data collection group. The removal stops data collection for that meter. Previously collected data is still available for retrieval based on retrieval rules. |

| Group APIs are as follows: | |
|---|---|
| Delete Data Collection Group Synchronous Request | Removes a data collection group from the AMR database. A group can only be deleted when there are no meters 60 associated with it. Data is still available for retrieval until data retention period expires. |

| Administrative APIs: | |
|---|---|
| Synchronize Meter Time Synchronous Request Validating Editing and Estimating Data | Verifies the time inside a meter. |

The AMR Server 15 tracks the electrical service connection status (Disconnect/Reconnect) of meters 60 within its database. For example, once a meter technician has physically connected or disconnected electrical service to the premise, notification can be sent to the AMR Server 15 via the Modify Meter API and the appropriate meter status flag is updated. In addition, meter readings can be obtained and identified as "connect" or "disconnect" readings in the database with their associated date/time stamps and reason codes.

Supplier System Interfaces (APIs) will now be described. The AMR Server 15 provides services allowing the automated meter reading of different types of electrical measurements from a variety of meter types and communication networks. These services integrate the diverse types of meters 60 and communications servers into a uniform flow of data that will better support the business and engineering units of utilities.

The services provided by the AMR Server 15 should be as transparent as possible to the type of communication network(s) used by the utility. The Supplier API is a set of common APIs that shield the particulars of vendor-specific Communication Servers 30 and networks from the utility and from the AMR Server 15 application software. If a utility desires to add another type of communication network into the AMR Server 15, this will only require the addition of a new communication interface in the AMR Server 15 and will not impact the utility or AMR application software.

Supplier API presents different scenarios of the Communication Server 30 API interacting with the AMR Server 15 in both synchronous and asynchronous communication modes. The API is utilized as an interface between AMR and communication server. Some APIs will be called from the AMR Server 15 to Communication Servers 30, while others may be invoked from Communication Server 30 to the AMR Server 15. Not all APIs will apply to a particular communication server. If an API is not applicable to a specific communication server, the API can still be called, but will return the status code AMR_NOT_SUPPORTED. In general, all APIs interact with the supplier interface in the AMR Server 15. However, the receiving Subsystem will process data received from bulk delivery and on-request reads.

The AMR Server 15 faces the challenge to accept a variety of data types (i.e., formats) from different types of meters 60 and Communication Servers 30. Therefore, a flexible data format is needed to facilitate data mapping and integration. At the same time, in order to make the API type-safe and prevent potential run time errors, the AMR Server 15 has fixed data types. The AMR 10 employs DCE's enumerated unions so that each different structure can be supported at run time, while still giving some type checking. Extensions to the API can be done without affecting older clients by using DCE version numbering. In some cases, a tag-value based data format can be used for maximum flexibility. Such a format applies tags to all the -values. The beauty of this format is its ability to store any type of data with tags defined; however, it could increase the size of the data for an API. The tagged fields will predominantly be used for parameters like UtilityContext that can have any information the utility or company wants AMR Server 15 to carry by way of context information. The top level scenarios of the Supplier APIs are contained in Appendix A.

APIs Invoked From Communication Server 30 to AMR are as follows:

| | |
|---|---|
| DiscoverMeter | Informs the AMR Server 15 that a new meter has been found in the field. |
| BulkDelivered | Notifies the AMR Server 15 that consumption and/or load profile bulk data for the specified delivery schedule has been delivered and is available in the specified file. |

APIs Invoked from AMR to Communication Server 30 are as follows:

| | |
|---|---|
| AddMeter | Adds a new meter to communication server. |
| DeleteMeter | Deletes the specified meter. |
| OnRequestMeterReadings | Requests the meter reading data for the specified meter. The reading data may consist of consumption and/or interval data depending upon input argument ComponentArray. The data is returned in fileName. |
| AddDeliverySchedule | Creates a new schedule with the given schedule ID for data delivery from the Communication Server 30 to the AMR Server 15. |
| AddCollectionComponents | Creates collection components for consumption and/or interval data on the Communication Server 30 and returns the assigned component IDs. |
| SynchMeterTime | Requests time synchronization for the specified meter. The DCE Distributed Time Service Local to the communications server is used as the time source. |
| AddMeterComponentSchedule | Assigns the specified collection components and delivery schedule to the specified meter. |
| GetMeterConfig | Retrieves meter configuration and type information for the specified meter from the communication server. |
| DeleteCollection-Component | Deletes collection components from the communication server. |
| DeleteDelivery-Schedule | Deletes a schedule for delivery from the communication server. |
| DeleteMeterComponentSchedule | Deletes delivery schedule/collection component assignments for the specified meter. |

Figure 26:
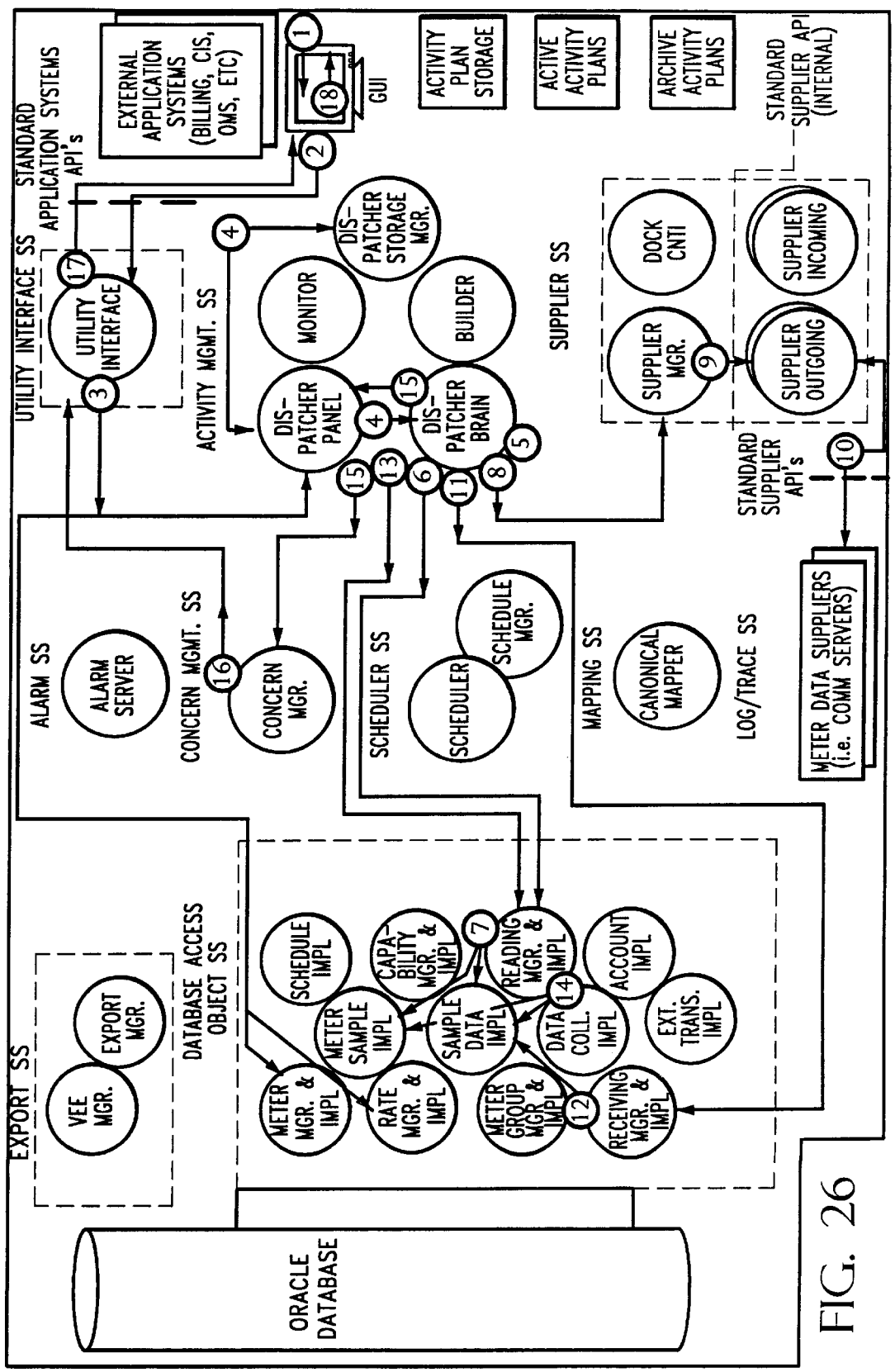
FIG. 26 illustrates the process of an on-request meter reading.

An AMR Server 15 Scenario for an on request meter reading will now be described with reference to FIG. 26. The following numbered steps correspond to the numbered flows illustrated in FIG. 26.

1. The user presses "Submit" on AMR Java™ application.
2. The ConfigUtility Encina® Server performs back-end support for the Java™ application and messages the OnRequestMeterRead Utility Interface API.
3. UtilityMgr Encina® Server houses the Utility Interface APIs. For this call, UtilityMgr uses the Meter Proxy and Rate Proxy to populate the appropriate data and requests execution of the OnRequestMeterRead workflow.
4. Dispatcher Panel Encina® Server retrieves the OnRequestMeterRead workflow, assigns it a workflow id, and queues a message to DispatcherBrain.
5. DispatcherBrain Encinal Server executes the OnRequestMeterRead workflow:
6. Brain queues a message to ReadingMgr Encina® Server requesting GetReadingsUsingFreshness service.
7. ReadingMgr uses SampleData proxies (ReadingMgr Encina® Server) to read samples from the AMR database.
8. If return status is STS_STALE_READINGS then DispatcherBrain queues a message to SupplierMgr Encina® Server requesting OnRequestMeterReadings service.
9. SupplierMgr determines the correct SupplierOutgoing Encina® Server to message for the meter.
10. RCS Encina® Server (running on NT) checks Local database for appropriate reading data. If the data is stale, the meter is dialed and the data is read from the meter. The readings file is written to the DSF directory.
11. DispatcherBrain queues a message to the ReceivingMgr Encina® Server requesting ReceiveMeterReadings service.
12. ReceivingMgr retrieves the specified readings file from DFS and parses the file. The SampleData Encina® Server stores the readings in the AMR database.
13. DispatcherBrain queues a message to ReadingMgr requesting GetMeterReadings service.
14. ReadingMgr uses MeterSample and SampleData proxies (MeterSample Encina® Server) to read samples from the AMR database. The samples are stored in a file in a DFS directory.
15. DispatcherBrain commits the workflow and notifies the DispatcherPanel and ConcemMgr of workflow completion and final status.
16. ConcernMgr notifies UtilityMgr of workflow completion and final status.
17. UtilityAgent notifies ConfigUtility of workflow completion, final status, and reading file.
18. ConfigUtility notifies the AMR Java™ application of workflow completion and readings file. The results are displayed to the user.

Another facet of the AMR Server 15 is the ability to customize the system. Customization is essential because the scope of operation for the AMR Server 15 may include data collection from meters 60 in different states in the United States and world and under varying regulatory authorities. The system accommodates the application of processes such as editing and estimation with unique sets of finite rules depending on the applicable regulatory or business practice authority. Examples of parameters that may vary include Regulatory Authority Parameters (e.g., state agencies, VEE, and Time Synchronization), Utility Parameters (e.g., Meter data freshness values, and Timing and quantity of meter reads/retries), and System Parameters (e.g., C&I Server system specifications, Standard meter characteristics and abilities, Standard communications characteristics, Size and duration of data storage, and Size and duration of system logs).

The AMR Server 15 will also need to be managed by an appropriate set of tools, and accordingly, the AMR Server 15 Management comprises a basic system management plan and tools. The plans are tailored to support existing customer practices and will include at a minimum, hardware and software configuration, management tools, operation documentation and operator training. Tools for system management will coincide with existing customer standards. In the event no standards exist, platform-specific system management tools may be utilized to monitor and assist in the operation and maintenance of the AMR Server 15. Planned maintenance windows for each customer should be implemented, and these will be dependent on the customer's critical operating time frames. Routine maintenance will be required and will be staged to provide the lowest impact to system operation.

The tools include a disk storage solution which is configured to support online and archival storage. Solutions will support a variety of options to support growth and scalability of the system and provide options for hardware and software- based raid systems. A backup solution that supports both a UNIX and Windows NT® environment should be included as part of a "unkey" solution. Backups will be sized and automated to provide capacity for growth. Backup solutions do not require system shutdown since online (i.e., live) backups of the Oracles database will be an integral part of the backup solution. Data recovery metrics in the event of a failure will coincide with defined operational metrics.

Network Management is preferably provided by the industry standard mechanism for providing network management support, i.e., the Simple Network Management Protocol (SNMP). The Oracle® database supports SNMP and provides the ability to Monitor the status of Oracle® services, Identify performance bottlenecks, "Discover" Oracle® databases or tools as they start up on any system node, Receive alerts when exceptional events occur (i.e. database going down), Define thresholds and automatic responses to specific events, Detect and diagnose potential problems quickly and easily, be notified when certain events occur, and Store, report upon, filter and analyze historical data.

It is also possible that the Encina® utilities can be utilized for the network management of the AMR Server 15 Applications. The Encina® utilities provide the ability to: Monitor error messages, Enable selective tracing of execution path events, Dump information about the state of Encina® servers (which includes all AMR Server 15s), Analyze queue usage, Detect hung transactions, and Monitor server stops and starts.

The above-mentioned Oracle®, AMR Server Logging, and Encina® network management tools will assist in managing and isolating system bottlenecks and trouble areas. These tools ensure that the entire system remains fictional and that no one component causes unscheduled system down time.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. In a computer system, a canonical mapper to translate an input file from an input domain to an output domain, said canonical mapper comprising:

a canons utility which builds a canon, said canon being a tree relating all data attributes within a domain of information, and said domain being a collection of data that has a same data format;

a maps utility which creates input and output maps that specify the translation from said input domain to said output domain, said input map being a data structure that describes a format of said input domain, and said output map being a data structure that describes a format of said output domain; and a translator utility which performs the translation of said input file to an output file in accordance with said canon and aid input and output maps, wherein said input domain and said output domain have differing formats.

2. The canonical mapper as recited in claim 1, wherein said canonical mapper converts files over at least two mapped subdomains, said at least two mapped subdomains having the same root domain.

3. The canonical mapper as recited in claim 1, wherein said input map and said output map are derivation trees, and said canonical mapper utilizes said input map and said output map to build a scanner/parser for said input file domain.

4. The canonical mapper as recited in claim 3, wherein said canonical mapper traverses said input map to parse data from said input file into a canonical list.

5. The canonical mapper as recited in claim 4, wherein said canonical mapper maps from said canonical list to said output domain to generate said output file by traversing said output map and re-interpreting a corresponding element in said canonical list such that said corresponding element conforms to said output domain.

6. The canonical mapper as recited in claim 1, wherein said canon comprises an abstract template that describes a structure of said domain of information, said canon being structured as a tree comprising canonical elements that are used to interpret data contained within said input file.

7. The canonical mapper as recited in claim 6, wherein each canonical element is an abstraction, and canonical elements nested below higher level canonical elements is subsequently defined in terms of less abstract elements until resolving to a concrete element.

8. The canonical mapper as recited in claim 7, wherein relationships exist when said domain contains data that is dependent upon other data in said domain.

9. The canonical mapper as recited in claim 6, wherein said canonical elements are assigned attributes that define qualities of said canonical elements.

10. The canonical mapper as recited in claim 6, wherein said input map and said output map are created in accordance with said canon, and wherein said input map and said output map describe the intended output in terms of said canonical elements.

11. The canonical mapper as recited in claim 10, wherein said input map defines a function of each component of said input file in terms of said canon, and said output map defines a function of each component of said output file in terms of said canon.

12. The canonical mapper as recited in claim 11, wherein said input and output maps farther comprise attributes that define said canonical elements, tokens that represent values, and actions that define the format said canonical elements.

13. The canonical mapper as recited in claim 12, wherein said attributes comprise element types and modifiers,
wherein said element types include group elements that are canonical elements that have nested canonical elements and result elements contain a specific value, and
wherein said modifiers are associated with said group elements and are conditional statements about said group element.

14. The canonical mapper as recited in claim 13, wherein said conditional statements comprise optional, repeating, group results, and mandatory.

15. The canonical mapper as recited in claim 13, wherein said tokens are defined for said result elements and represent said specific value based on said input file.

16. The canonical mapper as recited in claim 1, further comprising an interactive translator utility to test the actual translation of said input file to be mapped for the translation process, said test being performed in accordance with said canon, said input map, said output map, and said input file.

17. The canonical mapper as recited in claim 1, wherein said translator utility runs in a headless mode.

18. A method of mapping an input file having an input domain to an output file having an output domain using a canonical mapper, said canonical mapper comprising a canons utility, a maps utility and a translator utility, wherein a domain is a collection of data having a same format, said method comprising:
creating a canon using said canons utility, said canon comprising canonical elements;
creating input and output maps using said maps utility in accordance with said anon to perform the conversion of said input file to said output file; and
mapping the information from said input map to said output map to create said output file using said translator utility.

19. The method as recited in claim 18, wherein said creating a canon comprises:
defining said canonical elements such that said canonical elements have a hierarchical structure, said hierarchical structure having a root and children nested under said root;
defining children of said root, said children defining specific information about said root; and
defining relationships of said canonical elements.

20. The method as recited in claim 18, wherein said creating input and output maps comprises:

selecting each component of said input file and defining its function in terms of said canon;
defining attributes about said canonical elements;
defining tokens, said tokens specifying a format of the results of mapping said input file using said input and output maps; and
defining actions to structure the appearance of portions of said input file or said output file.

21. The method as recited in claim 20, wherein said defining attributes about said canonical elements comprises:
defining modifiers for said canonical elements, said modifiers determining if a value of a particular canonical element is required, if said value appears more than once, if said canonical element includes a series of said values, or if said canonical element is required; and
defining identifiers, said identifiers being constant values within said input file.

22. The method as recited in claim 18, wherein said mapping the information from said input map to said output map to create said output file further comprises testing the conversion.

23. In a server residing within a multi-layered distributed software architecture that receives and processes data, said server comprising a data repository to store said data, at least one external interface to communicate with systems external of said server, a services subsystem comprising distributed services, said distributed services running on application servers within said distributed architecture, middleware software to facilitate scalability, transaction processing, and mapping of objects to said data repository, and application frameworks to facilitate access to said data repository and the creation of processes compliant with said middleware software, a canonical mapper server comprising:
a canons utility which builds a canon, said canon being a tree relating all data attributes within a domain of information, and said domain being a collection of data that has a same data format;
a maps utility which creates input and output maps that specify the translation from said input domain to said output domain, said input map being a data structure that describes a format of said input domain, and said output map being a data structure that describes a format of said output domain; and
a translator utility to perform the translation of said input file to an output file,
wherein said input domain and said output domain have differing formats.

24. The server as recited in claim 23, wherein said canonical mapper server resides in a mapping subsystem which provides for customization of file formats for exporting data from and importing data to said server.

25. The server as recited in claim 24, further comprising a mapping interface server that interfaces with said canonical mapper, wherein said mapping interface server provides middleware service requests from said services subsystems.

26. The server as recited in claim 25, wherein said mapping interface server interfaces with the canonical mapper server using a socket connection, and wherein said mapping interface server provides a service that allows a service in said services subsystem to specify said input file, said input map, said output file, and said output map.

27. The server as recited in claim 23, wherein said input map and said output map are created in accordance with said canon.

* * * * *

UNITED STATES PATENT AND TRADEMARK OFFICE
CERTIFICATE OF CORRECTION

PATENT NO. : 6,199,068 B1
DATED : March 6, 2001
INVENTOR(S) : Richard Christopher Carpenter It is certified that error appears in the above-identified patent and that said Letters Patent is hereby corrected as shown below:

Column 2,
Line 56, "(TOUT)" should read -- (TOU) --

Column 25,
Line 43, "162132" should read -- 162/32 --

Column 29,
Line 54, "is Optional" should read -- isOptional --

Column 34,
Line 20, "AMF" should read -- AMR --

Column 40,
Line 7, "Oracles" should read -- Oracle® --

Column 43,
Line 60, "Oracles" should read -- Oracle® --

Column 44,
Line 32, "Oracles" should read -- Oracle® --

Column 63,
Line 42, "Oracles" should read -- Oracle® --

Column 42,
Line 33, "setattr( )" should read -- setAttr( ) --

Column 48,
Line 46, "50a" should read -- 150a --.

Column 63,
Line 39, "unkey" should read -- turnkey --

Column 64,
Line 2, "fictional" should read -- functional --

UNITED STATES PATENT AND TRADEMARK OFFICE
CERTIFICATE OF CORRECTION

PATENT NO. : 6,199,068 B1
DATED : March 6, 2001
INVENTOR(S) : Richard Christopher Carpenter It is certified that error appears in the above-identified patent and that said Letters Patent is hereby corrected as shown below:

Column 65,
Line 18, (claim 12, line 2), "farther" should read -- further --
Line 52, (claim 18, line 10), "anon" should read -- canon --

Signed and Sealed this

Twenty-seventh Day of November, 2001

Attest:

*Nicholas P. Godici*

NICHOLAS P. GODICI
*Attesting Officer*    *Acting Director of the United States Patent and Trademark Office*